US008117128B2

(12) United States Patent
Ishibashi

(10) Patent No.: US 8,117,128 B2
(45) Date of Patent: Feb. 14, 2012

(54) CONTENT USAGE MANAGEMENT SYSTEM METHOD, AND PROGRAM PROVIDING MEDIUM THEREFOR

(75) Inventor: Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 11/248,885

(22) Filed: Oct. 12, 2005

(65) Prior Publication Data

US 2006/0112016 A1 May 25, 2006

Related U.S. Application Data

(62) Division of application No. 09/804,368, filed on Mar. 12, 2001, now abandoned.

(30) Foreign Application Priority Data

Mar. 14, 2000 (JP) ................................ P2000-071102
Mar. 14, 2000 (JP) ................................ P2000-071104

(51) Int. Cl.
*G06Q 30/00* (2006.01)

(52) U.S. Cl. ................. 705/44; 705/40; 705/41; 705/52

(58) Field of Classification Search .................... 705/40, 705/41, 44, 52
See application file for complete search history.

(56) References Cited

U.S. PATENT DOCUMENTS 4,484,217 A * 11/1984 Block et al. ....................... 725/1
6,389,538 B1 * 5/2002 Gruse et al. ................... 713/194

FOREIGN PATENT DOCUMENTS

JP 09-160972 6/1997
JP 09-293108 11/1997
JP 10-049584 2/1998
JP 11-098136 4/1999
JP 11-154184 6/1999
JP 11-242713 9/1999
WO 00/07329 2/2000

OTHER PUBLICATIONS

Ryuichi Yasuhara; Electronic Commerce Technology Trends: Digital Contents Creation and Disbribution Technology; Journal of IPSJ; vol. 38, No. 9; Sep. 1997.

Japanese Office Action issued on May 12, 2009 corresponding to JP Application No. 2000-071102.

* cited by examiner

*Primary Examiner* — Raquel Alvarez
(74) *Attorney, Agent, or Firm* — SNR Denton US LLP

(57) ABSTRACT

When the encrypted content is provided from a service provider to a user device, a usage log including information of the content usage fee is created in the user device. The created usage log is then sent to the service provider. The service provider compares the content usage fee in the received usage log with a predetermined threshold. If the content usage fee is found to exceed the predetermined threshold, the service provider requests a clearing center to inquire about the electronic money balance of the user. If it is determined that it seems difficult to collect money from the user, the transmission of a content key to the user is suspended. The clearing center also creates an issue log in which the effective period and an allowable amount of money spent by the user are set, and performs settlement processing only when the payment of the content usage fee has been made within the effective period.

17 Claims, 28 Drawing Sheets

FIG. 13

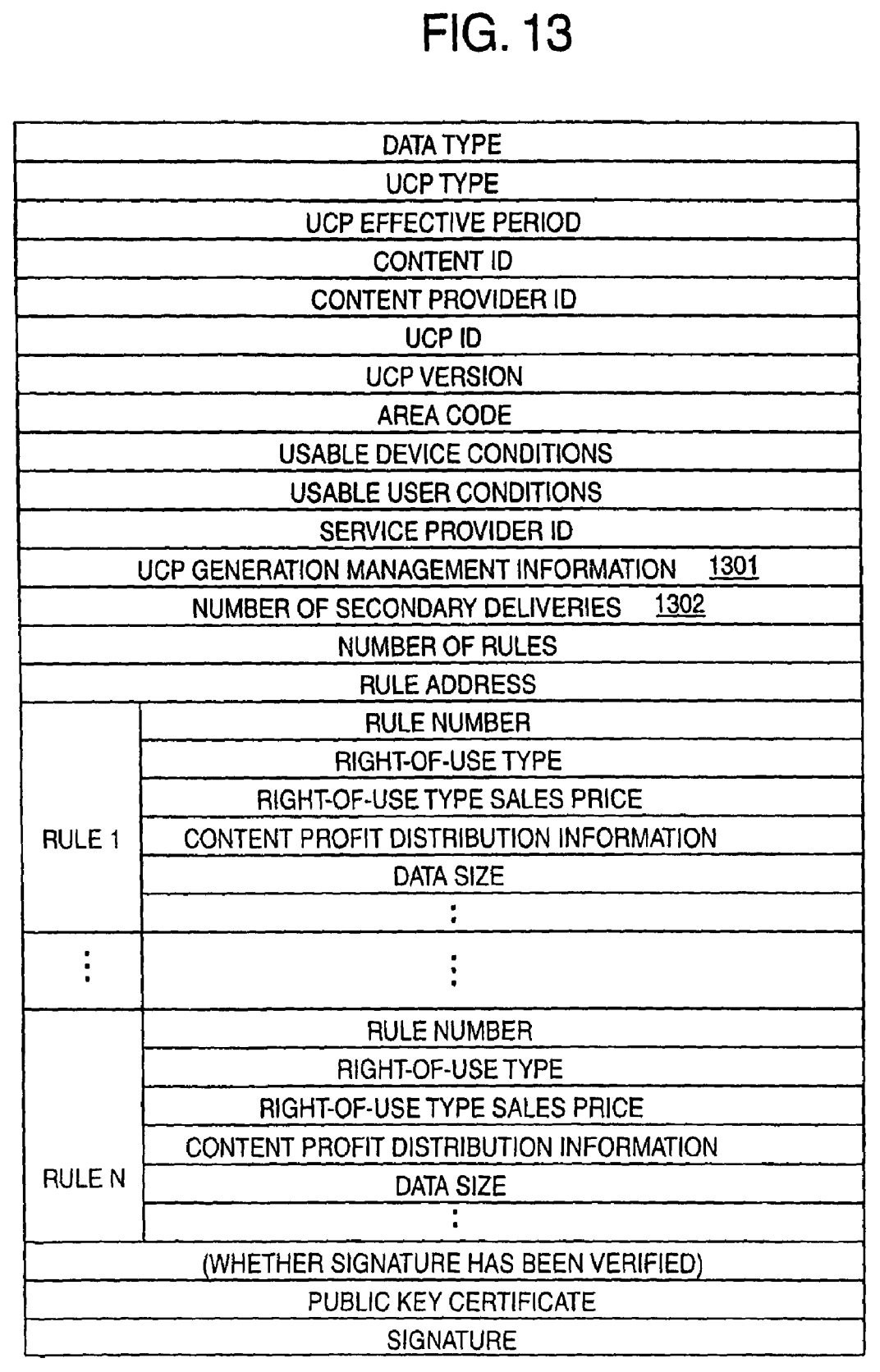

| | |
|---|---|
| DATA TYPE | |
| UCP TYPE | |
| UCP EFFECTIVE PERIOD | |
| CONTENT ID | |
| CONTENT PROVIDER ID | |
| UCP ID | |
| UCP VERSION | |
| AREA CODE | |
| USABLE DEVICE CONDITIONS | |
| USABLE USER CONDITIONS | |
| SERVICE PROVIDER ID | |
| UCP GENERATION MANAGEMENT INFORMATION 1301 | |
| NUMBER OF SECONDARY DELIVERIES 1302 | |
| NUMBER OF RULES | |
| RULE ADDRESS | |
| RULE 1 | RULE NUMBER |
| | RIGHT-OF-USE TYPE |
| | RIGHT-OF-USE TYPE SALES PRICE |
| | CONTENT PROFIT DISTRIBUTION INFORMATION |
| | DATA SIZE |
| | : |
| : | : |
| RULE N | RULE NUMBER |
| | RIGHT-OF-USE TYPE |
| | RIGHT-OF-USE TYPE SALES PRICE |
| | CONTENT PROFIT DISTRIBUTION INFORMATION |
| | DATA SIZE |
| | : |
| (WHETHER SIGNATURE HAS BEEN VERIFIED) | |
| PUBLIC KEY CERTIFICATE | |
| SIGNATURE | |

| | |
|---|---|
| DATA TYPE | |
| PRICE INFORMATION TYPE | |
| PRICE INFORMATION EFFECTIVE PERIOD | |
| CONTENT ID | |
| SERVICE PROVIDER ID | |
| PRICE INFORMATION ID | |
| PRICE INFORMATION VERSION | |
| AREA CODE | |
| USABLE DEVICE CONDITIONS | |
| USABLE USER CONDITIONS | |
| CONTENT PROVIDER ID | |
| UCP ID | |
| NUMBER OF RULES | |
| RULE ADDRESS | |
| RULE 1 | RULE NUMBER |
| | CONTENT PROFIT DISTRIBUTION INFORMATION |
| | PRICE |
| | DATA SIZE |
| | ⋮ |
| ⋮ | ⋮ |
| RULE N | RULE NUMBER |
| | CONTENT PROFIT DISTRIBUTION INFORMATION |
| | PRICE |
| | DATA SIZE |
| | ⋮ |
| (WHETHER SIGNATURE HAS BEEN VERIFIED) | |
| PUBLIC KEY CERTIFICATE | |
| SIGNATURE | |

FIG. 16

| |
|---|
| DATA TYPE |
| UCS TYPE |
| UCS EFFECTIVE PERIOD |
| CONTENT ID |
| ALBUM ID |
| ENCRYPTION PROCESSING UNIT ID |
| USER ID |
| CONTENT PROVIDER ID |
| UCP ID |
| UCP VERSION |
| SERVICE PROVIDER ID |
| PRICE INFORMATION ID |
| PRICE INFORMATION VERSION |
| UCS ID |
| RULE NUMBER OF RIGHT OF READ |
| RIGHT-OF-TYPE NUMBER |
| REMAINING NUMBER OF READS |
| RIGHT-OF-READ EFFECTIVE PERIOD |
| RULE NUMBER OF RIGHT OF COPY |
| RIGHT-OF-USE TYPE NUMBER |
| REMAINING NUMBER OF COPIES |
| UCS GENERATION MANAGEMENT INFORMATION 1601 |
| NUMBER OF UCS SECONDARY DELIVERIES 1602 |
| ENCRYPTION PROCESSING UNIT ID PROCESSING RIGHT OF READ |

| |
|---|
| DATA TYPE |
| ENCRYPTION PROCESSING UNIT ID |
| USER ID (PAYER) |
| CONTENT ID |
| CONTENT PROVIDER ID |
| UCP ID |
| UCP VERSION |
| SERVICE PROVIDER ID |
| PRICE INFORMATION ID |
| PRICE INFORMATION VERSION |
| UCS ID |
| RULE NUMBER |
| PROFIT AMOUNT/PROFIT RATE OF CONTENT PROVIDER |
| PROFIT AMOUNT/PROFIT RATE OF SERVICE PROVIDER |
| PROFIT AMOUNT/PROFIT RATE OF OTHER ORGANIZATIONS |
| UCP GENERAL MANAGEMENT INFORMATION 1702 |
| SETTING INFORMATION DATA SIZE OF CONTENT PROVIDER |
| SETTING INFORMATION OF CONTENT PROVIDER |
| SETTING INFORMATION DATA SIZE OF SERVICE PROVIDER |
| SETTING INFORMATION OF SERVICE PROVIDER |
| RECEIVED DATA |
| SERIAL NUMBER |
| SUPPLIER ID |

FIG. 21

| USER ID | USER DEVICE ID | CONTENT ID | RECEIVE LOG ID | POINT |
|---|---|---|---|---|
| ABC0001 | CDE00021 | AAA001 | BBB001 | 02 |
| ABC0002 | CDE00027 | B05002 | BA8822 | 05 |
| ABC0003 | CDE03211 | CC0812 | BA0214 | 12 |
| · · · | · · · | · · · | · · · | · · · |
| BBC0231 | EED02333 | ABD325 | BAA883 | 07 |

CONTENT USAGE MANAGEMENT SYSTEM METHOD, AND PROGRAM PROVIDING MEDIUM THEREFOR

RELATED APPLICATION DATA

The present application is a divisional of U.S. application Ser. No. 09/804,368, filed on Mar. 12, 2001, now abandoned which claims priority to Japanese applications Nos. P2000-071102 filed Mar. 14, 2000, and P2000-071104 filed Mar. 14, 2000, all of which are incorporated herein by reference to the extent permitted by law.

BACKGROUND OF THE INVENTION

The present invention generally relates to a content usage management system, a content usage management method, and program providing media for providing a program implementing the above-described method. More specifically, the invention relates to a content usage-fee management system and a content usage-fee management method for use in a content transaction system for distributing various items of content information, such as music data, image data, game programs, etc., to users in the form of recording media, such as compact discs (CDs), digital versatile discs (DVDs), etc., or via a network, and for collecting the usage fee charged for the use of the content from the users or providing usage points to the user. The present invention also pertains to a program providing medium for providing a program implementing the above-described content usage-fee management method. More specifically, the invention pertains to a content usage-fee management system and a content usage-fee management method for use in the above-described content transaction system, for managing a usage fee based on a charge recorded in a usage log created by a user, and for preventing illegal transactions and uncollectible transactions by checking for an inappropriately large amount of the usage fee in advance. The invention also relates to a program providing medium for providing a program implementing the above-described content usage-fee management method.

The present invention also relates to a content usage management system and a content usage management method for creating an issue log in which the usage period and the maximum allowable amount of use are set and allowing the settlement of only the charge paid within the usage period so as to reinforce the management of the issue log, and for preventing the distribution of illegal issue logs and the occurrence of illegal transactions caused by the illegal issue logs. The invention also pertains to a program providing medium for providing a program implementing the above-described content usage management method.

Various software data, such as game programs, audio data, image data, document composing programs, etc. (hereinafter referred to as the "content") are distributed via networks, such as the Internet, or storage media, such as DVDs and CDs. Generally, the distribution content can be read in recording/reading apparatuses, such as personal computers (PCs) or game machines, owned by users, or can be stored in recording devices attached to the recording/reading apparatuses, such as hard disks and memory cards formed of, for example, an electrically erasable and programmable read only memory (EEPROM) or a flash memory.

The various types of contents, such as data and programs stored in distribution recording media, for example, DVDs and CDs, or in storage devices, such as memory cards, are directly read from an information apparatus, such as a PC or a game machine, which serves as a reading unit, or are read through an input unit connected to the information apparatus, according to a user's instruction. Such data and programs may be read via a display unit or may be output via a speaker, connected to the information apparatus rather than being directly read from the information apparatus.

Generally, distribution rights of many software contents, such as game programs, music data, and image data, are owned by the creators and sellers of such software contents. Accordingly, a fee is collected when the content is distributed via a network or recording media, such as DVDs or CDs. Alternatively, when the content is distributed via a network, such as the Internet, user information, such as a user's credit card number, is obtained, and the charge for the provision of the content, i.e., the usage fee, is collected.

In distributing the content, security against, for example, illegal copying must be considered. Various systems have been proposed for providing the content data through a network or recording media, such as DVDs or CDs, only to legal users.

One concept for providing the content only to legal users is "superdistribution". In "superdistribution", the content, which is software data, such as game programs, music data, image data, and document composing programs, is distributed while protecting the rights of content providers and content managers. The configuration of "superdistribution" is shown in FIG. 1.

Content providers 101 and 102 respectively provide contents 103 and 104 to a user terminal 105. A content ID, which is an identifier of the content, is added to each of the contents 103 and 104. When the user terminal 105 receives the content 103 or 104 with the content ID, a determination processor 107 determines whether the user terminal 105 is a legal user terminal which is allowed to use the content. This determination is made based on the user ID of the user terminal 105 and the content usage conditions stored in a first storage unit 106. The content usage conditions are usage conditions which have been set by the content provider 101 or 102 for each user. If the determination processor 107 determines based on the content usage conditions that the content can be used, the content usage log is stored in a second storage unit 108 while associating the user ID with the content ID.

The content provider 101 or 102 collects the content usage log stored in the second storage unit 108 of the user terminal 105, and charges the usage fee according to the log. In this manner, in "superdistribution", the content usage conditions are determined for each user, and the usage log is recorded for each content. Thus, the use of the content is restricted to legal users, thereby enabling the collection of the usage fee.

In the above-described configuration of "superdistribution", although the content usage log is recorded, a fee collection system based on the usage log is not clearly indicated, and one of the following conventional methods has to be employed for paying the fee. (1) The user inputs his/her credit card number through the user terminal and sends it to a content provider, a service provider, or a content right-of-use sales center for managing the rights of the use of the content. (2) The user inputs his/her bank account number through the user terminal and sends it to a content provider, a service provider, or a content right-of-use sales center. (3) The user makes a user registration, and also registers a credit card number or a bank account number in a content provider, a service provider, or a content right-of-use sales center. Then, the content provider, the service provider, or the content right-of-use sales center deducts the usage fee based on the registered data.

According to the above-described payment methods, the user's credit card number or bank account number is required.

It is however difficult for the users who do not own a credit card or a bank account to use these methods. Additionally, the amount of money for each transaction of the content is becoming smaller, for example, only a single piece of music may be one unit of transaction in the music distribution. In this case, the fee for the content may be only a small amount of money, such as a few hundred yen or a few thousand yen. By being requested to provide a credit card number or a bank account number for such a small amount of payment, the user is discouraged to employ such a transaction system. This is one of the reasons that the spread of content distribution has been hampered.

Moreover, once the content is distributed to the market, it may be transacted or transferred between users. It is difficult to control the transactions between users, which contributes to the widespread of illegal copies. In transactions between users, in general, nothing is guaranteed for the users providing the content. For example, it is not guaranteed that a user who has received the content will pay to the user who has provided the content.

SUMMARY OF THE INVENTION

Accordingly, in view of the above background, it is an object of the present invention to construct a simple content usage management system and method without using a credit card number or a bank account number in sales for the rights of use of many software contents, such as game programs, music data, and image data, and also to manage the content fee charged to a user based on the amount of usage recorded in a usage log generated by the user and to check for an inappropriately large fee in advance so as to prevent illegal transactions and uncollectible transactions.

It is another object of the present invention to manage an electronic-money issue log in which the maximum allowable amount of money to be spent by the user and the effective usage period are set, and to perform settlement processing only when the payment of the content usage fee has been made within the effective period set in the issue log so as to prevent the distribution of illegal issue logs and the occurrence of illegal transactions made by illegal issue logs.

In order to achieve the above objects, according to one aspect of the present invention, there is provided a content usage-fee management system for performing transaction processing of content which is usable by a user device. The content usage-fee management system includes a service provider for managing a service for the provision of the content. The service provider receives a usage log from the user device, the usage log being created by the user device and including log information containing data of a content usage fee. The service provider compares the content usage fee with a predetermined threshold value so as to determine whether the use of the content is allowed.

In the above-described content usage-fee management system, the service provider may include a user management database in which threshold data is provided for each user, and the service provider may compare the content usage fee with the predetermined threshold value based on the threshold data stored in the user management database.

When the content usage fee exceeding the predetermined threshold is recorded in the usage log received from the user device, the service provider may request a clearing center which manages an electronic money balance of the user device to inquire about the electronic money balance usable by the user device.

The content may be sent to the user device in the form of a secure container including the content encrypted with a content key. The service provider may send the content key to the user device only when it is determined that the use of the content is allowed by comparing the content usage fee contained in the usage log with the predetermined threshold value.

The user device may deduct the content usage fee from an electronic money balance up to an amount of money set in an issue log based on information of a usage control policy (UCP) of the content, the issue log being created by a clearing center which manages the electronic money balance of the user device. The user device may create the usage log containing the deducted usage fee data and may send the usage log to the service provider.

The service provider may create a receive log including the usage fee data based on the usage log received from the user device, and may send the receive log to a clearing center which manages an electronic money balance.

The user device may store threshold data as an upper limit of the usage fee usable by the user device. The threshold data may be checked when the usage log is created, and, when the usage fee is found to exceed the threshold data, the user device may add identification data indicating that the usage fee exceeds the threshold data to the usage log.

Upon receiving the usage log with the identification data, the service provider may request a clearing center which manages an electronic money balance of the user device to inquire about an electronic money balance usable by the user device.

Each of the user device and the service provider may include an encryption processing unit. When the usage log is sent from the user device to the service provider, mutual authentication processing may be performed between the user device and the service provider, and the user device may attach a digital signature to the usage log, and, upon receiving the usage log, the service provider may verify the integrity of the digital signature.

Each of the service provider and the clearing center may include an encryption processing unit. When the receive log is sent from the service provider to the clearing center, mutual authentication processing may be performed between the service provider and the clearing center, and the service provider may attach a digital signature to the receive log, and, upon receiving the receive log, the clearing center may verify the integrity of the digital signature.

According to another aspect of the present invention, there is provided a content usage-fee management method for performing transaction processing of content which is usable by a user device. The content usage-fee management method includes the steps of: receiving, by a service provider for managing a service for the provision of the content, a usage log from the user device, the usage log being created by the user device and including log information containing data of a content usage fee; and determining by the service provider whether the use of the content is allowed by comparing the content usage fee with a predetermined threshold value.

In the aforementioned content usage-fee management method, the service provider may include a user management database in which threshold data is provided for each user, and the service provider may compare the content usage fee with the predetermined threshold value based on the threshold data stored in the user management database.

When the content usage fee exceeding the predetermined threshold is recorded in the usage log received from the user device, the service provider may request a clearing center which manages an electronic money balance of the user device to inquire about the electronic money balance usable by the user device.

The service provider may send the content to the user device in the form of a secure container including the content encrypted with a content key. The service provider may send the content key to the user device only when it is determined that the use of the content is allowed by comparing the content usage fee contained in the usage log with the predetermined threshold value.

The user device may deduct the content usage fee from an electronic money balance up to an amount of money set in an issue log based on information of a UCP of the content, the issue log being created by a clearing center which manages the electronic money balance of the user device. The user device may create the usage log containing the deducted usage fee data and may send the usage log to the service provider.

The service provider may create a receive log including the usage fee data based on the usage log received from the user device, and may send the receive log to a clearing center which manages an electronic money balance.

The user device may store threshold data as an upper limit of the usage fee usable by the user device. The threshold data may be checked when the usage log is created, and, when the usage fee is found to exceed the threshold data, the user device may add identification data indicating that the usage fee exceeds the threshold data to the usage log.

Upon receiving the usage log with the identification data, the service provider may request a clearing center which manages an electronic money balance of the user device to inquire about the electronic money balance usable by the user device.

Each of the user device and the service provider may include an encryption processing unit. When the usage log is sent from the user device to the service provider, mutual authentication processing may be performed between the user device and the service provider, and the user device may attach a digital signature to the usage log, and, upon receiving the usage log, the service provider may verify the integrity of the digital signature.

Each of the service provider and the clearing center may include an encryption processing unit. When the receive log is sent from the service provider to the clearing center, mutual authentication processing may be performed between the service provider and the clearing center, and the service provider may attach a digital signature to the receive log, and, upon receiving the receive log, the clearing center may verify the integrity of the digital signature.

According to still another aspect of the present invention, there is provided a program providing medium for providing a computer program which allows content usage-fee management processing for use in transaction processing of content usable by a user device to run on a computer system. The computer program includes: a step of receiving a usage log from the user device, the usage log being created by the user device and including log information containing data of a content usage fee; and a step of determining whether the use of the content is allowed by comparing the content usage fee with a predetermined threshold value.

According to a further aspect of the present invention, there is provided a content usage management system for performing transaction processing of content which is usable by a user device. The content usage management system includes a clearing center for managing settlement of a content usage fee paid by electronic money of a user, and for sending to the user device an issue log in which an effective period for the payment of the content usage fee by the user device by the electronic money is set. The payment of the content usage fee by the user device is settled only when it is made within the effective period set in the issue log.

The clearing center may include user management data in which user device identifiers and information of the effective period are associated with each other. The clearing center may extract a user device having an issue log which expires soon by searching the user management data, and may send a warning message to the extracted user device to instruct the user device to renew the issue log.

The clearing center may include user management data in which user device identifiers and information of the effective period are associated with each other. The clearing center may extract a user device having an issue log which has expired by searching the user management data, and may send a warning message to the extracted user device to instruct the user device to create a new issue log.

Data of an allowable amount of money may be set in the issue log, and the user device may pay the content usage fee by the electronic money within the effective period and up to the allowable amount of money set in the issue log.

The effective period set in the issue log may be varied according to the allowable amount of money.

The effective period set in the issue log may be varied according to the credibility of a management user of the user device.

The user device may check the effective period set in the issue log when paying the content usage fee by the electronic money. When it is determined that the issue log has expired, the user device may request the clearing center to create a new issue log before creating a usage log for settling the usage fee, and the user device may create the usage log based on the new issue log.

Each of the user device and the clearing center may include an encryption processing unit. When the issue log is sent from the clearing center to the user device, mutual authentication processing may be performed between the user device and the clearing center, and the clearing center may attach a digital signature to the issue log, and, upon receiving the issue log, the user device may verify the integrity of the digital signature.

According to a yet further aspect of the present invention, there is provided a content usage management method for performing transaction processing of content which is usable by a user device. The content usage management method includes the steps of: sending from a clearing center which manages settlement of a content usage fee paid by electronic money of a user to the user device an issue log in which an effective period for the payment of the content usage fee by the user device by the electronic money is set; and settling the payment of the content usage fee paid by the user device only when it is made within the effective period set in the issue log.

In the aforementioned content usage management method, the clearing center may include user management data in which user device identifiers and information of the effective period are associated with each other. The clearing center may extract a user device having an issue log which expires soon by searching the user management data, and may send a warning message to the extracted user device to instruct the user device to renew the issue log.

The clearing center may include user management data in which user device identifiers and information of the effective period are associated with each other. The clearing center may extract a user device having an issue log which has expired by searching the user management data, and may send a warning message to the extracted user device to instruct the user device to create a new issue log.

Data of an allowable amount of money may be set in the issue log. The user device may pay the content usage fee by the electronic money within the effective period and up to the allowable amount of money set in the issue log.

The effective period set in the issue log may be varied according to the allowable amount of money.

The effective period set in the issue log may be varied according to the credibility of a management user of the user device.

The user device may check the effective period set in the issue log when paying the content usage fee by the electronic money. When it is determined that the issue log has expired, the user device may request the clearing center to create a new issue log before creating a usage log for settling the usage fee, and the user device may create the usage log based on the new issue log.

Each of the user device and the clearing center may include an encryption processing unit. When the issue log is sent from the clearing center to the user device, mutual authentication processing may be performed between the user device and the clearing center, and the clearing center may attach a digital signature to the issue log, and, upon receiving the issue log, the user device may verify the integrity of the digital signature.

According to a further aspect of the present invention, there is provided a program providing medium for providing a computer program which allows content usage management processing for use in transaction processing of content usable by a user device to run on a computer system. The computer program includes: a sending step of sending an issue log in which an effective period is set to the user device; and a settlement step of settling the payment of a content usage fee by using electronic money by the user device only when it is made within the effective period set in the issue log.

The program providing media of the present invention are media for providing the above-described computer readable program to a general-purpose computer system which executes various program codes. The media may be storage media, such as CDs, FDs, MO disks, DVDs, or transmission media, such as networks, and the form of the media is not restricted.

In such program providing media, the structural or functional relationship between the predetermined computer program and the providing media for implementing the functions of the computer program on a computer system is defined. In other words, by installing the computer program on a computer system via the recording medium, the functions of the computer program are fulfilled in cooperation with the recording media. In this case, advantages similar to those exhibited by the system and method of the present invention can be offered by the program providing media. Further objects, features and advantages of the present invention will become apparent from the following description of the preferred embodiment with reference to the attached drawings.

BRIEF DESCRIPTION OF THE DRAWINGS

FIG. 13 illustrates a usage control policy (UCP) contained in a secure container in the content transaction system of the present invention;

FIG. 14 illustrates price information contained in a secure container in the content transaction system of the present invention;

FIG. 16 illustrates a usage control status (UCS) recorded in a user device in the distribution of a secure container in the content transaction system of the present invention;

FIG. 17 illustrates the configuration of receive information contained in a receive log issued in the content transaction system of the present invention;

FIG. 21 illustrates an example of a database used in the point provision processing in the distribution of a secure container between user devices in the content transaction system of the present invention;

DESCRIPTION OF THE PREFERRED EMBODIMENTS

The present invention is described in detail below with reference to the accompanying drawings through illustration of a preferred embodiment.

1. Overview of System Configuration

An overview of a content transaction system constructed in accordance with the present invention is discussed below with reference to FIG. 2. The content transaction system includes, as shown in FIG. 2, a user device 220 using information, i.e., the content, such as music data, image data, and various programs, such as games, a service provider 240 for providing the content to the user device 220, a clearing center 260 for executing settlement processing using electronic money according to the use of the content, and an account management institution 280, which is a banking institution, for example, a bank, for processing the flow of real money according to the use of the content.

Figure 1:
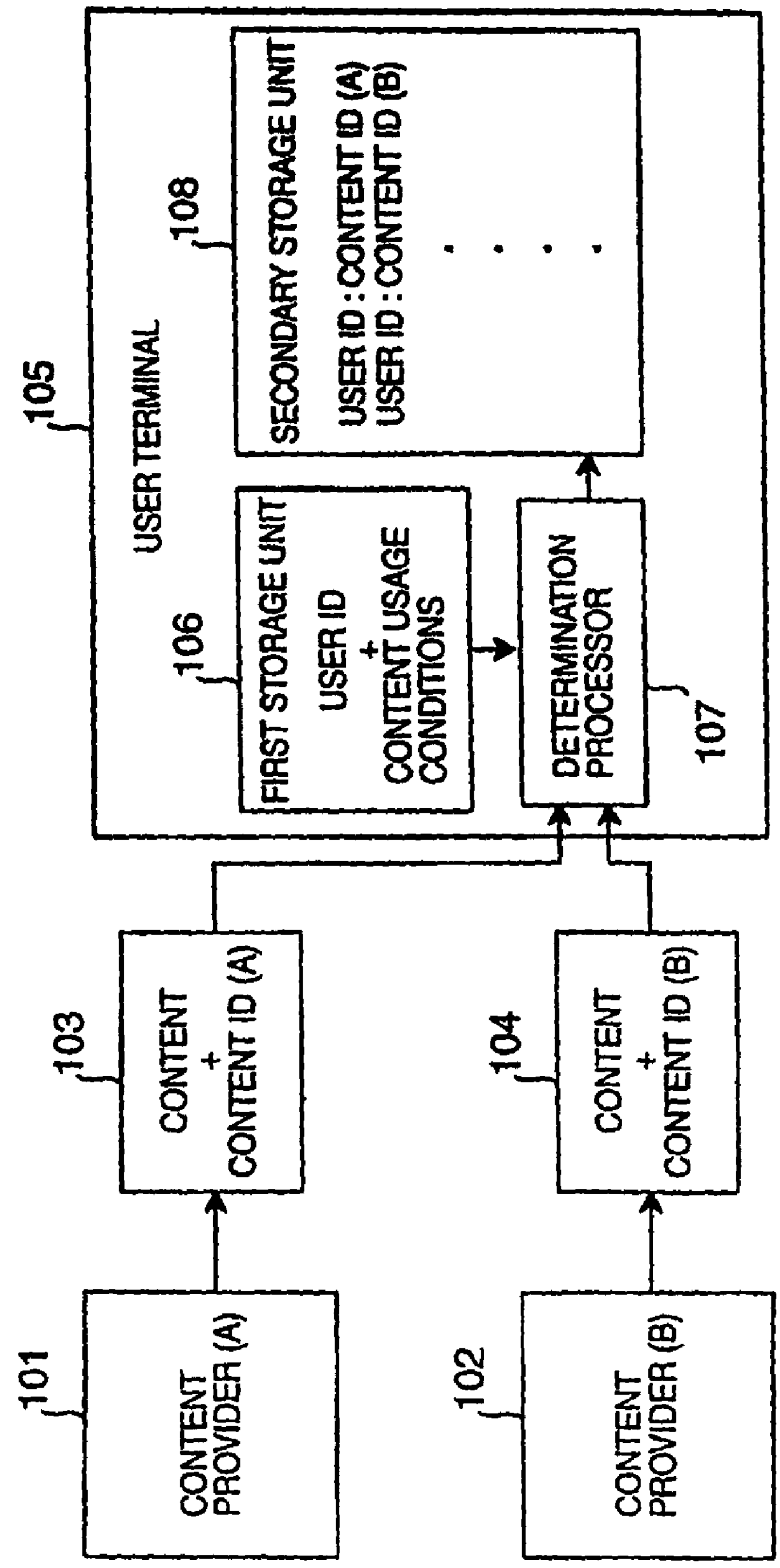
FIG. 1 is a block diagram illustrating the configuration of a conventional superdistribution system.
Figure 2:
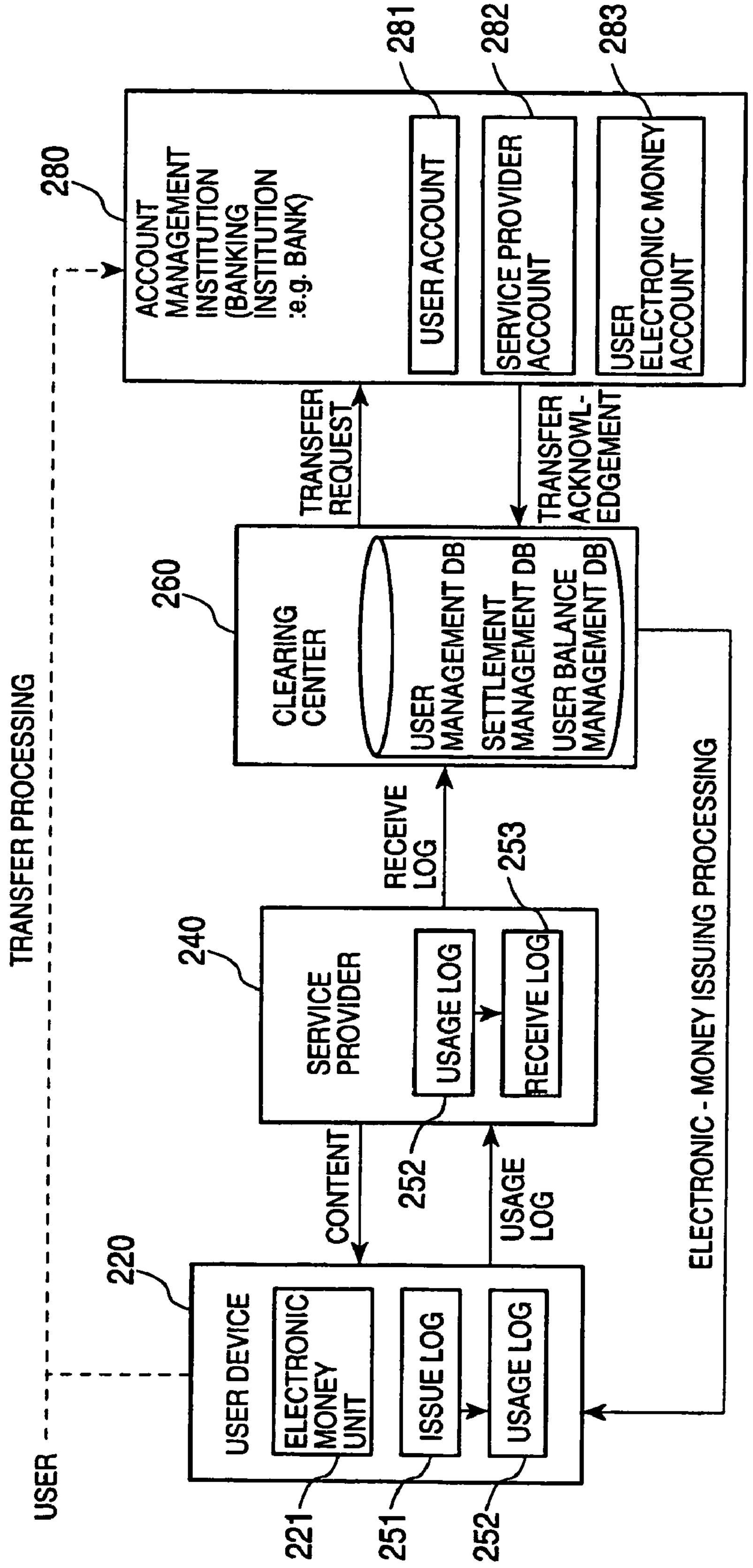
FIG. 2 is a block diagram illustrating an overview of a content transaction system of the present invention.

The configuration of the content transaction system shown in FIG. 2 is an example only, and other types of content transaction systems may be constructed. For example, the service provider 240 may be formed of two providers, such as a content provider for actually creating the content and a service provider for providing distribution services to users, and more specifically, for receiving the content from the content provider and for distributing the content to the user. The clearing center 260 and the account management institution 280 may be combined into one system. Additionally, although in FIG. 2 only one user device 220, service provider 240, clearing center 260, and account management institution 280 are provided, a plurality of each may be provided. As will be discussed in detail later, the content transaction system of the present invention enables content transactions between a plurality of user devices.

In FIG. 2, the user device 220 using the content pays the content usage fee by using an electronic money unit 221. The credit transfer using the electronic money unit 221 is performed as follows. The user who manages the user device 220 opens a user account 281 in the account management institution 280, which is a banking institution, for example, a bank, and deposits money in the user account 281 and transfers it to a user electronic money account 283 under the control of the clearing center 260. Then, the maximum allowable amount of money (electronic money balance) is set in the user electronic money account 283 according to the amount of money transferred from the user. After acknowledging the transfer of the money, the account management institution 280 reports the transferred amount of money (the amount of electronic money) to the clearing center 260, which performs electronic money settlement processing and manages the balance of the user electronic money account 283. The clearing center 260 then manages the usable amount of electronic money to be spent by the user.

The clearing center 260 sends an electronic-money issue log (hereinafter simply referred to as the "issue log") 251 in which the usable amount of money and an identifier of the user device 220 are sent to the user device 220. The user device 220 stores the issue log 251 therein. The issue log 251 is discussed in detail later.

In receiving the content, such as music data, image data, and various programs, such as game programs, from the service provider 240, the user device 220 pays the usage fee for the received content to the service provider 240 by using the electronic money unit 221. In this case, the usage fee is deducted from the balance of the electronic money unit 221. The user device 220 also sends a usage log 252 including usage information, such as the information about the issue log 251, the content usage fee, and a receiver for the content usage fee, to the service provider 240.

The service provider 240 verifies the usage log 252 received from the user device 220. Based on the usage log 252, the service provider 240 creates a receive log 253 including receive information, such as the sender of the content usage fee and the received date, and sends the receive log 253 to the clearing center 260. In this case, the clearing center 260 sends transfer information (distribution information) concerning the settlement processing of real money to the account management institution 280 as a transfer request. Based on the transfer request from the clearing center 260, the account management institution 280 performs money transfer between a service provider account 282 and the user electronic money account 283.

For simple representation, in FIG. 2, only the user account 281 of the user who manages the user device 220, the service provider account 282, and the user electronic money account 283 are shown. However, the account management institution 280 may possess other accounts of, for example, the content creators and the content sales stores, in which case, money transfer may be performed for each account according to a predetermined setting. A technique for distributing the content-fee transfer setting information with the content is described below.

2. User Device

Figure 3:
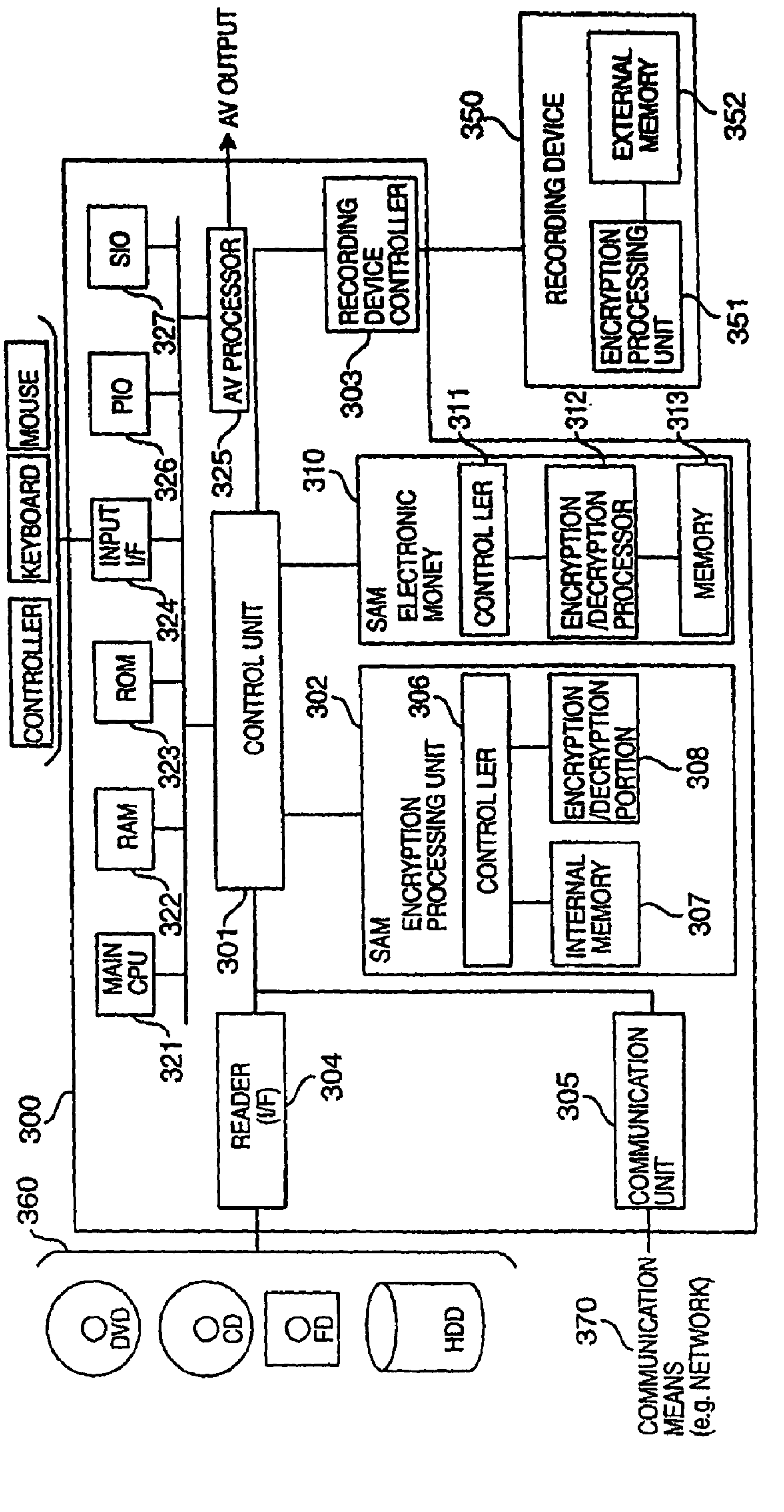
FIG. 3 is a block diagram illustrating the configuration of a user device in the content transaction system of the present invention.

FIG. 3 is a block diagram illustrating an example of a user device used in the content transaction system of the present invention. A user device 300 has a recording device 350 for storing the content therein.

The user device 300 is formed by, for example, a PC or a game machine. The user device 300 includes the following elements. A control unit 301 performs the overall control operation, for example, the control operation for communicating with the recording device 350 when performing encryption processing in the user device 300. An encryption processing unit 302 performs the overall encryption processing. A recording device controller 303 performs authentication processing with the recording device 350 to be connected to the user device 300, and reads and writes data. A reader 304 reads data from media 360, such as a DVD. A communication unit 305 sends and receives data to and from external sources.

The user device 300 downloads content data into the recording device 350 and reads content data from the recording device 350 under the control of the control unit 301. The recording device 350 contains an external memory 352, such as a recording medium, preferably the one detachable from the user device 300, for example, a memory card, a non-volatile memory formed of an EEPROM or a flash memory, a hard disk, or a battery-operated RAM.

The user device 300 also includes the reader 304, which serves as an interface for receiving the content data stored in the recording media shown at the left side of FIG. 3, such as a DVD, a CD, a floppy disk (FD), a hard disk drive (HDD), and the communication unit 305, which serves as an interface for receiving the content data distributed through a network, such as the Internet. Thus, the user device 300 receives the content from external sources.

The user device 300 has a built-in electronic money unit 310 or an external electronic money unit 310 detachable from the user device 300, and stores usage information and the balance of the electronic money in a memory 313 formed of, for example, a flash memory or an EEPROM. External data to be sent to the electronic money unit 310 are the personal ID of the user possessing the electronic money, the amount of money used, etc., which are then encrypted and input into the electronic money unit 310. An encryption processor 312 encrypts the above-described data, and a controller 311 controls data input/output and the processing executed by the encryption processor 312. The electronic money unit 310 is formed as a secure application module (SAM), which is, for example, a security IC card.

The encryption processing unit 302 is also formed of a SAM. In the example shown in FIG. 3, although the SAM of the encryption processing unit 302 and the SAM of the electronic money unit 310 are separately provided, they may be formed into one module. The encryption processing unit 302 performs authentication processing, encryption processing, decryption processing, and data verification processing when downloading the content data received from an external source via the reader 304 or the communication unit 305 into the recording device 350, or when reading the content data from the recording device 350 and executing it. The encryption processing unit 302 also receives a log issued as the payment information of the content usage fee, generates a usage log, and executes authentication processing, encryption processing, and data verification processing required for sending the data. The encryption processing unit 302 is formed of a controller 306 for controlling the entire encryption processing unit 302, an internal memory 307 for storing encryption keys, which is protected from easy access from external sources, and an encryption/decryption portion 308 for performing encryption and decryption processing, generating and verifying authentication data, and generating random numbers.

As stated above, the encryption processing unit 302 and the electronic money unit 310 are each formed of a SAM, thereby preventing data from being illegally overwritten. In the encryption processing unit 302 and the electronic money unit 310, the ID of the user device 300, the balance of the electronic money, the electronic-money issue log (discussed later), and various key information used for authentication processing and encryption processing are stored as highly secure information. As described below, the maximum allowable amount of electronic money is recorded in the electronic-money issue log, and is stored in the user device 300.

The control unit 301 performs intermediary processing for authentication between the encryption processing unit 302 and a service provider connected to the user device 300 through the communication unit 305 via connection means 370, and intermediary control for decrypting a content key encrypted with a session key performed by the encryption processing unit 302. The control unit 301 also sends an initialization command to the recording device 350 via the recording device controller 303 when the recording device 350 is attached to the user device 300. The control unit 301 also performs intermediary processing for authentication, signature verification, encryption, and decryption, conducted between the encryption/decryption portion 308 of the encryption processing unit 302 and an encryption processing unit 351 of the recording device 350.

The controller 306 of the encryption processing unit 302 controls the overall encryption processing, such as authentication processing and encryption/decryption processing, executed in the user device 300. For example, the controller 306 controls authentication processing between the user device 300 and a service provider and between the user device 300 and the recording device 350, various processing performed by the encryption/decryption portion 308 of the encryption processing unit 302, for example, content-key (content encryption key) replacement processing, and giving an instruction to encrypt downloaded or read content data.

The internal memory 307 stores key data required for various processing, such as authentication processing and decryption processing, executed in the user device 300, and ID data of the user device 300. The ID data of the user device 300 is used for, for example, authentication processing with a service provider.

By using the key data stored in the internal memory 307, the encryption/decryption portion 308 executes processing, such as authentication processing, encryption processing, decryption processing, data verification, and random-number generation, when performing data transfer for receiving content data from external sources or sending the usage fee as the electronic money.

The internal memory 307 of the encryption processing unit 302 stores highly secure information, such as encryption keys. It is thus necessary to protect the internal memory 307 from illegal access from external sources. Accordingly, the internal memory 307 is formed of a multiple-layered semiconductor chip, which is difficult to access from external sources. In the multiple-layered structure, the internal memory 307 is sandwiched between dummy layers, such as aluminum layers, or disposed at the bottommost layer. The internal memory 307 is also formed as a tamper-resistant memory having characteristics such as a small range of operating voltage/frequency, which makes it difficult to illegally read data from external sources.

In addition to the above-described encryption processing functions, the user device 300 is provided with a main central processing unit (CPU) 321, a RAM 322, a ROM 323, an input interface 324, an audio/visual (AV) processor 325, a parallel input/output (PIO) interface 326, and a serial input/output (SIO) interface 327.

The main CPU 321, the RAM 322, and the ROM 323 serve as a control system of the user device 300, and mainly as a reading processor for reading data decoded in the encryption processing unit 302. For example, the main CPU 321 controls, under the control of the control unit 301, the reading and the execution of the decoded content data received from the recording device 350 when outputting the content to the AV processor 325.

The RAM 322 serves as a main storage memory for various processing executed by the main CPU 321, and is used as a work area for the processing executed by the main CPU 321. The ROM 323 stores the basic program for running an operating system (OS) by the main CPU 321.

The AV processor 325 has data compression/decompression mechanisms, for example, an MPEG2 decoder, an adaptive transform acoustic coding (ATRAC) decoder, an MPEG1 audio-layer-3 (MP3) decoder, and executes processing for outputting data to a data output device (not shown), such as a display device or a speaker, attached or connected to the user device 300.

The input interface 324 outputs data received from various input means connected to the user device 300, such as a controller, a keyboard, and a mouse, to the main CPU 321. The main CPU 321 executes processing according to a user's instruction input through a controller based on, for example, a game program in execution.

The PIO interface 326 and the SIO interface 327 are used as interfaces for connecting storage devices, such as memory cards and game cartridges, and portable electronic terminals.

The recording device 350 is a recording medium detachable from the user device 300, and is formed of, for example, a memory card. As stated above, the recording device 350 contains the encryption processing unit 351 and the external memory 352.

The encryption processing unit 351 executes mutual authentication processing, encryption processing, decryption processing, and data verification processing, between the user device 300 and the recording device 350 when downloading the content data from the user device 300 and reading out the content data to the recording device 350. As in the encryption processing unit 302 of the user device 300, the encryption processing unit 351 is provided with a controller, an internal memory, and an encryption/decryption portion. As stated above, the external memory 352 is formed of a non-volatile memory, such as an EEPROM or a flash memory, a hard disk, or a battery-operated RAM, and stores the content data and content keys.

A service provider for providing many types of software content, such as game programs, music data, and image data, encrypts the content and provides it via recording media, such as DVDs and CDs, or via a network. The usage fee for the content is paid in the form of electronic money via communication means, such as a network.

3. Settlement Processing in Content Transaction System 3-1 Overview

Figure 4:
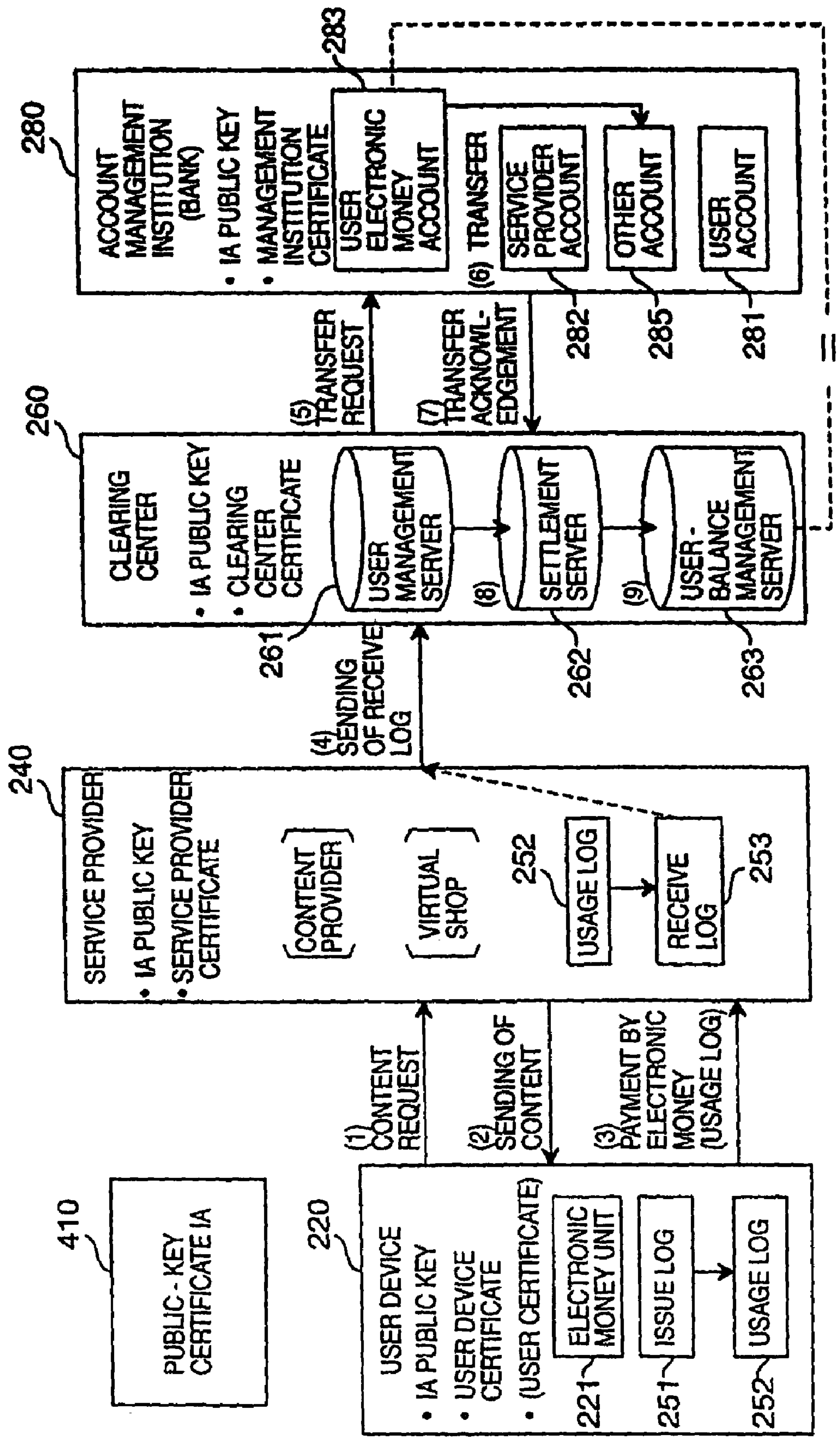
FIG. 4 is a block diagram illustrating the distribution of the content and log information in the content transaction system of the present invention.

FIG. 4 illustrates data transfer performed upon the settlement of the content usage fee by the user device 220, the service provider 240, the clearing center 260, and the account management institution 280 of the content transaction system constructed in accordance with the present invention.

Before performing the above-described data transfer, data is basically encrypted for preventing the leakage of the content. Mutual authentication is also performed between the sender and the receiver, and only when mutual authentication is established, electronic-money payment data is sent as encrypted data. The authentication processing is discussed later.

A public-key certificate issuing authority (IA) 410 shown in FIG. 4 is a third party for certifying public keys used for sending and receiving ciphertext among the user device 220, the service provider 240, the clearing center 260, and the account management institution 280. The public-key certificate IA 410 serves as a certifying authority for issuing the certificates of the public keys.

As shown in FIG. 4, the user device 220, the service provider 240, the clearing center 260, and the account management institution 280 each have a public key issued by the public-key certificate IA 410. The user device 220 also receives, from the public-key certificate IA 410, a user device certificate in which public key information unique to the user device 220 is recorded, and a user certificate in which public key information unique to the user of the user device 220 is recorded, and stores such certificates therein.

The public key certificate is for maintaining the reliability of encryption processing in the public key cryptosystem. In response to the user device ID and the public key submitted from the user device 220, the public-key certificate IA 410 adds information, such as the ID and the effective period of the public-key certificate IA 410, and also attaches the signature of the public-key certificate IA 410, thereby creating a public key certificate. Alternatively, the user device 220 submits the user device ID and the public key to a registration authority (RA) owned by a service provider, and applies for registration. Then, the RA requests the public-key certificate IA 410 to issue a public key certificate, and the public-key certificate IA 410 sends the issued public key certificate to the user device 220.

Figure 5:
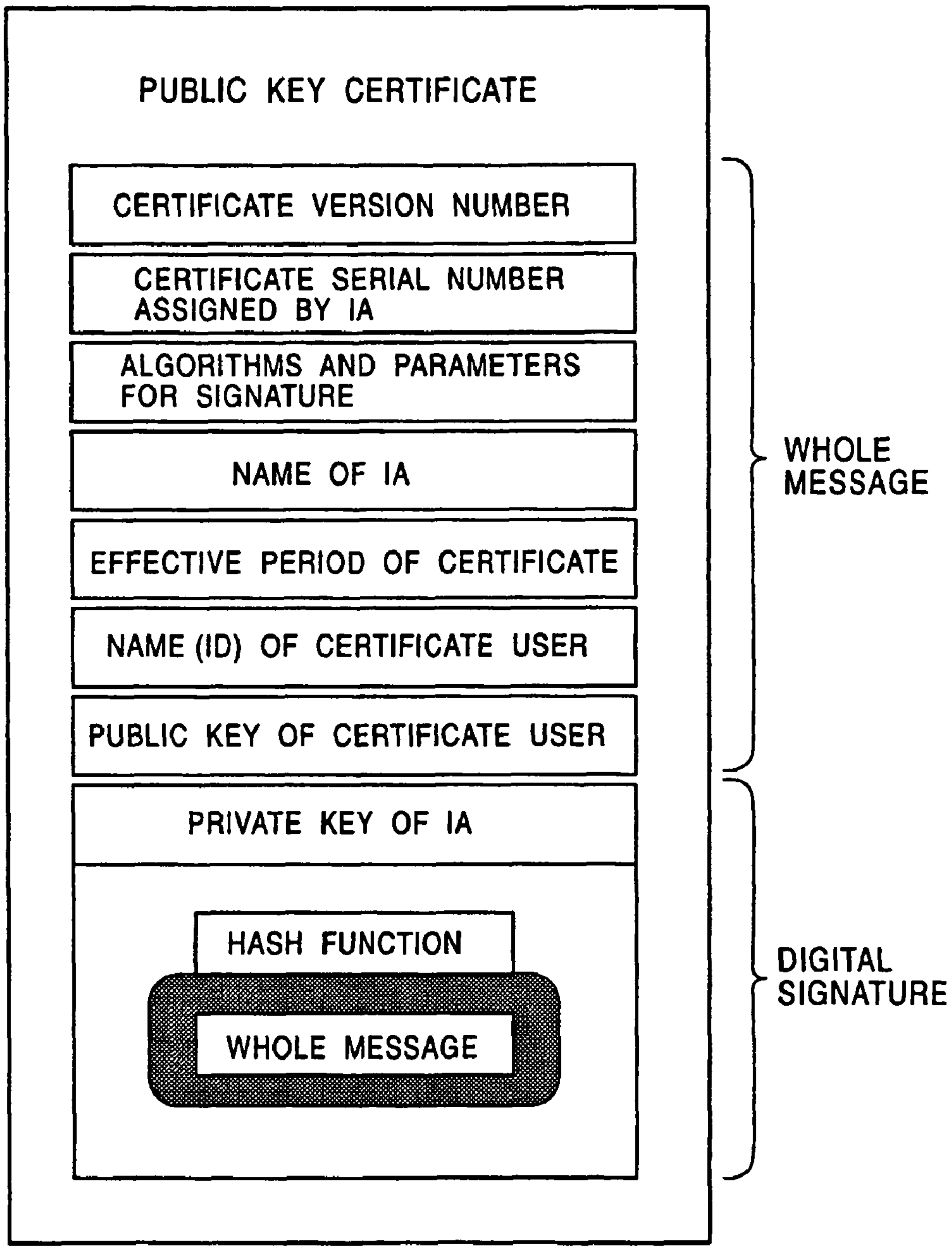
FIG. 5 illustrates the format of a public key certificate used in mutual authentication processing in the content transaction system of the present invention.

An example of the public key certificate is shown in FIG. 5. The public key includes, as shown in FIG. 5, the certificate version number, the certificate serial number assigned to the certificate user by the public-key certificate IA 410, the algorithms and parameters used for the digital signature, the name of the public-key certificate IA 410, the effective period of the certificate, the name (user ID) of the certificate user, and the public key and the digital signature of the certificate user.

The digital signature is created as follows. Hash values of all the items of the public key certificate, i.e., the certificate version number, the certificate serial number, the algorithms and parameters used for the digital signature, the name of the public-key certificate IA 410, the certificate effective period, and the name and the public key of the certificate user are generated by using a hash function. Then, the digital signature is created from the hash values by using the private key of the public-key certificate IA 410.

The public-key certificate IA 410 issues the public key certificate shown in FIG. 5, updates public key certificates which have expired, and also creates, manages, and distributes a revocation list for revoking illegal users. The public-key certificate IA 410 also creates the public key and the private key if necessary.

When using the above-described public key certificate, the user verifies the digital signature of the public key certificate by using the public key of the public-key certificate IA 410 (IA public key) possessed by the user, and then extracts the public key from the public key certificate. Accordingly, it is necessary that all the users for the public key certificate, that is, the user device 220, the service provider 240, the clearing center 260, and the account management institution 280 in the example shown in FIG. 4, possess the common public key of the public-key certificate IA 410.

Referring back to FIG. 4, the user device 220 possesses the IA public key, the user device certificate, and the user certificate. The service provider 240 has the IA public key and the service provider certificate. The clearing center 260 has the IA public key and the clearing center certificate. The account management institution 280 possesses the IA public key and the account management institution certificate. Among the user device 220, the service provider 240, the clearing center 260, and the account management institution 280, the payment of the content usage fee and the transfer of the settlement data are performed according to the public key cryptosystem or the common key cryptosystem using the corresponding certificate. The known secure socket layer (SSL) technique may be used for communicating with the account management institution 280.

3-2 Various Logs Used in Content Fee Processing

In the content transaction system of the present invention, information for the settlement processing of the content usage fee, and more specifically, various log information including transaction information about the content usage, is transferred among the user device 220, the service provider 240, and the clearing center 260. More specifically, the log information includes the issue log 251 possessed by the user device 220, the usage log 252 generated by the user device 220 when paying the content usage fee and sent to the service provider 240, and the receive log 253 generated by the service provider 240 based on the usage log 252 and sent to the clearing center 260. Details of the individual logs are discussed below with reference to FIG. 6.

Figure 6:
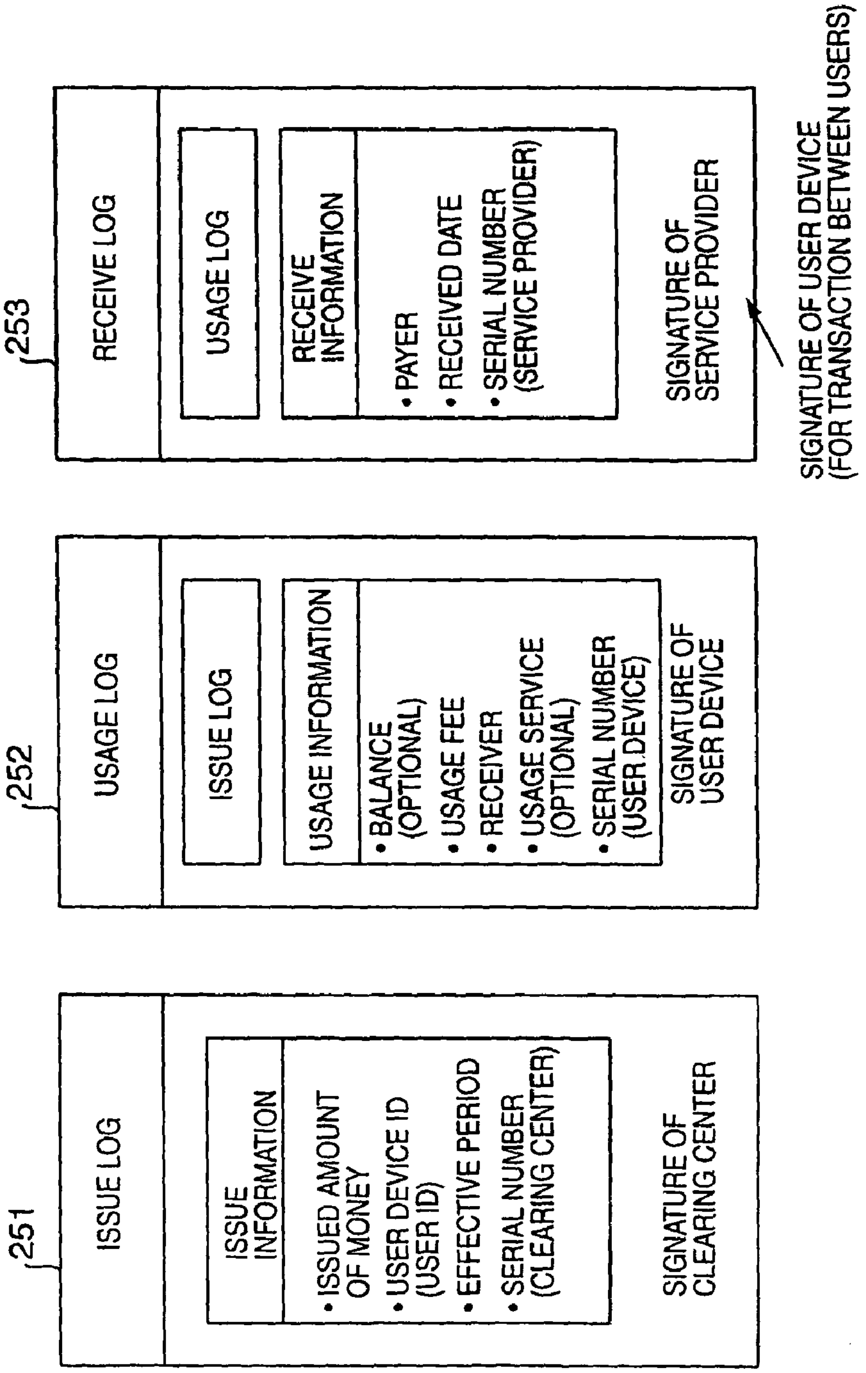
FIG. 6 illustrates configurations of an issue log, a usage log, and a receive log used in the content transaction system of the present invention.

The issue log 251 possessed by the user device 220 is electronic money information issued by the clearing center 260 shown in FIG. 2. The digital signature of the issuer (for example, the clearing center 260) of the issue log 251 is added to the information recorded in the issue log 251, thereby preventing the recorded data in the issue log 251 from being tampered with. In the issue log 251, as shown in FIG. 6, the issued amount of money equivalent to the total usable amount of electronic money, the user device, the user device ID or the user ID, the effective period, and the serial number managed by the issuer of the issue log 251 (for example, the clearing center 260) are recorded.

The issue log 251 is issued by the issuer (clearing center 260) in response to a request from the user. For example, the user goes to a bank which has a management account of the clearing center 260 and transfers an amount of money affordable by the user or transfers money by using a credit card. The clearing center 260 receives transfer information from the bank and acknowledges it, and then sets the amount of electronic money equivalent to the amount of transferred money in the issue log 251. Alternatively, the user may directly request the clearing center 260 to issue the issue log 251 and may request the bank to transfer money from the user account to the management account of the clearing center 260. Then, the clearing center 260 may make a transfer request to the bank, and may issue the issue log 251 in which the usable amount of money is set according to the amount of transferred money.

The user device 220 pays the content usage fee by using the electronic money unit 221 up to the usable amount of money set in the issue log 251 issued by the clearing center 260. In making payment by using the electronic money unit 221, the electronic money balance recorded in the electronic money unit 221 (SAM) is checked. If the balance is less than the payment amount, payment using the electronic money unit 221 cannot be made. Only when the balance is equal to or greater than the payment amount, can payment be made with electronic money. Upon payment processing, the electronic money balance recorded in the electronic money unit 221 is updated.

When all of the money issued in the issue log 251 is spent, i.e., when the electronic money balance based on the issue log 251 becomes zero, the user is able to request the clearing center 260 to issue a new issue log 251 by transferring a predetermined amount of money to the management account of the clearing center 260. Alternatively, even if the electronic money balance does not become zero, the user may request the clearing center 260 to issue an additional issue log 251 by transferring money.

The issuing of an additional log by the clearing center 260 is discussed below. First, the user requests the clearing center 260 to issue an additional log by transferring an additional amount of money to the management account of the clearing center 260. The clearing center 260 then requests the user device 220 to send the "old issue log" and the electronic money balance data recorded in the electronic money unit 221 based on the "old issue log". Upon receiving the above data, the clearing center 260 sets the total amount of money consisting of the newly transferred money from the user and the electronic money balance based on the "old issue log" received from the user in the "new issue log", and then sends the "new issue log" to the user device 220.

In the aforementioned processing, sometimes the electronic money balance based on the "old issue log" received from the user does not coincide with the balance data of a user-balance management server 263 within the clearing center 260. This is because the settlement processing of the receive log 252 is sometimes behind. In this case, the clearing center 260 additionally issues a second issue log while managing the user ID, the issue log serial number, and the balances of the "old issue log" and the "new issue log" in the user-balance management server 263.

For example, the issued amount of money of the "old issue log" is 10,000 yen. Eight thousand yen has been spent, and the electronic money balance of the user device 220 is 2,000 yen. In the clearing center 260, however, only the receive log for 5,000 yen has been settled, and 3,000 yen remains unsettled. Then, the user device 220 requests the clearing center 260 to issue an additional issue log of 20,000 yen.

At this point, when the clearing center 260 issues the "new issue log" of 20,000 yen, the user log data of the user-balance management server 263 becomes [old issue log: user ID: balance 5,000 yen] and [new issue log: user ID: balance 20,000 yen]. After the clearing center 260 settles the receive log 252 of the uncollected 3,000 yen, the user log data becomes [old issue log: user ID: balance 2,000 yen] and [new issue log: user ID: balance 20,000 yen]. It should be noted that the type of log, i.e., the old log or the new log, can be determined by the issue log serial number. Alternatively, when receiving the electronic-money balance data based on the "old issue log" received from the user, the clearing center 260 may set the uncollected balance (in this example, 3,000 yen) as the uncollected balance data, and perform settlement processing.

After the user device 220 has paid the content usage fee by using the electronic money unit 221, the user device 220 generates the usage log 252 and sends it to the service provider 240. In the usage log 252, not only the issue log information possessed by the user device 220, but also usage information, such as the usage amount of money paid for the content, the receiver of the paid money, and serial number managed by the user device 200 are recorded. The current user electronic-money balance information and the usage service information may also be added. The digital signature of the user device 220 is attached to the above-described information, and the usage log 252 is sent to the service provider 240. The user device 220 sends the usage log 252 to the service provider 240 and also stores it in a storage device outside the SAM.

The service provider 240 then creates the receive log 253 based on the usage log 252 and sends it to the clearing center 260 which performs settlement processing of the electronic money. The receive log 253 contains, as shown in FIG. 6, the usage log information, and receive log information, such as the payer information, the received date, and the serial number managed by the payment receiver (in this example, the service provider 240). The digital signature of the payment receiver (service provider 240) is added to the above-described information, and the receive log 253 is sent from the service provider 240 to the clearing center 260. The service provider 240 sends the receive log 253 to the clearing center 260, and also stores it in a storage device outside the SAM.

If a transaction is made between users, the signature of the user who has provided the content is attached to the receive log 253 rather than the signature of the service provider 240. Content transactions between users (secondary distribution) are discussed below.

As has been discussed above and as is shown in FIG. 4, the usage log 252 is sent from the user device 220 (creator) to the service provider 240, and is also stored in the user device 220. The receive log 253 is sent from the service provider 240 (creator) to the clearing center 260, and is also stored in the service provider 240. The reason for storing the usage log 252 and the receive log 253 in the user device 220 and the service provider 240, respectively, is to check the logs 252 and 253 in case a transfer report or a payment report is made. The usage log 252 and the receive log 253 are not stored in the SAMs of the user device 220 and the service provider 240, respectively, because the identical logs are stored in the clearing center 260, and the log information can be extracted from the identical logs from the clearing center 260 even if the original logs are tampered with.

3-3 Digital Signature

The digital signatures attached to the individual logs are briefly discussed below. In the following example, the Digital Encryption Standard (DES) according to a common key cryptosystem is employed for creating the digital signatures. In the present invention, the other encryption standards of the common key cryptosystem, such as the Fast Data Encipherment Algorithm (FEAL) developed by NTT or Advanced Encryption Standard (AES) developed by NIST, may be employed.

Figure 7:
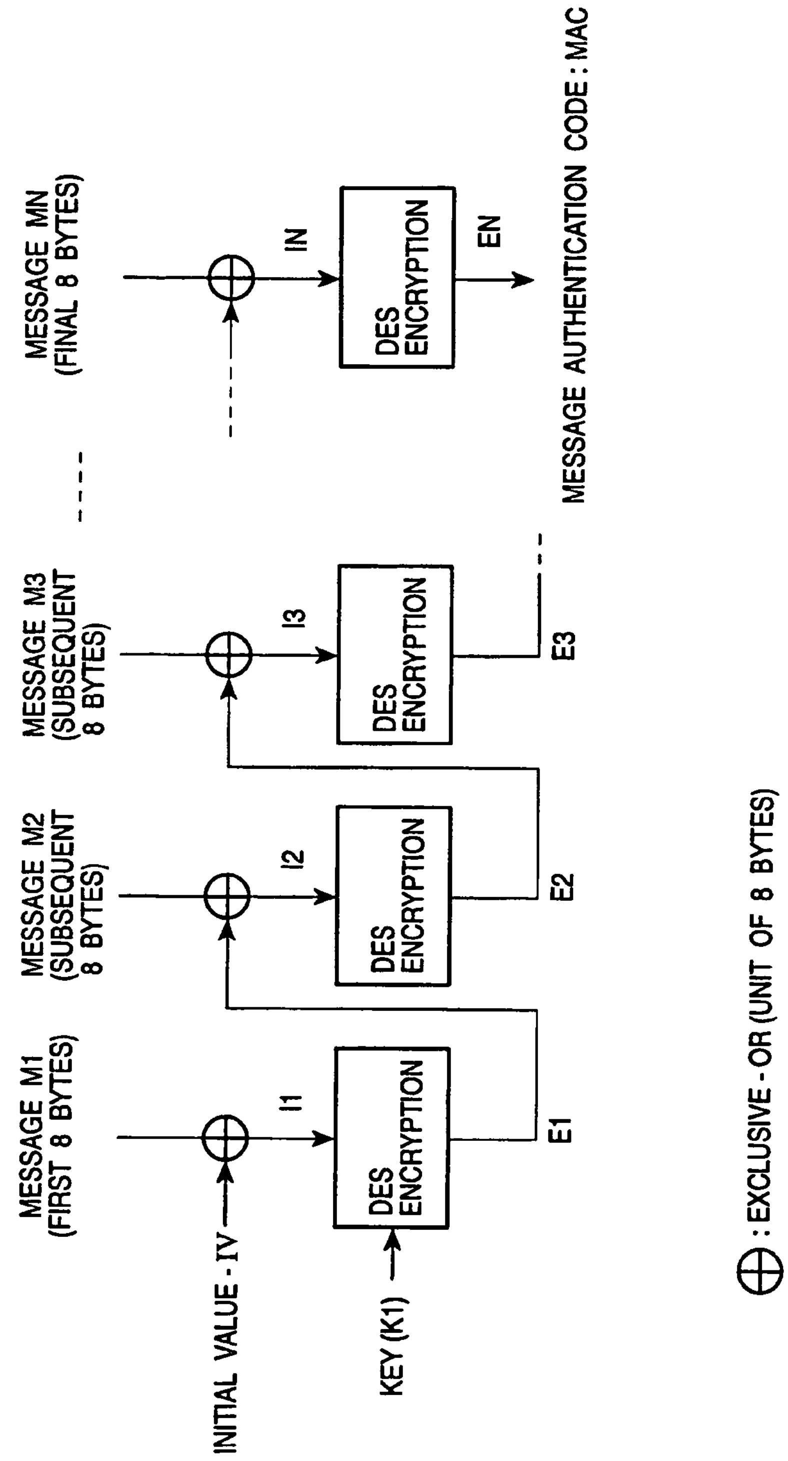
FIG. 7 illustrates signature creation processing which may be employed in the content transaction system of the present invention.

A typical method for generating the digital signatures using DES is described below with reference to FIG. 7. Before the creation of the digital signatures, an original message is divided into eight-byte units (divided message units are hereinafter indicated by M1, M2, . . . , and MN). Then, an exclusive-OR is executed on the initial value (hereinafter referred to as the "IV") and M1, and the resulting value is indicated by I1. Then, I1 is input into a DES encryption unit and is encrypted by using a key (hereinafter indicated by "K1"), and the resulting output is designated with E1. Subsequently, an exclusive-OR is executed on E1 and M2, and the resulting output I2 is input into another DES encryption unit and is encrypted by using K1, thereby outputting E2. Thereafter, the above-mentioned encryption processing is performed on all the message units, and the final output EN is used as the digital signature. Generally, the final value is referred to as Message Authentication Code (MAC), and is used for checking whether the message has been tampered with. The method for concatenating the ciphertext (message units) as discussed above is referred to as the Cipher Block Chaining (CBC) mode. When verifying the MAC value, the verifier generates a MAC value by the same method as the one when the original MAC value is created. When the two MAC values coincide with each other, the original value is verified.

The issue log 251, the usage log 252, and the receive log 253 used in the content transaction system of the present invention include the various types of information as described with reference to FIG. 6, and such information is to be verified. These data or data generated based on the above information are input into the DES encryption units shown in FIG. 7 so as to create digital signatures.

Figure 8:
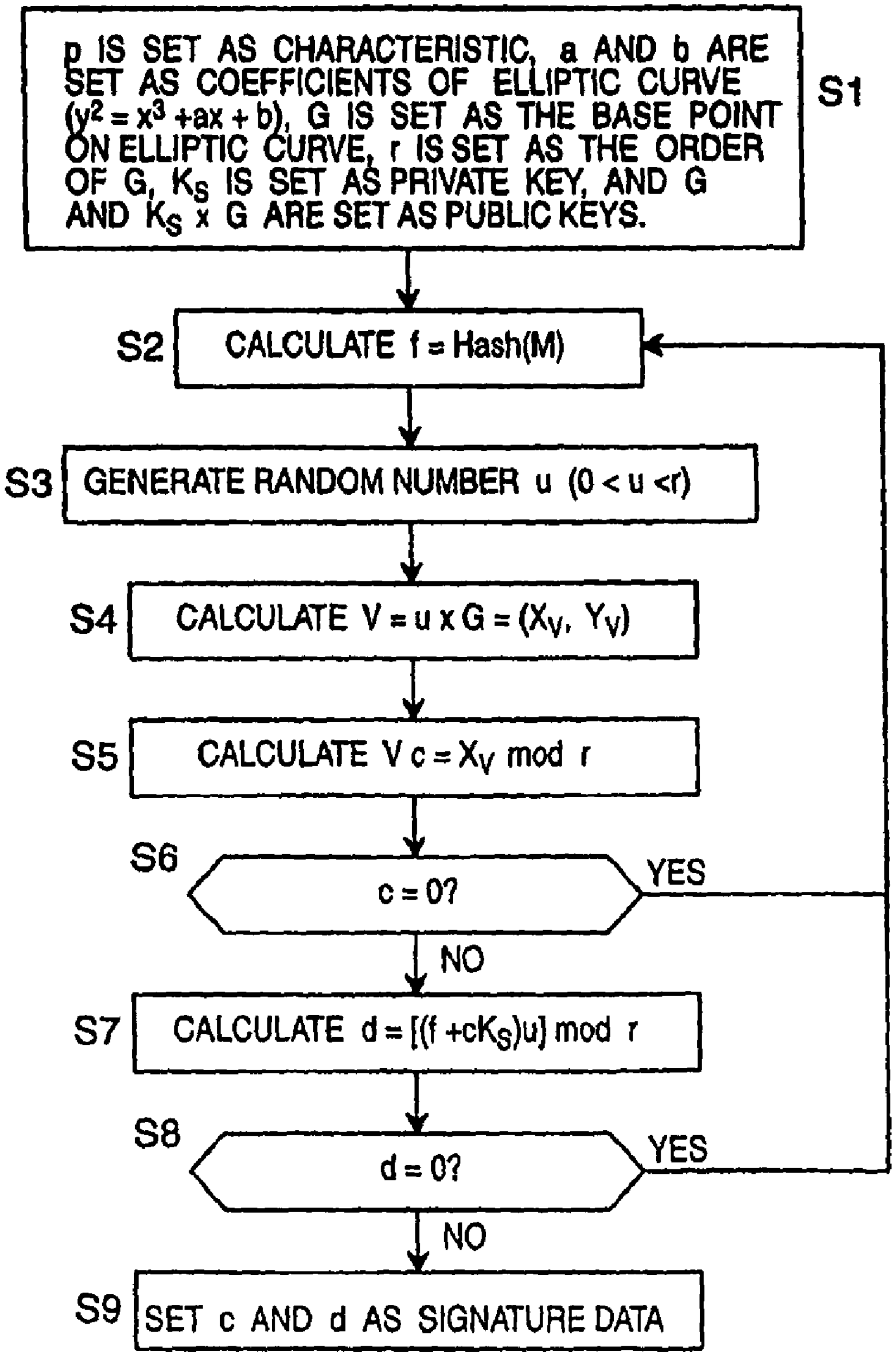
FIG. 8 is a flow chart illustrating signature creation processing which may be employed in the content transaction system of the present invention.

Then, a digital-signature creating method using the public key cryptosystem is discussed below with reference to FIG. 8. FIG. 8 is a flow chart illustrating the process for creating a digital signature using the Elliptic Curve Digital Signature Algorithm (EC-DSA) (IEEE P1363/D3). In this example, the Elliptic Curve Cryptosystem (ECC) is employed as the public key cryptosystem. In the present invention, other types of public key cryptosystems, such as the Rivest-Shamir-Adleman (RSA) scheme (ANSI X9.31), may be employed.

In step S1, p is set as the characteristic, a and b are set as coefficients of an elliptic curve (elliptic curve: y2=x3+ax+b), G is set as the base point on the elliptic curve, r is set as the order of G, Ks is set as the private key ($0<Ks<r$), and G and Ks (G are determined as public keys. Then, in step S2, the hash value of message M is calculated and is determined as f=Hash (M).

A technique for determining the hash value by using the hash function is as follows. According to the hash function, a message is input and is compressed into data having a predetermined bit length, which is then output as the hash value. It is difficult to predict the input data from the hash value (output value), and when one bit of the input data changes, many bits of the hash value change. It is also difficult to search for the different input data having the same hash value. As the hash function, MD4, MD5, or SHA-1 may be used. Or DES-CBC may be employed, in which case, the final output value, i.e., the MAC value (check value: corresponding to ICV), becomes the hash value.

Subsequently, in step S3, a random number u ($0<u<r$) is generated. In step S4, coordinates V (Xv, Yv) obtained by multiplying the base point G with the random number u are determined. The addition and two-to-the-power-of-i calculation on the elliptic curve are defined as follows.

It is determined that P=(Xa, Ya), Q=(Xb, Yb), R=(Xc, Yc)=P+Q.

When P (Q(addition), $$Xc=(2-Xa-Xb$$

$$Yc=(((Xa-Xc)-Ya$$

$$(=(Yb-Ya)/(Xb-Xa).$$

When P=Q (two-to-the-power-of-i calculation), $$Xc=(2-2Xa$$

$$Yc=(((Xa-Xc)-Ya$$

$$(=(3(Xa)2+a)/(2Ya).$$

By using the above-described definitions, the coordinates V(G(u) are calculated. The simplest calculation method though the calculation speed is slow is as follows. G, 2 (G, 4 (G, and so on, are calculated, and u is binarized, and the values 2i (G (multiplication of G with two to the power of i (i indicates the bit position counting from the least significant bit (LSB) of u)) corresponding to places of the binarized value of u having a value "1" are added.

In step S5, c=Xv mod r is calculated. It is then determined in step S6 whether c is equal to zero. If not, in step S7, d=[(f+cKs)/u] mod r is calculated. It is then determined in step S8 whether d is zero. If not, in step S9, c and d are output as digital signature data. If it is assumed that r is 160 bits long, the digital signature data is 320 bits long.

If it is found in step S6 that c is equal to zero, the process returns to step S3 in which a new random number is generated. Similarly, if it is found in step S8 that d is equal to zero, the process returns to step S3, and a new random number is generated.

Figure 9:
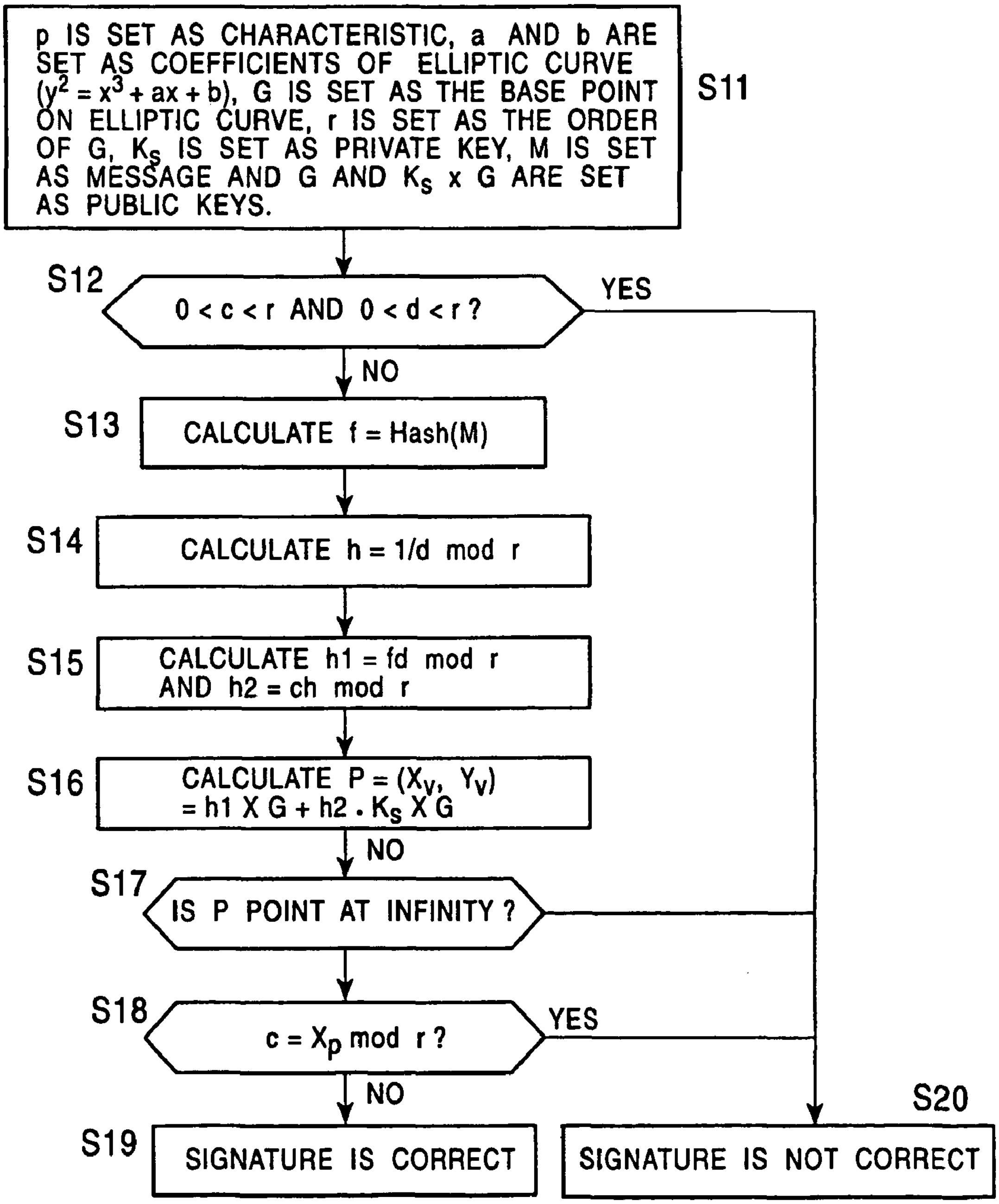
FIG. 9 is a flow chart illustrating signature verification processing which may be employed in the content transaction system of the present invention.

A digital-signature checking method using the public key cryptosystem is discussed below with reference to FIG. 9. In step S11, M is set as the message, p is set as the characteristic, a and b are set as coefficients of an elliptic curve (elliptic curve: y2=x3+ax+b), G is set as the base point on the elliptic curve, r is set as the order of G, Ks is set as the private key ($0<Ks<r$), and G and Ks (G($0<Ks<r$) are set as public keys. It is then checked in step S12 whether the signature data c and d satisfy the conditions $0<c<r$ and $0<d<r$. If the outcome of step S12 is yes, the process proceeds to step S13 in which the hash value of the message M is calculated and determined as f=Hash(M). Then, in step S14, h=1/d mod r is calculated. In step S15, h1=fh mod r and h2=ch mod r are calculated.

In step S16, by using the already determined h1 and h2, point P=(Xp, Yp)=h1(G+h2?Ks (G is calculated. The digital-signature verifier knows the public keys G and Ks (G so as to calculate the scalar multiplication of the point on the elliptic curve in a manner similar to step S4 of FIG. 8. It is then determined in step S17 whether the point P is a point at infinity. If the result of step S17 is no, the process proceeds to step S18. In actuality, the determination of step S17 can be made in step S16. That is, when P=(X, Y) and Q=(X, −Y) are added, (cannot be calculated, and it can be proved that P+Q is a point at infinity. Subsequently, in step S18, Xp mod r is calculated, and the resulting value is compared with the digital signature data c, namely, it is determined whether c=Xp mod r. It the outcome of step S18 is yes, the process proceeds to step S19 in which it is concluded that the digital signature is correct. Thus, it is also concluded that the data has not been tampered with, and that the person who possesses the private key matching the public key has created the digital signature.

If it is found in step S12 that the digital signature data c and d do not satisfy the conditions $0<c<r$ and $0<d<r$, respectively, the process proceeds to step S20. If it is found in step S17 that the point P is not a point at infinity, the process also proceeds to step S20. Further, if it is determined in step S18 that Xp mod r does not coincide with the digital signature data c, the process also proceeds to step S20.

It is determined in step S20 that the digital signature is not correct. It is thus concluded that the data has been tampered with or has not been created by the person who possesses the private key matching the public key.

In the content transaction system of the present invention, when paying the content usage fee by using the electronic money unit 221, the user device 220 sends the usage log 252 to the service provider 240. The usage log 252 is provided with the signature of the user device 220, and the signature is verified by the service provider 240. The receive log 253 created by the service provider 240 and sent to the clearing center 260 is provided with the signature of the service provider 240, and the signature is verified by the clearing center 260. Also, the issue log 251 issued by the clearing center 260 and sent to the user device 220 is provided with the signature of the clearing center 260, and the signature is verified by the user device 220.

3-4 Serial-Number Providing Method

As has been discussed with reference to FIG. 6, the issue log 251, the usage log 252, and the receive log 253 are each provided with the serial number of the corresponding log creator, i.e., the clearing center 260, the user device 220, and the service provider 240, respectively. One example of the serial-number providing method is as follows. By utilizing the private key K unique to the organization, i.e., the user device 220, the service provider 240, or the clearing center 260 (stored in, for example, the SAM), and the serial number N1 which has been provided to the creator of each log, the creator generates the subsequent serial number N2. For example, N2 is determined to be DES(K, N1). The clearing center 260, which finally receives the receive log 253 including all the log information, manages the private keys K of the user device 220 and the service provider 240 for providing the serial numbers. Upon receiving the receive log 253, the clearing center 260 checks the serial numbers of the individual logs contained in the receive log 253 so as to verify the integrity of the serial numbers. If the clearing center 260 detects an illegal serial number, the settlement processing based on the receive log 253 is terminated. In this manner, by managing the serial numbers, illegal money transfer can be prevented.

3-5 Mutual Authentication Processing and Data Communication

Data used for performing content fee payment is transmitted and received as encrypted data among the user device 220, the service provider 240, the clearing center 260, and the account management institution 280 shown in FIG. 4. For example, the various types of log information shown in FIG. 6 are encrypted and transferred. Although various techniques may be employed as the encryption processing method, one preferable technique is as follows. The mutual authentication processing using the public key certificate issued by the public-key certificate IA 410 discussed with reference to FIG. 5 is executed so as to create the session key. Then, encryption processing is performed by using the created session key as the common key, and the encrypted data is sent.

Figure 10:
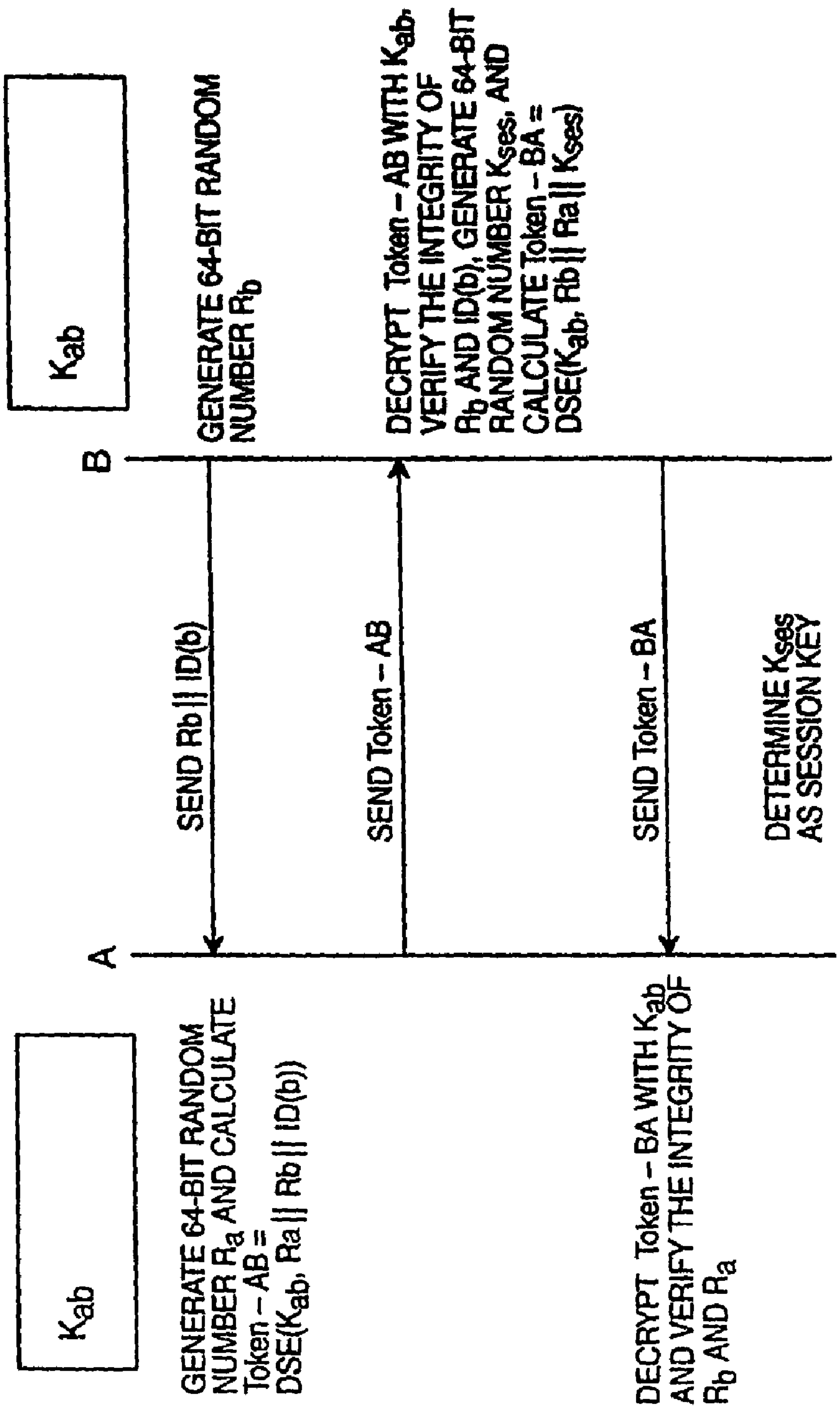
FIG. 10 illustrates mutual authentication processing which may be employed in the content transaction system of the present invention.

The mutual authentication method according to the common key cryptosystem is discussed below with reference to FIG. 10. Although in FIG. 10 DES is employed as the common key cryptosystem, other types of common key cryptosystems similar to DES may be used. In FIG. 10, A and B are two organizations selected from the user device 220, the service provider 240, the clearing center 260, and the account management institution 280 shown in FIG. 4.

B first generates a 64-bit random number Rb, and sends Rb and the ID of B, i.e., ID(b), to A. Upon receiving Rb and ID(b), A generates a 64-bit random number Ra, and sequentially encrypts Ra, Rb, and ID(b) by using a key Kab in the CBC mode of DES, and returns them to B. According to the CBC-mode signature creating processing shown in FIG. 7, Ra, Rb, and ID(b) correspond to M1, M2, and M3, respectively, and the outputs E1, E2, and E3 obtained when the initial value IV is zero become ciphertext.

Upon receiving the encrypted data (ciphertext), B decrypts it with the key Kab. The decryption method for the received data is as follows. The ciphertext E1 is decrypted with the key Kab so as to obtain the random number Ra. Then, the ciphertext E2 is decrypted with the key Kab. An exclusive OR is performed on the resulting value and E1 so as to obtain the random number Rb. Finally, E3 is decrypted with the key Kab, and an exclusive OR is performed on the resulting value and E2, thereby obtaining ID(b). Then, it is checked whether Rb and ID(b) coincide with the counterparts sent by B. When the integrity of Rb and ID(b) is verified, B authenticates A as a legal organization.

Subsequently, B generates a session key (hereinafter sometimes referred to as "Kses") by using a random number. Then, B sequentially encrypts Rb, Ra, and Kses with the key Kab in the CBC mode of DES, and returns the encrypted data to A.

Upon receiving the encrypted data, A decrypts it with the key Kab. The decryption method for the received data is similar to that performed by B, and an explanation thereof will thus be omitted. Then, A checks whether Rb and Ra coincide with the counterparts sent by A. When the integrity of Rb and Ra is verified, A authenticates B as a legal organization. After performing mutual authentication as discussed above, the session key Kses is used as a common key for private communication after the authentication.

If illegality or inconsistency is detected while the received data is being checked, it is concluded that the mutual authentication has failed, and the processing is terminated.

Figure 11:
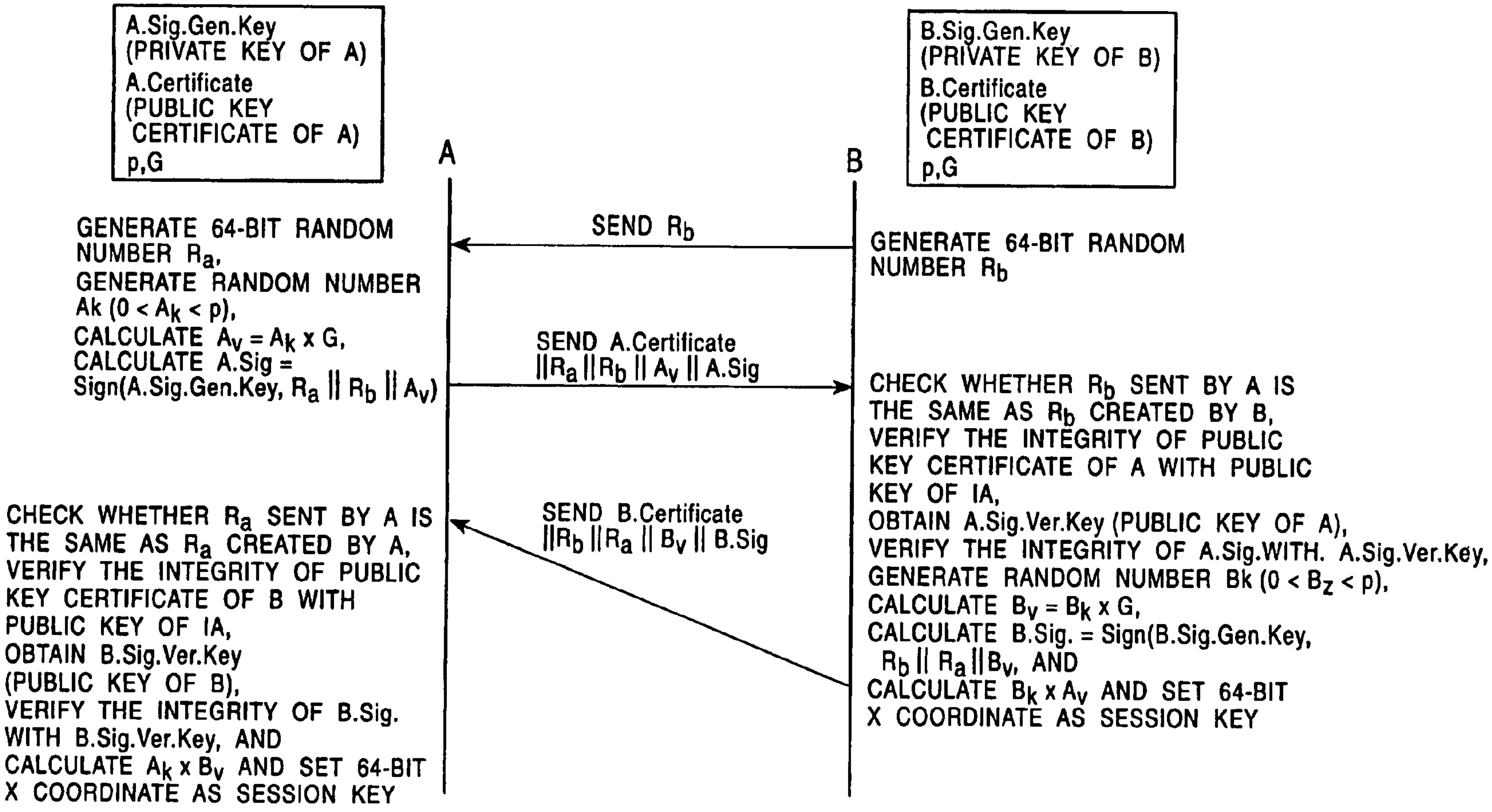
FIG. 11 illustrates mutual authentication processing which may be employed in the content transaction system of the present invention.

Then, the mutual authentication method using the 160-bit-length elliptic curve cryptosystem is described below with reference to FIG. 11. Although in FIG. 11 ECC is used as the public key cryptosystem, other types of public key cryptosystems similar to ECC may be employed. Also, the key size does not have to be 160 bits. In FIG. 11, B first generates a 64-bit random number Rb and sends it to A. A receives Rb and generates a 64-bit random number Ra and a random number Ak smaller than the characteristic p. Then, point Av is determined by multiplying the base point G with Ak (Av=Ak(G) so as to create the digital signature A.Sig for Ra, Rb, and Av (X and Y coordinates). Then, A returns the digital signature A.Sig with the public key certificate of A. Ra and Rb each have 64 bits, and the X coordinate and the Y coordinate of Av each have 160 bits, resulting in a 448-bit digital signature in total. The digital-signature creating method has been discussed with reference to FIG. 8, and an explanation thereof will thus be omitted.

When using the public key certificate, the user verifies the integrity of the digital signature of the public key certificate by using the public key of the public-key certificate IA 410 possessed by the user, and then extracts the public key from the public key certificate. Accordingly, it is necessary for all the users of the public key certificate to possess the common public key of the public-key certificate IA 410. The digital-signature checking method has been discussed with reference to FIG. 9, and an explanation thereof will thus be omitted.

Referring back to FIG. 11, upon receiving the public key certificate of A, Ra, Rb, Av, and the digital signature A.Sig, B checks whether Rb coincides with the counterpart created by B. When the integrity of Rb is verified, the digital signature of the public key certificate of A is checked with the public key of the public-key certificate IA 410 so as to extract the public key of A. By using the extracted public key, B verifies the integrity of the digital signature A.Sig. The digital-signature checking method has been described with reference to FIG. 9, and an explanation thereof will thus be omitted. After the successful verification of the digital signature of A, B authenticates A as a legal organization.

Subsequently, B generates a random number Bk smaller than the characteristic p. Then, B obtains the point Bv by multiplying the base point G with Bk (Bv=Bk (G) so as to create the digital signature B.Sig for Rb, Ra, and Bv (X and Y coordinates). B then sends the digital signature B.Sig with the public key certificate B to A.

A receives the public key certificate of B, Rb, Ra, Bv, and the digital signature B.Sig, and checks whether Ra coincides with the counterpart created by A. If the integrity of Ra is verified, A checks the digital signature of the public key certificate of B with the pubic key of the public-key certificate IA 410 so as to extract the public key of B. Then, the digital signature B.Sig is verified by using the extracted public key. After the successful verification of the digital signature B.Sig, A authenticates B as a legal organization.

After performing the mutual authentication, B calculates Bk (Av(Bk is a random number, but Av is a point on an elliptic curve, and thus, scalar multiplication is required). A calculates Ak (Bv. Then, the lower 64 bits of the X coordinate of the resulting values are used for the subsequent communication as the session key (when using the 64-bit common key cryptosystem). Alternatively, the session key may be generated by the Y coordinate. Moreover, the bit length of the coordinate used as the session key is not restricted to the lower 64 bits. In performing private communication after the mutual authentication, the data to be sent is encrypted with the session key, and may also be provided with a digital signature.

If illegality or inconsistency is detected while the digital signature or the received data is being checked, it is concluded that the mutual authentication has failed, and the processing is terminated.

In executing the mutual authentication processing, the user device 220, the service provider 240, the clearing center 260, and the account management institution 280 encrypt data to be sent with the created session key, and perform data communication with each other.

After requesting the service provider 240 to send the content and receiving it, the user device 220 performs the following content-fee payment processing. The content is first deducted from the balance of the electronic money in the electronic money unit 221, and the required usage log information, i.e., the usage log 252 including the content usage fee, the payment receiver information, the usage service information, and the serial number managed by the user device 220, is created. The usage log 252 is then sent to the service provider 240.

Referring back to FIG. 4, the content transaction processing performed in the content transaction system of the present invention is now discussed.

The user device 220 requests the service provider 240 to send the content (indicated by processing (1) in FIG. 4).

The service provider 240 then sends the requested content to the user device 220 (indicated by processing (2) in FIG. 4). The content sent from the service provider 240 to the device user 220 has already been encrypted with the content key. The service provider 240 sets, as the usage control policy (UCP), which is discussed in detail below, content price information, such as the content fee and the content-fee receiver, and also sets the content usage period and copying allowable times. The service provider 240 sends the encrypted data with the above-described content price information, the UCP, and also with the digital signature. The service provider 240 may set various content usage conditions, and the structure of the content and the additional information may be sent in a secure container, which is described in detail below.

The user device 220 then withdraws the amount of money corresponding to the content usage fee from the electronic money unit 221, and pays it to the service provider 240.

More specifically, the user device 220 deducts the usage fee from the balance of the electronic money unit 221 of the user device 220 shown in FIG. 4, and creates the usage log 252 including the issue log information and the usage information which contains the usage content fee and usage fee receiver, and sends the usage log 252 to the service provider 240 (represented by processing (3) in FIG. 4). Before transferring the usage log 252, as stated above, mutual authentication processing is performed between the user device 220 and the service provider 240, and then, the digital signature of the user device 220 is attached to the usage log 252.

The service provider 240 checks the usage log 252 received from the user device 220 so as to verify the integrity of the data. Then, the service provider 240 encrypts the content key, which is used for decrypting the encrypted content, by using the session key created upon the authentication processing, and sends the encrypted content key to the user device 220. The user device 220 then decrypts the content key with the session key, and decrypts the encrypted content by using the decrypted content key.

Subsequently, the service provider 240 creates the receive log 253 including the receive information, such as the content usage fee payer and the received date, based on the usage log 252 received from the user device 220, and then sends the receive log 253 to the clearing center 260 (designated by processing (4) in FIG. 4). Before transferring the receive log 253, mutual authentication processing is performed between the service provider 240 and the clearing center 260, and the digital signature of the service provider 240 is attached to the receive log 253.

The clearing center 260 checks the receive log 253 received from the service provider 240 so as to verify the integrity of the data. Then, the clearing center 260 executes payment processing by using electronic money, i.e., settlement processing based on electronic data, according to the receive log 253.

The clearing center 260 first extracts the corresponding user data from a user management server 261 based on the data in the receive log 253, and verifies that payment is to be made by the electronic money of the user managed by the clearing center 260. The clearing center 260 then sends the real-money transfer information concerning the settlement processing to the account management institution 280 as a transfer request (indicated by processing (5) in FIG. 4).

In response to the transfer request from the clearing center 260, the account management institution 280 performs money transfer and transfer processing between the service provider account 282 and the user electronic money account 283 (represented by processing (6) in FIG. 4). As discussed above, money is not necessarily transferred to only one provider, and may also be transferred to a content creator and a content sales store, in which case, transfer processing is also performed between the user electronic money account 283 and the other accounts 285. The above-described processing may be performed by using a plurality of receive logs 253. The processing indicated by (6) in FIG. 4 is performed within the same banking institution (for example, the same bank) if the user electronic money account 283, the service provider account 282, and the other accounts 285 are in the same banking institution 280. However, if the above-described accounts are in different banking institutions, money transfer and transfer processing are performed between the different banking institutions. The distribution ratio of the content fee is recorded in the receive log 253, and the clearing center 260 makes a transfer request to the account management institution 280 according to the distribution information recorded in the receive log 253. The content fee distribution is discussed later.

The content fee distribution information is the "receiver" information contained in the usage information of the receive log 253 and the "payer" information contained in the receive information of the receive log 253 shown in FIG. 6. Based on the "receiver" and "payer" information, the clearing center 260 determines the content of the transfer and makes a transfer request to the account management institution 280.

Upon performing the money transfer and the transfer processing, the account management institution 280 sends a transfer processing acknowledgement to the clearing center 260 (represented by processing (7) in FIG. 4).

Upon receiving the transfer processing acknowledgement, the clearing center 260 updates the settlement data stored in a settlement server 262 so as to execute electronic money settlement processing (designated by processing (8) in FIG. 4). Simultaneously, the clearing center 260 updates the balance data stored in the user-balance management server 263 in which the balance of electronic money of each user is registered (indicated by processing (9) in FIG. 4). Upon completing all the processing under normal conditions, the balance of the user-balance management server 263 of the clearing center 260 becomes equal to the balance of the user electronic money account 283 of the account management institution 280.

4. Content Configuration which Enables Secondary Distribution

According to the content transaction system of the present invention, by setting the configuration of the content to be distributed as follows, the content can be distributed among a plurality of users and the content usage fee can be automatically collected even if the content is distributed among a plurality of users.

There are two modes for distributing the content among a plurality of users. In one mode, the content is transferred from a user A to a user B, and from the user B to a user C, namely, the content is sequentially transferred among different users in a serial manner. This serial content distribution is hereinafter referred to as "inter-generation delivery". In the other mode, the content which was first purchased by the user A is distributed to users B, C, D, and so on, in a parallel manner. That is, the same content is distributed from a single user to a plurality of users. This parallel content distribution is referred to as "secondary delivery".

Figure 12:
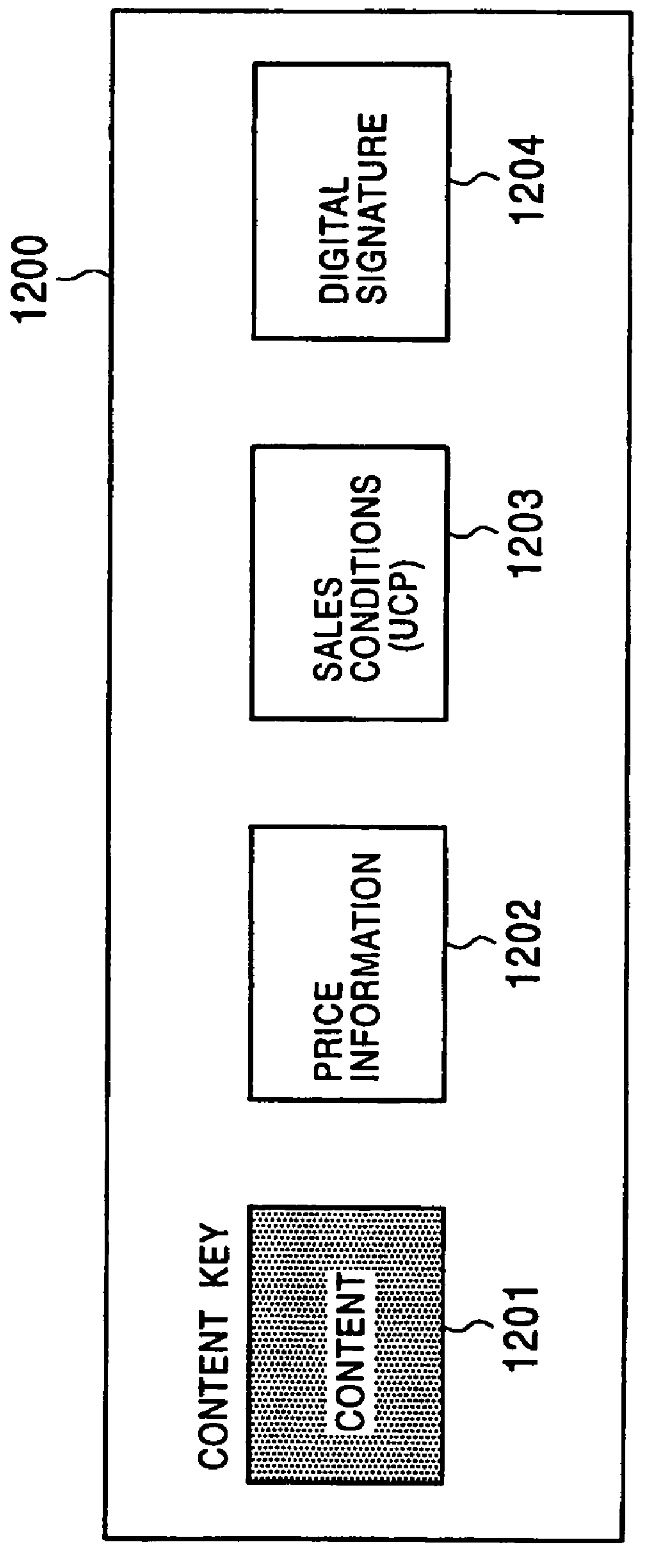
FIG. 12 illustrates the configuration of a secure container which may be used in the content transaction system of the present invention.

FIG. 12 illustrates the configuration of a secure container 1200 including the content to be distributed in the content transaction system of the present invention. The secure container 1200 includes, as shown in FIG. 12, content 1201 encrypted with a content key, price information 1202 indicating the content fee, the content fee receiver, and distribution information, sales conditions (usage control policy) (UCP) 1203, and a digital signature 1204 of the creator of the secure container 1200. The UCP 1203 contains content usage conditions indicating, for example, whether the content is allowed to be distributed only once, i.e., whether resale, such as the "inter-generation delivery" or the "secondary delivery", is prohibited, or whether the content is allowed to be distributed a plurality of times. If resale is allowed, resale conditions are indicated, for example, the "inter-generation delivery" is allowed up to two times, or the "secondary delivery" is allowed up to three times. The UCP 1203 also includes setting information, such as the period for which the content is allowed to be used (usage period).

The price information 1202 and the UCP 1203 are set by one of the content creator, the content provider, and the service provider. The digital signature 1204 is attached by the institution which manages the distribution of the content. If the content-distribution management institution is the service provider, the service provider provides the digital signature 1204.

FIG. 13 illustrates an example of the specific configuration of the UCP 1203, and FIG. 14 illustrates an example of the specific configuration of the price information 1202. The UCP 1203 includes, as shown in FIG. 13, the content identifier (ID), the usable device conditions indicating user devices which are allowed to use the content, the area code indicating the code of the areas which are allowed to use the content, the type of right of use indicating the limit of the use of the content (for example, the number of times the content is allowed to be read or copied (downloaded)), "UCP generation management information" 1301 representing the number of "inter-generation deliveries" is allowed, and "number of secondary deliveries" 1302 designating the number of times the "secondary delivery" is allowed. The "UCP generation management information" 1301 and the "number of secondary deliveries" 1302 indicate the number of times the content can be distributed among different user devices. Usage control status (UCS) information (see FIG. 16) containing "UCS generation management information" and "number of UCS secondary deliveries" is stored in a memory of each user device according to the content, which is discussed below in greater detail. The number of times the content is permitted to be distributed between different users set in the "UCP generation management information" 1301 becomes source data of the above "UCS generation management information" and the "number of UCS secondary deliveries". Based on the "UCS generation management information" or the "number of UCS secondary deliveries", it is determined whether inter-generation delivery or secondary delivery is to be performed. The "UCS generation management information" is updated every time the inter-generation delivery is performed. The "number of UCS secondary deliveries" is updated every time the secondary delivery is performed.

As stated above, based on the "UCS generation management information" recorded in the UCS in the user device, it is determined whether inter-generation delivery is to be performed. That is, the content inter-generation delivery is permitted up to the number of inter-generation deliveries set in the "UCP generation management information" 1301 of the UCP in the secure container 1200. Content inter-generation deliveries in excess of the number of inter-generation deliveries are handled as an error and are not executed. Similarly, based on the "number of UCS secondary deliveries" set in the UCS within the user device, it is determined whether secondary delivery is to be performed. That is, secondary delivery of the content is permitted up to the number of secondary deliveries set in the "number of UCP secondary deliveries" of the UCP within the secure container 1200. Secondary deliveries of the content in excess of the number of secondary deliveries are handled as an error and are not executed.

As will be stated below, the "UCS generation management information" is successively transferred from one user to another user when inter-generation delivery, i.e., content transaction (secure container transfer), is performed between a plurality of users. More specifically, upon receiving the UCS(A) from the user device A, which has supplied the content, a user device B creates a new UCS(B) which reflects the "UCS generation management information" of the UCS (A). For example, if the "UCS generation management information" of the UCS(A) indicates five, the user device B sets the "UCS generation management information" of the UCS (B) to four since inter-generation delivery has been performed once from the user device A to the user device B. This processing is described below in greater detail.

Likewise, concerning the "number of UCS secondary deliveries", a user device receives the "number of UCS secondary deliveries" from the supplier user device, and decrements the "number of UCS secondary deliveries" by one in a new UCS.

Alternatively, instead of reflecting the "number of UCS secondary deliveries" from the previous user device, a user device which has received the content through the secondary delivery may regenerate the "number of UCP secondary deliveries" 1302 of the secure container. That is, if the "number of UCP secondary deliveries" 1302 is set to be five, it remains the same regardless of how many times the content is distributed among a plurality of users.

An example of the inter-generation delivery and the secondary delivery is given below. A user (A) who has first purchased the content from the service provider 240 generates a UCS having the "UCS generation management information" and the "number of UCS secondary deliveries" based on the "UCP generation management information" 1301 and the "number of UCP secondary deliveries" 1302 contained in the UCP 1203 within the secure container 1200, and stores them. For example, if the "UCP generation management information" 1301 is three, and if the "number of UCP secondary deliveries" 1302 is five, the user (A) sets the "UCS generation management information" to be three and the "number of UCS secondary deliveries" to be five.

If the user (A) delivers the content to a user (B), the "UCS generation management information" of the user (A) remains three, and the "number of UCS secondary deliveries" of the user (A) becomes four. In the UCS created by the user (B), the "UCS generation management information" is reduced to two, and the "number of UCS secondary deliveries" becomes five (four if it reflects the UCS(A)).

If the user (A) further delivers the content to a user (C), the "UCS generation management information" of the user (A) remains three, and the "number of UCS secondary deliveries" of the user (A) becomes three. In the UCS created by the user (C), the "UCS generation management information" is reduced to two, and the "number of UCS secondary deliveries" becomes five (three if it reflects the UCS(A)).

If the user (B) further delivers the content to a user (D), the "UCS generation management information" of the user (B) is reduced to two, and the "number of UCS secondary deliveries" of the user (B) is reduced to four (three if it reflects the UCS(A)). In the UCS generated by the user (D), the "UCS generation management information" is reduced to one, and the "number of UCS secondary deliveries" is increased to five (three if it reflects the UCS(B)).

If the user (D) further delivers the content to a user (E), the "UCS generation management information" of the user (D) is reduced to one, and the "number of UCS secondary deliveries" of the user (D) is reduced to four (two if it reflects the UCS(B)). In the UCS generated by the user (E), the "UCS generation management information" is reduced to zero, and the "number of UCS secondary deliveries" is incremented to five (two if it reflects the UCS(D)).

Since the "UCS generation management information" becomes zero, the user (E) is no longer able to deliver the content regardless of the number of "UCS secondary deliveries". The user (A) who has delivered the content to the users (B) and (C) is able to deliver the content three more times ("number of UCS secondary deliveries" is three). The user (B) who has delivered the content to the user (D) is able to deliver the content four more times (three more times if it reflects the UCS(A)) ("number of UCS secondary deliveries" is four (three if it reflects the UCS(A)). The user (C) who has not delivered the content is able to deliver the content five more times (three more times if it reflects the UCS(A)) ("number of UCS secondary deliveries" is five (three if it reflects the UCS(A)). The user (D) who has delivered the content to the user (E) is able to deliver the content four more times (two if it reflects the UCS(B)) ("number of UCS secondary deliveries" is four (two if it reflects the UCS(B)).

In this manner, a user device having a UCS in which the "UCS generation management information" indicates zero is no longer able to deliver the content. However, as long as the "UCS generation management information" indicates one or greater, the user having the corresponding UCS is able to deliver the content the number of times designated in the "number of UCS secondary deliveries".

In the UCP shown in FIG. 13, different content usage conditions are set as rule 1 through rule N. In this case, a plurality of content usage conditions are set according to the user or the user device, or may be selected by the user. For example, different content prices may be set according to the rules.

FIG. 14 illustrates an example of the price information 1202 of the secure container 1200 shown in FIG. 12. The price information 1202 stores not only the information such as the content ID, the area code, the usable device conditions, recorded in the UCP shown in FIG. 13, but also the price information ID and the price version information. Additionally, as in the UCP shown in FIG. 13, different content usage prices are set as rule 1 through rule N. In each rule, the content usage price and the content profit distribution information are set.

The information concerning the content fee receiver contained in the usage log 252 and the receive log 253 discussed with reference to FIG. 6 is generated based on the above-described UCP and the price information of the secure container.

Figure 15:
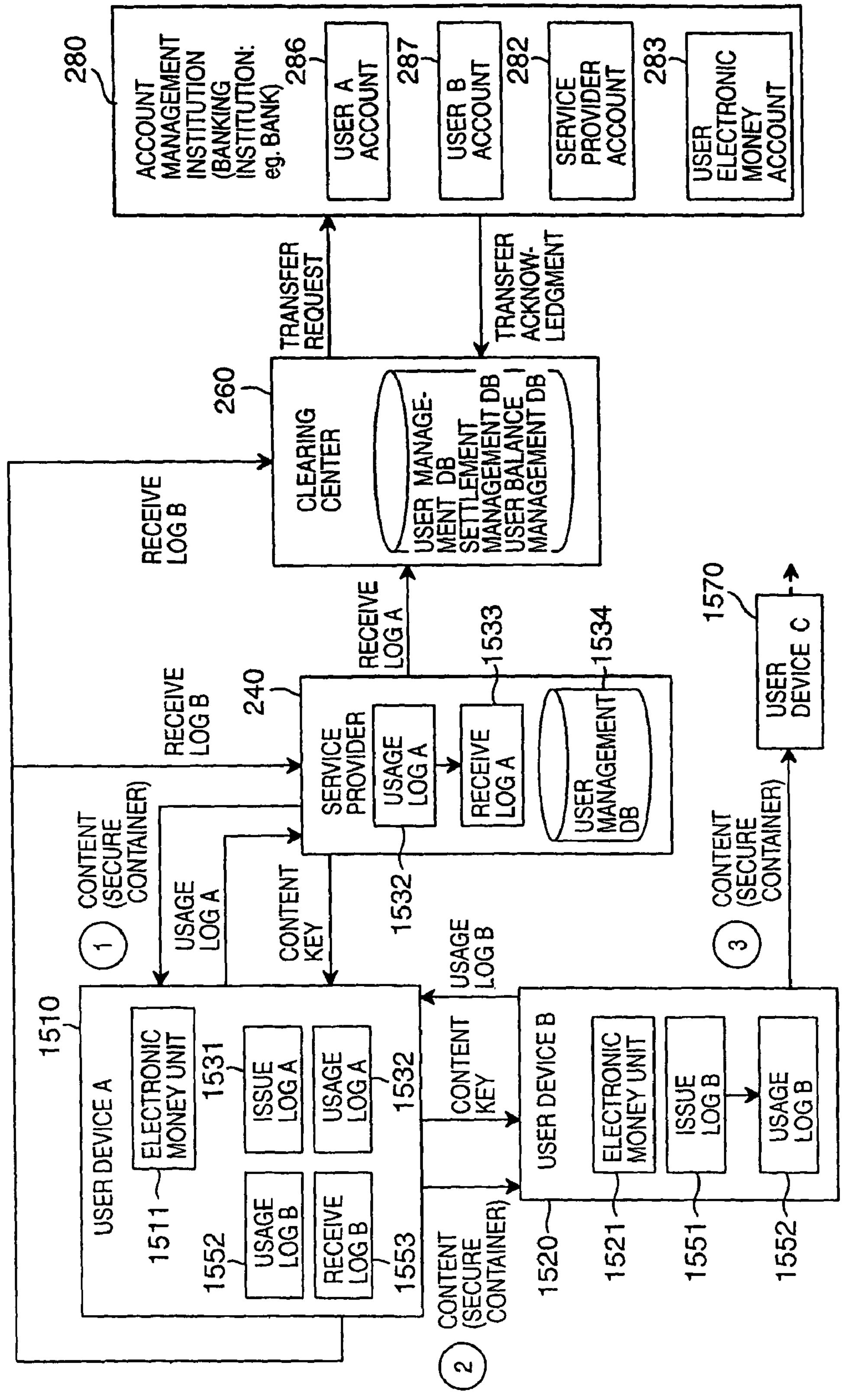
FIG. 15 illustrates the flow of settlement processing based on the distribution of a secure container and log information in the content transaction system of the present invention.

FIG. 15 illustrates the flow of settlement processing which enables secondary distribution among a plurality of users by distributing the secure container 1200 shown in FIG. 12.

In FIG. 15, a user device A 1510 requests the service provider 240 to send the content. After performing the authentication processing and signature verification processing between the user device A 1510 and the service provider 240 as discussed above, the user device A 1510 generates a usage log A 1532 based on an issue log A 1531 to perform payment processing for the content usage fee, and sends the usage log A 1532 to the service provider 240.

As has been described with reference to FIG. 12, the content sent from the service provider 240 to the user device A 1510 has been encrypted with a content key. After verifying the integrity of the signature of the usage log A 1532, the service provider 240 encrypts the content key and sends it to the user device A 1510. The content key is encrypted with a session key, which has been created upon authentication processing. The specific processing flow is as follows: (1) performing authentication processing between the user device A 1510 and the service provider 240; (2) sending the secure container from the service provider 240 to the user device A 1510; (3) verifying the integrity of the signature of the secure container by the user device A 1510; (4) determining by the user device A 1510 based on the UCP and the price tag (PT) whether the content is to be purchased; (5) paying for the content by using electronic money of the user device A 1510; (6) sending the content key from the service provider 240 to the user device A 1510; and (7) generating the UCS by the user device A 1510 and storing it (and the content key). The mutual authentication processing between the service provider 240 and the user device A 1510 performed in (1) may be executed after determining the purchase of the content in (4) and before paying for the content by the user device A 1510 in (5).

After the aforementioned series of processing, the user device A 1510 is able to decrypt the content with the content key. Before using the content, i.e., before decrypting the content with the content key, the user device A 1510 checks the stored UCS to determine whether the content is to be utilized. The UCS is created in an encryption processing unit of the user device A 1510 based on the UCP when payment for the content is made to the service provider 240 with the electronic money. The created UCS is then stored in a memory of the user device A 1510. This processing is discussed in detail below with reference to FIG. 16. The content stored in the secure container is decrypted by the user device A 1510 only when the content is found to be utilized by checking the UCS.

In other words, the encryption processing unit of the user device A 1510 decrypts the content only when the UCS satisfies the predetermined conditions. If not, the encryption processing unit handles the content as an error and does not execute the decryption processing. In the user device A 1510, a content-use determining program is stored which allows the decryption processing to be executed only when the UCS set in the user device A 1510 satisfies the predetermined usage conditions. The content-use determining program is provided by, for example, the service provider 240. Before the decryption processing is executed with the content key in the user device A 1510, the content-use determining program is run.

FIG. 16 illustrates an example of the UCS created for each content by the user device A 1510 and stored in a memory of the user device A 1510. The UCS includes, as shown in FIG. 16, not only the information, such as the content ID and the service provider ID, but also content-usage-limit information, such as the remaining number of reads and the remaining number of copies. The remaining number of reads and the remaining number of copies are the numbers of reading and copying operations allowed within the same user device. The UCS also contains "UCS generation management information" 1601 and "number of UCS secondary deliveries" 1602.

As stated above, the "UCS generation management information" 1601 is the number of "inter-generation deliveries" is allowed. In the UCS of the user device which has first purchased the content, the number of times equal to that of the "UCP generation management information" 1301 shown in FIG. 13 is set. In the UCS of a user device which has received the content by inter-generation delivery, the remaining number of inter-generation deliveries for the same secure container is set.

In the "number of UCS secondary deliveries" 1602, the number of above-described "secondary deliveries" allowed is set. In the UCS of the user device which has first purchased the content, the number of times equal to that of the "number of UCP secondary deliveries" 1302 shown in FIG. 13 is set. It is updated, that is, it is decremented, according to the subsequent secondary delivery.

As discussed above, different "numbers of UCS secondary deliveries" 1602 are set according to whether the data reflects the previous user device in the content transaction between a plurality of users.

In the content distribution between a plurality of users, it is determined whether inter-generation delivery or secondary delivery is to be executed based on the "UCS generation management information" 1601 or the "number of UCS secondary deliveries" 1602, respectively, in the UCS stored in a memory of the user device. The "UCS generation management information" 1601 is updated every time the inter-generation delivery is performed. The "number of UCS secondary deliveries" 1602 is updated every time the secondary delivery is performed.

When the same secure container is transferred between different users, the "UCS generation management information" 1601 of the UCS from a content supplier is reflected in the counterpart of a content receiver, and the new "UCS generation management information" is stored in the UCS created by the content receiver. On the other hand, the "number of UCS secondary deliveries" 1602 from a content supplier may be reflected in or may not be reflected in the counterpart of a content receiver.

The content-usage limit information recorded in the "UCS generation management information" 1601 is sequentially updated when the content within the same secure container is used between different user devices. For example, it is assumed that three inter-generation deliveries are set in the UCP of the secure container. Then, the "UCS generation management information" 1601 of the first purchaser (user device A) of the secure container indicates that inter-generation delivery is possible up to three times. If the user A delivers the content to the user B, the "UCS generation management information" 1601 of the user B indicates two.

As discussed above, in the "UCP generation management information" 1301 or the "number of UCP secondary deliveries" 1302 of the UCP of the secure container, an upper limit of the number of distribution times is set. In the UCS generated by the user device, the "UCS generation management information" 1601 and the "number of UCS secondary deliveries" 1602 are stored. Then, by referring to the "UCS generation management information" 1601 or the "number of UCS secondary deliveries" 1602, the above-described content-use determining program determines whether the secure container is to be sent to another user device in excess of the upper limit of the number of distribution times. If the outcome of this determination is yes, the content-use determining program handles the processing as an error and does not execute the content transfer processing. The content transfer processing between users is executed only when the upper limit of the number of distribution times set in the "UCS generation management information" 1601 or the "number of secondary deliveries" 1602 does not exceed the upper limit, thereby allowing the inter-generation delivery or the secondary delivery to be performed. That is, the transfer operation between user devices (inter-generation delivery or secondary delivery) can be performed only within the conditions set in the "UCP generation management information" 1301 and the "number of UCP secondary deliveries" 1302. The "UCP generation management information" 1301 and the "number of UCP secondary deliveries" 1302 are set as the UCP when the secure container has been created.

Referring back to FIG. 15, a description is now given of the collection of the content usage fee performed after issuing a receive log by a content supplier (user device) in the content distribution system.

In FIG. 15, the service provider 240 supplies the content in the form of a secure container to the user device A 1510, and the user device A 1510 pays the content usage fee by using an electronic money unit 1511. More specifically, the user device A 1510 creates the usage log A 1532 based on the issue log A 1531, and the price information and the sales conditions indicated in the secure container, and transfers the usage log A 1532 to the service provider 240. Then, the service provider 240 creates a receive log A 1533 based on the usage log A 1532, and transfers it to the clearing center 260. The clearing center 260 performs settlement processing based on the receive log A 1533. The actual money transfer is performed by the account management institution 280 in response to a transfer request from the clearing center 260.

Previously, the configuration of the receive log has been described with reference to FIG. 6, and another specific example of the receive information of the receive log is discussed below with reference to FIG. 17. The receive information contains the distribution information of the content usage fee. In a data portion 1701 of the receive information shown in FIG. 17, the profit amount/profit rate of the content provider, the profit amount/profit rate of the service provider 240, and the profit amount/profit rate of other related organizations are recorded. The receive information shown in FIG. 17 is an example only. The profit distribution may be set for a user device which has performed secondary distribution or a management user who manages the user device. Alternatively, if the content is sold through media, such as CDs or DVDs, the profit distribution may be set for the sales stores. Alternatively, the profit distribution may be set for a clearing center or a content creator.

The profit distribution information stored in the receive information is set based on the price information (FIG. 14) and the UCP (FIG. 13) of the secure container. The profit distribution is set upon creating the secure container. The clearing center 260 executes the settlement processing according to the distribution information recorded in the receive information, and outputs a transfer request to the account management institution 280 accordingly. The account management institution 280 performs the transfer processing in response to the request. Alternatively, the receive information may be configured as shown in FIG. 6, and the clearing center 260 may provide all the profits to the service provider 240, and then, the service provider 240 may distribute the profit to the content provider or other organizations.

In the receive information shown in FIG. 17, "UCP generation management information" 1702 contained in the UCP is stored. The clearing center 260 compares the "UCP generation management information" 1702 recorded in the receive information with the number of issued receive logs. The clearing center 260 nullifies received logs which exceed the number set in the "UCP generation management information" 1702.

As described above, when the service provider 240 distributes the content to a user device, the user device utilizes the content according to the data recorded in the secure container, and issues a usage log accordingly. Then, the service provider 240 issues a receive log based on the usage log. The correct price of the content usage fee is then automatically collected based on the issued receive log.

The content distribution between different users is now described with reference to FIG. 15. The user device A 1510 has a secure container which has been read or downloaded a predetermined number of times. Such a secure container may be transferred to a different user device B 1520. However, the inter-generation delivery or secondary delivery can be performed only when the "UCP generation management information" or the "number of UCP secondary deliveries" allows the inter-generation delivery or the secondary delivery, respectively. If it is allowed, the content may be transferred to the user device B 1520 within the number of times restricted by the "UCS generation management information" or the "number of UCS secondary deliveries". This is controlled by the above-described content-use determining program. As between the user device A 1510 and the service provider 240, the authentication processing, session-key creation, and signature verification are executed between the user device A 1510 and the user device B 1520 before transferring the data.

After receiving the secure container and performing purchase processing, the user device B 1520 creates a usage log B 1552 based on an issue log B 1551. Then, the user device B 1520 transfers the usage log B 1552 to the user device A 1510 and pays the content fee by using an electronic money unit 1521. The user device A 1510 creates a receive log B 1553 based on the usage log B 1552 and transfers it to the clearing center 260, and the clearing center 260 performs settlement processing based on the receive log B 1553. The actual money transfer is performed by the account management institution 280 in response to a transfer request sent from the clearing center 260. In the receive log B 1553, the content-profit distribution information similar to that discussed with reference to FIG. 17 is contained. Based on the distribution information in the receive log B 1553, the clearing center 260 distributes the profit obtained by the use of the content by the user device B 1520.

As has been previously discussed, the secure container can be distributed between users within the limit set in the UCP. As long as the limit permits, the secure container may be delivered from the user device B 1520 to another user device C 1570, as shown in FIG. 15. In this case, the user device B 1520 creates a receive log based on a usage log sent from the user device C 1570 and sends it to the clearing center 260. The clearing center 260 then performs settlement processing.

As shown in FIG. 15, the receive log B 1553 may be sent to the service provider 240 rather than to the clearing center 260, and instead of performing the settlement processing, the service provider 240 may provide points, which are to be redeemed for certain awards, to the users who have supplied the content. This award redemption processing is discussed below.

Figure 18:
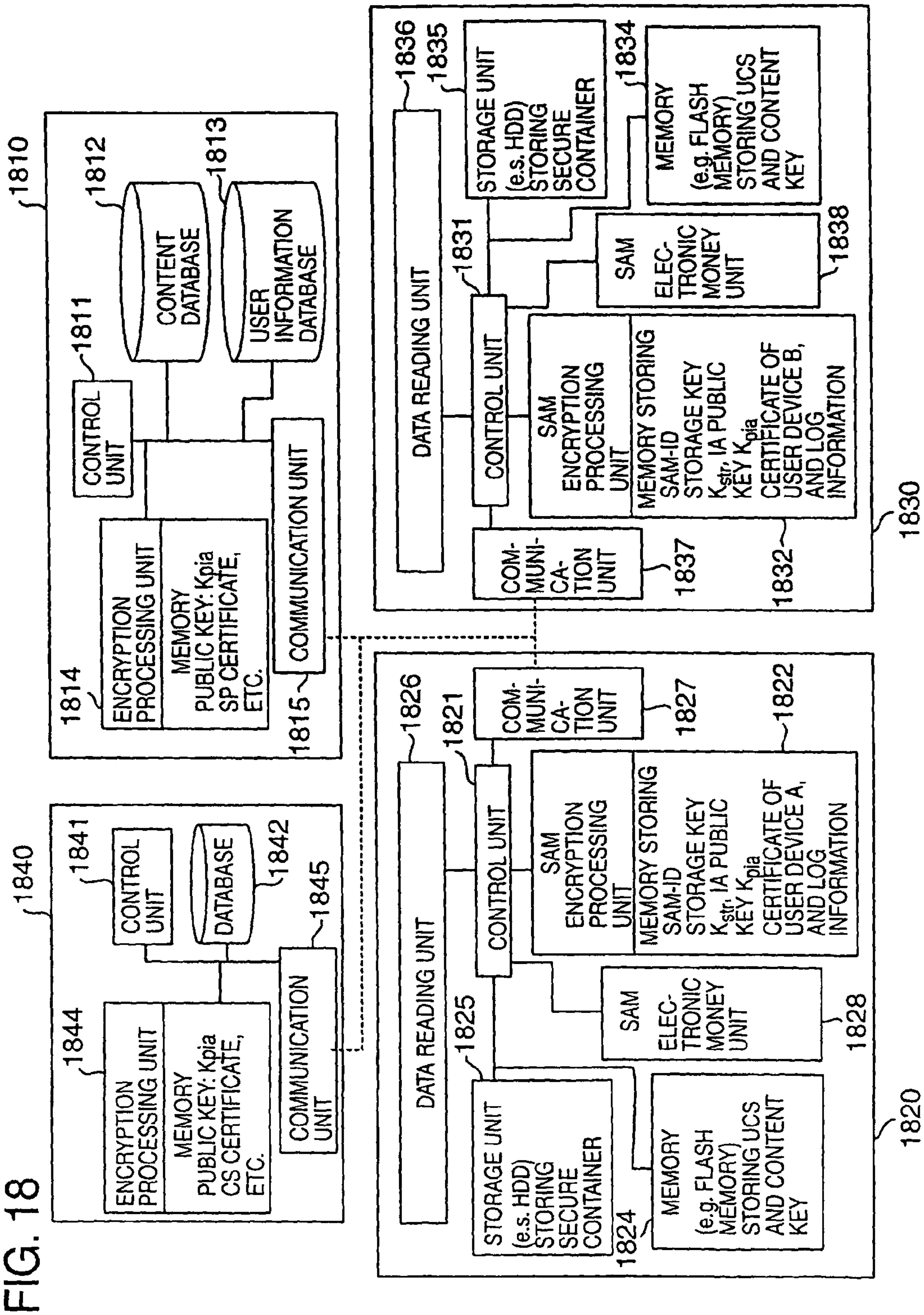
FIG. 18 is a block diagram illustrating the configurations of user devices, a clearing center, and a service provider in the distribution of a secure container between the user devices in the content transaction system of the present invention.

FIG. 18 is a block diagram illustrating the configurations of user devices, a service provider, and a clearing center when a secure container is transferred between the user devices. The secure container transfer processing and the UCS creation and storage processing are now described with reference to FIG. 18.

In FIG. 18, initially, a service provider 1810 distributes a secure container (first distribution). The service provider 1810 stores the content in a content database 1812 and also stores user information in a user information database 1813. In the service provider 1810, under the control of a control unit 1811, an encryption processing unit 1814 performs mutual authentication processing with a content receiver and also attaches the signature to data to be transferred, both of which are required for transferring the secure container. The encryption processing unit 1814 has a memory in which key information required for the encryption processing, a public key of the public-key certificate IA, and a public key certificate issued by the public-key certificate IA are stored.

A clearing center 1840 shown in FIG. 18 performs settlement processing for the content usage fee (electronic money). When the clearing center 1840 receives a receive log from the service provider 1820 or sends an issue log to a user device 1810 via a communication unit 1845, an encryption processing unit 1844 executes authentication with the service provider 1810 or the user device 1820. The encryption processing unit 1844 also attaches a signature to data to be sent and verifies the signature of the received data. A database 1842 stores various databases, such as the user management database and the user balance management database shown in FIGS. 2 and 4. The encryption processing unit 1844 has a memory in which key information required for the encryption processing, a public key of the public-key certificate IA, and a public key certificate issued by the public-key certificate IA are stored. A control unit 1841 controls the content transfer operation and also data transfer when encryption processing is executed by the encryption processing unit 1844.

The service provider 1810 transfers a secure container to the user device A 1820 via a communication unit 1815. The user device A 1820 receives the secure container via a communication unit 1827 and executes purchase processing. Then, under the control of a control unit 1821, an encryption processing unit 1822 creates a UCS based on a UCP set in the secure container, and stores the UCS in a memory 1824, such as a flash memory.

The user device A 1820 performs payment processing for the received content by using an electronic money unit 1828. That is, the user device A 1820 creates the above-described usage log in the encryption processing unit 1822, and sends it to the service provider 1810 via the communication unit 1827. The secure container received by the user device A 1820 is stored in a storage unit 1825, such as a hard disk. The service provider 1810 verifies the integrity of the usage log sent from the user device A 1820, and then encrypts a content key with a session key and sends them to the user device A 1820. The user device A 1820 decrypts the content key with the session key, and re-encrypts the content key with a storage key unique to the user device A 1820 and stores it in the memory 1824.

To utilize the content, and more specifically, to read the content in a data reading unit 1826, the user device A 1820 decrypts the content key stored in the memory 1824 by using the storage key, and decrypts the content of the secure container stored in the storage unit 1825 by using the decrypted content key. The decrypted content is then read in the data reading unit 1826. Before decrypting the content, predetermined conditions, such as the remaining number of reads, set in the UCS stored in the memory 1824 are checked. Only when the predetermined conditions are met, can the content be decrypted.

If the secure container is delivered from the user device A 1820 to a user device B 1830, the user device A 1820 reads the UCS from the memory 1824 and decrypts it with the storage key in the encryption processing unit 1822 (decryption processing is not necessary if it is not encrypted), thereby checking the "UCS generation management information" and the "number of secondary deliveries". If it is determined that the content can be delivered to another user device, the user device A 1820 transfers the secure container to the user device B 1830 via the communication unit 1827. The user device B 1830 receives the secure container via a communication unit 1837 and executes purchase processing. Then, under the control of a control unit 1831, an encryption processing unit 1832 of the user device B 1830 creates a new UCS (UCS-B) in which new "UCS generation management information" and "number of UCS secondary deliveries" are set based on the UCP and the UCS (UCS-A) of the user device A 1820. The UCS-B is stored in a memory 1834, such as a flash memory.

The UCS-B created as described above reflects the content usage log of the user device A 1820. As discussed above, the number represented by the "UCS generation management information" of the UCS-B is smaller than that of the UCS-A by one. The number represented by the "number of UCS secondary deliveries" of the UCS-B may be smaller than that of the UCS-A by one or may be the same as that set in the secure container.

The user device B 1830 performs payment processing by using an electronic money unit 1838. That is, the user device B 1830 creates the above-described usage log in the encryption processing unit 1832, and sends it to the user device A 1820 via the communication unit 1837. The secure container received by the user device B 1830 is stored in a storage unit 1835, such as a hard disk. After verifying the integrity of the usage log sent from the user device B 1830, the user device A 1820 reads the content key from the memory 1824 and decrypts it with the storage key. Then, the user device A 1820 re-encrypts the content key with the session key and sends them to the user device B 1830. The user device B 1830 then decrypts the content key with the session key, and re-encrypts the content key with the storage key unique to the user device B 1830 and stores it in the memory 1834.

If the content has been tampered with and is utilized in excess of a predetermined number of times, the number of received logs created for the same secure container exceeds the "UCP generation management information" contained in the UCP. Accordingly, the clearing center 1840 nullifies such receive logs. In the receive log, as shown in FIG. 17, not only the content ID, but also the "UCP generation management information" recorded in the secure container is stored. Thus, when performing the settlement processing, the clearing center 1840 is able to nullify receive logs which exceed the "UCP generation management information". Receive logs created for the content which is not allowed to be transferred between a plurality of users are also nullified.

To utilize the content, for example, to read the content in a data reading unit 1836, the content key stored in the memory 1834 is decrypted with the storage key, and the content in the secure container stored in the storage unit 1835 is decrypted with the decrypted content key. Then, the content is read in the data reading unit 1836. As has been previously discussed, before decrypting the content, the usage conditions, such as the remaining number of reads, set in the UCS stored in the memory 1834 are checked. That is, the content can be utilized only within the conditions set in the UCS.

According to the above-described processing, not only the first distribution between the service provider 1810 and a user device, but also the secondary distribution (inter-generation delivery or secondary delivery) among a plurality of users can be performed. The use of the content is restricted to the conditions set by the "UCP generation management information" and the "number of secondary deliveries" recorded in the UCP. Additionally, the collection of the content usage fee according to the first distribution or the second distribution (inter-generation delivery or secondary delivery) can be automatically performed according to a receive log created based on the price information and sales conditions set in the secure container. This obviates the need for special settlement processing.

Figure 19:
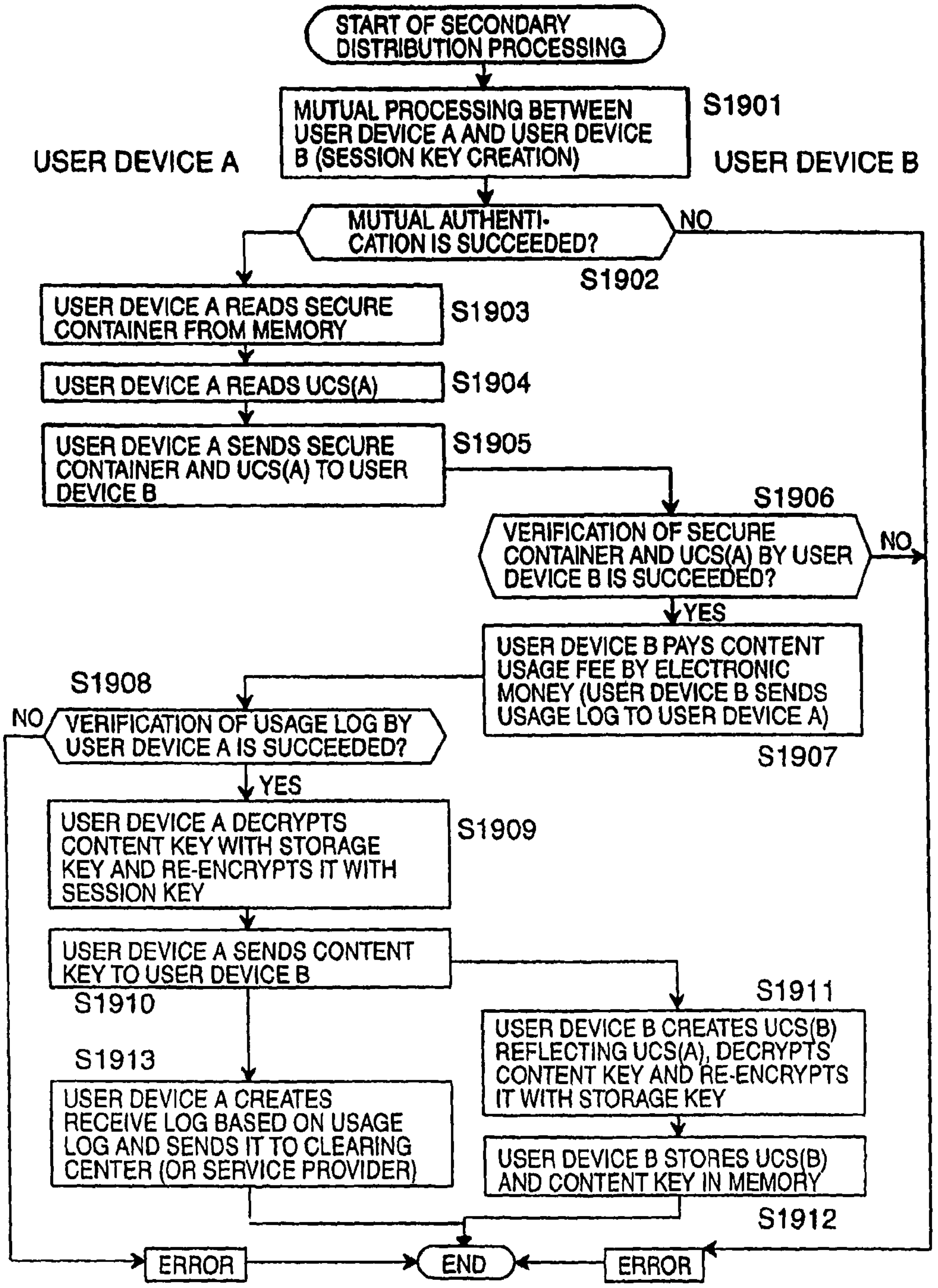
FIG. 19 is a flow chart illustrating the processing for distributing a secure container between user devices in the content transaction system of the present invention.

FIG. 19 illustrates the flow of the processing performed between the user device A, which is a content supplier, and the user device B, which is a content receiver, when the content is transferred from the user device A to the user device B according to the inter-generation delivery or the secondary delivery.

In step S1901, mutual authentication processing is performed between the user device A and the user device B (see FIGS. 10 and 11). A session key is created upon performing the authentication processing. It is then determined in step S1902 whether the mutual authentication has succeeded. If the outcome of step S 1902 is no, the processing is handled as an error and is thus terminated. If necessary, mutual authentication is retried.

If the mutual authentication has succeeded, the process proceeds to step S1903 in which the user device A reads the secure container from the storage unit 1825, such as a hard disk. Then, in step S1904, the user device A reads the UCS(A) stored in the memory 1824, such as a flash memory.

In step S1905, the user device A sends the secure container and the UCS(A) to the user device B. In this case, the user device A attaches a signature to the secure container. It is not essential that the whole UCS(A) be sent to the user device B, and only the data which should be reflected in the subsequent UCS, such as the "UCS generation management information", may be selected from the UCS(A) and sent to the user device B.

It is then determined in step S1906 whether the signatures of the secure container and the UCS(A) sent from the user A have been successfully verified. If the verification has failed, the processing is handled as an error and is thus terminated.

If the integrity of the above data is verified in step S1906, the process proceeds to step S1907 in which the user device B pays the content usage fee by electronic money based on the price information and the sales conditions set in the secure container. More specifically, the user device B creates a usage log and sends it to the user device A. The signature of the user device B is attached to the usage log.

Subsequently, it is determined in step S1908 whether the signature of the usage log sent from the user device B to the user device A has been successfully verified. If the verification has failed, the processing is handled as an error and is thus terminated.

In step S1909, the user device A extracts the content key encrypted with the storage key (which is stored in the memory of the encryption processing unit 1822) from the memory 1824, and decrypts the content key with the storage key. The content key is re-encrypted with the session key (created in authentication processing in step S1901). Then, in step S1910, the encrypted content key is sent to the user device B.

In step S1911, the user device B creates new UCS(B) which reflects the generation management information (and maybe the number of secondary deliveries) based on the UCS(A) received from the user device A. The user device B then decrypts the content key with the session key received from the user device A, and re-encrypts it with the storage key stored in the memory of the encryption processing unit 1832. In step S1912, the UCS(B) and the content key encrypted with the storage key are stored in the memory 1834.

In step S1913, the user device A creates a receive log based on the usage log received from the user device B, and sends the receive log to the clearing center 1840. The signature of the user device A is attached to the receive log. After verifying the signature of the receive log, the clearing center 1840 performs settlement processing based on the receive log. As discussed above, instead of performing settlement processing, award redemption processing may be performed by the service provider 1810 in which certain award points are provided to the user who has performed secondary distribution or a management user who manages the user devices. In this case, the receive log may be sent to the service provider 1810, and points may be added in the user information database 1813 of the service provider 1810. A receive log does not have to be immediately sent to the clearing center 1840 or the service provider 1810. Instead, a receive log may be stored in an electronic-money recording memory, and when a predetermined number of receive logs are stored, or after a predetermined period of time, they may be sent to the clearing center 1840 or the service provider 1810.

5. Award Redemption Processing in Secondary Distribution of Content

As is seen from the above description, the overall flow of the secondary distribution of the content in the form of a secure container among a plurality of user devices can be managed by a receive log.

In the following description, points which are to be redeemed for certain awards are provided to a supplier user device or to a management user. With this arrangement, the secondary distribution of the content among a plurality of users can be activated.

According to the above-described configuration, in the receive information (see FIG. 17) contained in the receive log, the profit amount/profit rate of the content provider and the profit amount/profit rate of the service provider are recorded. Based on this data, the clearing center performs settlement processing, and more specifically, distributes the content usage fee among the content provider, the service provider, and other organizations, such as the content creator and content sales stores.

Information concerning the points given to the supplier user device or the management user is set in the receive information shown in FIG. 6 or 17. Then, a receive log including such receive information is sent to, for example, the service provider 240 (see FIG. 15). Accordingly, the service provider 240 is able to give award redemption points to the supplier user device or the management user. One point may be given every time secondary distribution is performed for a single content, and then, new settings for the content are created according to the points. For example, the price of another content may be discounted. Alternatively, a restriction on the content usage may be relaxed, for example, the number of reads may be increased.

The award redemption processing may be performed by the service provider, the clearing center, the content provider, or another institution. In the following example, the award redemption processing performed by the service provider is discussed with reference to the block diagram of FIG. 20.

Figure 20:
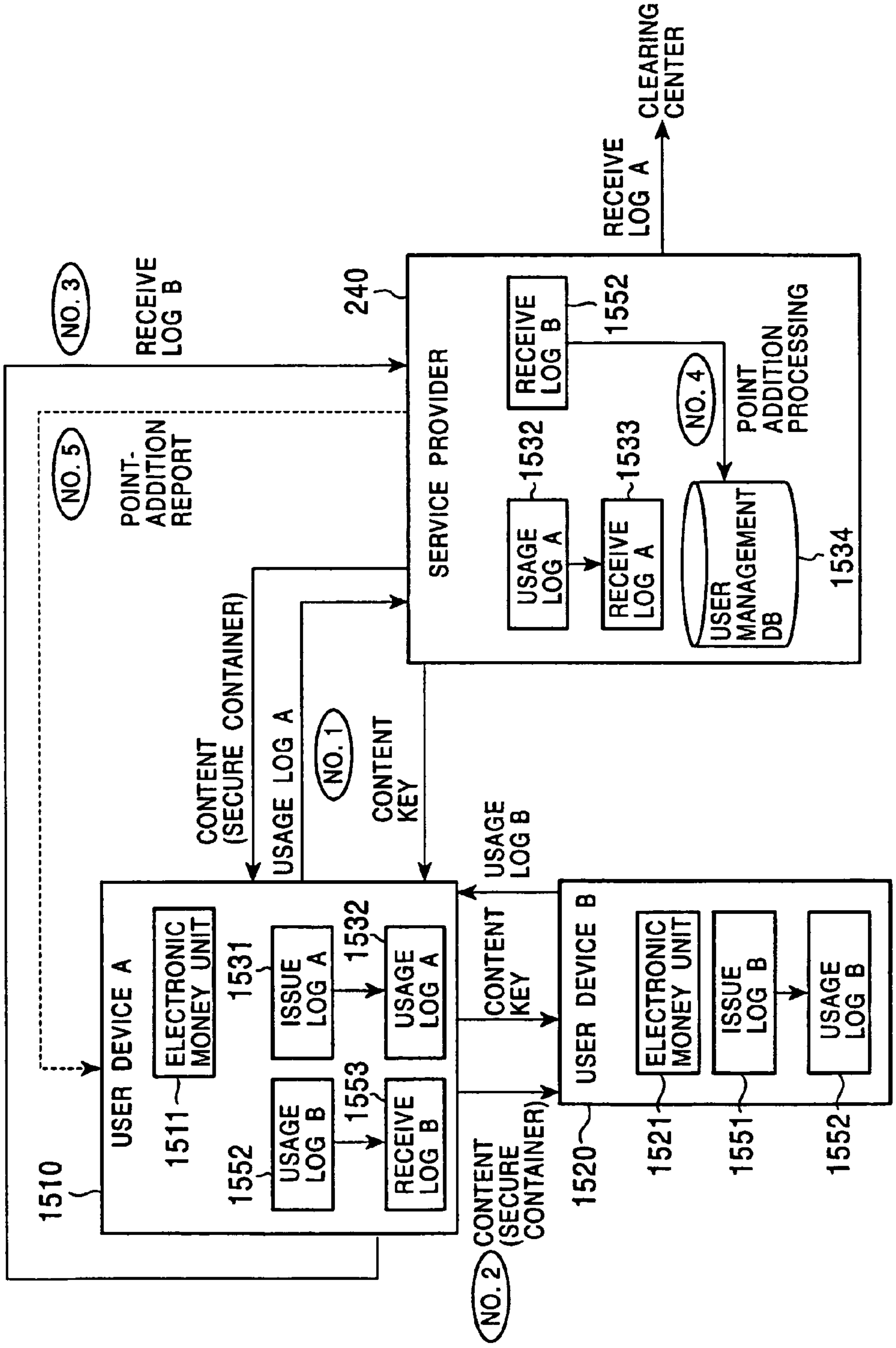
FIG. 20 illustrates point provision processing in an award redemption program performed in the distribution of a secure container between user devices in the content transaction system of the present invention.

In FIG. 20, No. 1 through No. 5 indicate the processing procedure in chronological order. The operations represented by No. 1 and No. 2 are similar to those discussed with reference to FIG. 15. The operation of No. 3 indicates that the user device A 1510 sends the receive log B 1553 based on the usage log B 1552 created by the user device B 1520 to the service provider 240 after performing the secondary distribution of the content (secure container) from the user device A 1510 to the user device B 1520.

The service provider 240 then performs award redemption processing based on the receive log B 1553 (operation of No. 4 in FIG. 20).

An example of the data configuration in a user management database 1534 of the service provider 240 is shown in FIG. 21. The entries of the user management database 1534 are a user ID who has provided the content, a user device ID, a content ID, a receive log ID, and point data.

The service provider 240 calculates a total number of points given to each user or each user device, and provides awards to the users or the user devices which have collected a certain number of points. As awards, a special discount may be given to the next purchase of the content. Alternatively, a restriction on the content usage may be relaxed, or a free gift may be provided.

The above-described point addition processing of the award redemption is executable by sending a receive log to the service provider 240. The settlement processing for the content usage fee is executable by sending a receive log to the clearing center 260. Only one of the operations may be performed, or both operations may be simultaneously performed.

6. Specific Example of Settlement Processing

A description is now given of a specific example of the processing executed in the content transaction system of the present invention.

Figure 22:
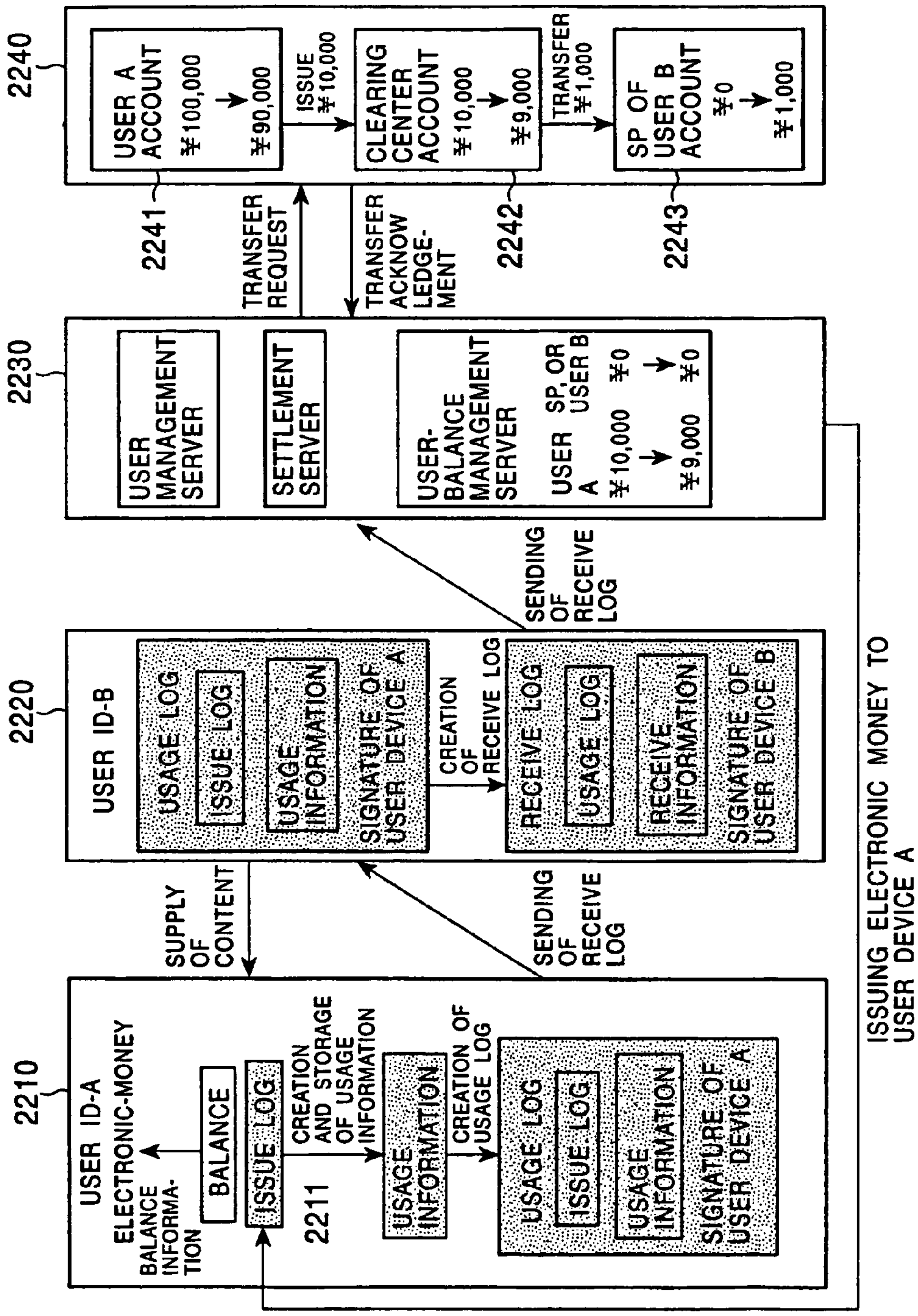
FIG. 22 illustrates a specific example of settlement processing in the distribution of a secure container in the content transaction system of the present invention.

FIG. 22 illustrates a specific example of the settlement processing executed between a clearing center and an account management institution. In FIG. 22, a user device A 2210 purchases the content from a service provider or a user device B 2220. In this example, it is assumed that the usage fee of the content is 1,000 yen. The content price and the usage-profit distribution information collected from the content user are respectively recorded in the price information and sales conditions of the secure container.

The setting of the amount of electronic money usable by the user device A 2210 is first discussed. A user A who manages the user device A 2210 has a user A account 2241 in which 100,000 yen is deposited in an account management institution 2240, for example, a bank. In response to a request from the user A, the account management institution 2240 transfers 10,000 yen from the user A account 2241 to an electronic money account of the user A of a clearing center 2230. The clearing center manages electronic money. This processing is reported to the clearing center 2230, and the clearing center 2230 sets the balance of the user A in a user-balance management server to 10,000 yen. The user-balance management server is disposed in the clearing center 2230 so as to manage the electronic money balance of each user. The clearing center 2230 reports the electronic money balance of the user A set as described above to the user device A 2210 by creating an issue log 2211 and sending it to the user device A 2210. The issue log 2211 is sent after performing authentication processing, attaching the signature of the clearing center 2230 and verifying it by the user device A 2210.

The electronic money balance set in the issue log 2211 indicates the usable amount of electronic money by the user A 2210. This balance is equal to the balance management data of the clearing center 2230.

Thus, in order to utilize the purchased content, the user device A 2210 has to withdraw 1,000 yen from electronic money and pay it. The user device A 2210 performs this payment processing by creating a usage log and sending it to a content supplier. Accordingly, the electronic money balance of the user A is reduced to 9,000 yen. In this case, the content supplier may be a service provider or the user device B 2220. The service provider or the user device B 2220 creates a receive log based on the usage log received from the user device A 2210 and sends it to the clearing center 2230.

The clearing center 2230 constructs the form of settlement according to the profit distribution information recorded in the receive log, and sends it to the account management institution 2240 as a transfer request. According to the form of settlement constructed by the clearing center 2230, the content usage fee, 1,000 yen, is paid from the content receiver (user device A 2210) to the content supplier (service provider or the user device B 2220).

The account management institution 2240 receives the settlement processing data from the clearing center 2230, and performs transfer processing according to the data. More specifically, the account management institution 2240 withdraws 1,000 yen from a user account 2242 managed by the clearing center 2230 (hereinafter sometimes referred to as the "clearing-center management account"), and transfers it to an account 2243 of the content supplier, i.e., the service provider or the user device B 2220.

After performing the whole series of processing, the account management institution 2240 sends a transfer acknowledgement to the clearing center 2230. The clearing center 2230 receives the transfer acknowledgement and updates the data of the user-balance management server. In the example shown in FIG. 22, the electronic money balance of the user A in the user-balance management server is updated from 10,000 yen to 9,000 yen. The balance of the user B in the user-balance management server remains zero. This is because the user B or the service provider does not have an account in the clearing center 2230. The account of the user B or the service provider in the account management institution 2240 shown in FIG. 22 is not an electronic money account but a real-money account.

Figure 23:
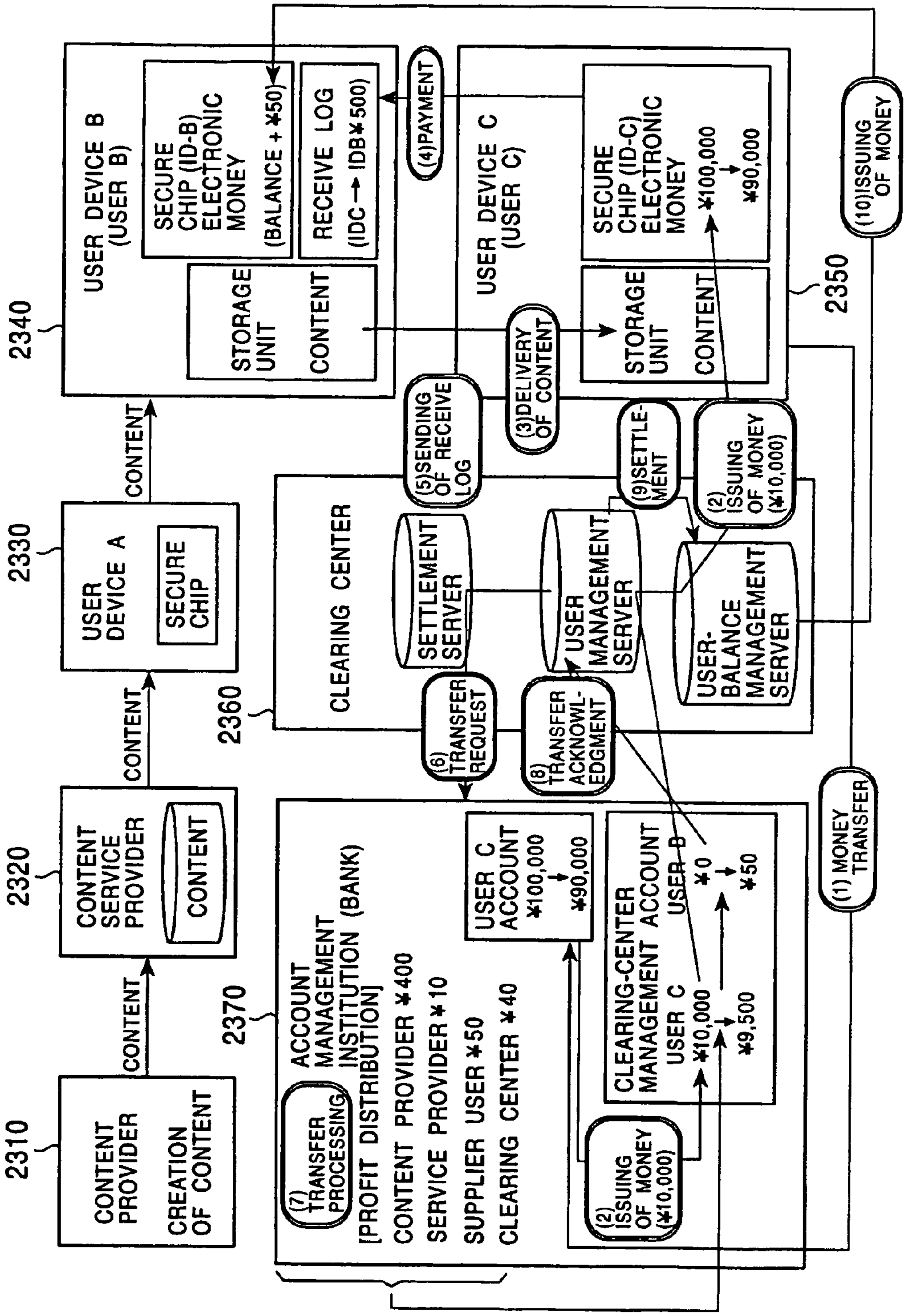
FIG. 23 illustrates a specific example of settlement processing in the distribution of the content between user devices in a content transaction system of the present invention.

A description is now given, with reference to FIG. 23, of an example of the updating operation of the electronic money balance performed by each user device when the content usage payment is made between a plurality of users after secondary distribution (inter-generation delivery or secondary delivery) has been performed.

FIG. 23 illustrates an example of the processing when the content created by a content provider 2310 is distributed to a user device B 2340 via a content service provider 2320 and a user device A 2330, the user device B 2340 then delivers the content to a user device C 2350, and the user device C 2350 pays the usage fee to the user device B 2340.

In this example, the content usage fee is 500 yen. In the price information and sales conditions of the secure container, the distribution information in the field of the "profit distribution" of an account management institution 2370 shown in FIG. 23 is recorded. That is, the distribution information indicates the distribution ratio of the content usage fee, 500 yen, and more specifically, 400 yen is distributed to the content provider 2310, 10 yen is distributed to the service provider 2320, 50 yen is distributed to the content supplier (source) user, and 40 yen is distributed to a clearing center 2360.

The processing proceeds in the order of (1) through (10) shown in FIG. 23. First, a management user of the user device C 2350 transfers money to a user C account of the account management institution C 2370 (indicated by processing (1) in FIG. 23), and also requests the account management institution C 2370 to set 10,000 yen which can be used by the user device C 2350 as electronic money. The account management institution 2370 transfers 10,000 yen from the user C account to a clearing-center management account, and reports this transfer to the clearing center 2360. Then, the clearing center 2360 sets the databases of the user management server and the user-balance management server so that the user C is able to use 10,000 yen as electronic money, and sends an issue log to the user device C 2350 (represented by processing (2) in FIG. 23).

The user device C 2350 receives the content from the user device B 2340 (designated by processing (3) in FIG. 23), and pays the content fee with electronic money. In this case, the user device C 2350 reduces the electronic money balance by the content usage fee, i.e., 500 yen. The user device C 2350 then issues a usage log indicating that the content usage fee has been paid from the user device C 2350 to the user device B 2340, and sends the usage log to the user device B 2340 (indicated by processing (4) in FIG. 23). The usage log also indicates the profit distribution information stored in the secure container.

The user device B 2340 creates a receive log based on the usage log received from the user device C 2350 and sends it to the clearing center 2360 (represented by processing (5) in FIG. 23). The receive log includes the data recorded in the usage log, and more specifically, it includes the price information, i.e., the usage fee paid from the user device C 2350 to the user device B 2340, and the profit distribution information.

Subsequently, the clearing center 2360 checks the receive log against the user data in the user management server, and confirms that the settlement request is from a user managed by the clearing center 260. The clearing center 2360 then updates the content-fee settlement data in the settlement server, and constructs the form of settlement based on the profit distribution information and sends a transfer request with the settlement data to the account management institution 2370 (indicated by processing (6) in FIG. 23).

The account management institution 2370 executes transfer processing for each account according to the "profit distribution" stored in the account management institution 2370 shown in FIG. 23 (represented by processing (7) in FIG. 23). Although in FIG. 23 only the electronic money settlement between the user C 2350 and the user B 2340 is shown, the account management institution 2370 performs transfer processing for other accounts, such as the content provider 2310. The profit distribution information may be extracted from the receive log and then sent from the clearing center 2360 to the account management institution 2370.

Upon completion of the transfer processing by the account management institution 2370, a transfer acknowledgement is sent to the clearing center 2360 (represented by processing (8) in FIG. 23). The clearing center 2360 then performs settlement processing for the electronic money information managed by the clearing center 2360, i.e., it updates the user-electronic money balances of the individual user devices (designated by processing (9) in FIG. 23). The clearing center 2360 also provides a profit, 50 yen, to the user device B 2340, which has supplied the content, according to the profit distribution information (indicated by processing (10) in FIG. 23).

In executing each of the above-described processing, mutual authentication and signature attachment and verification are performed. According to the aforementioned series of processing, in secondary distribution between a plurality of users, settlement processing can be executed according to the profit distribution information preset in the secure container.

Figure 24:
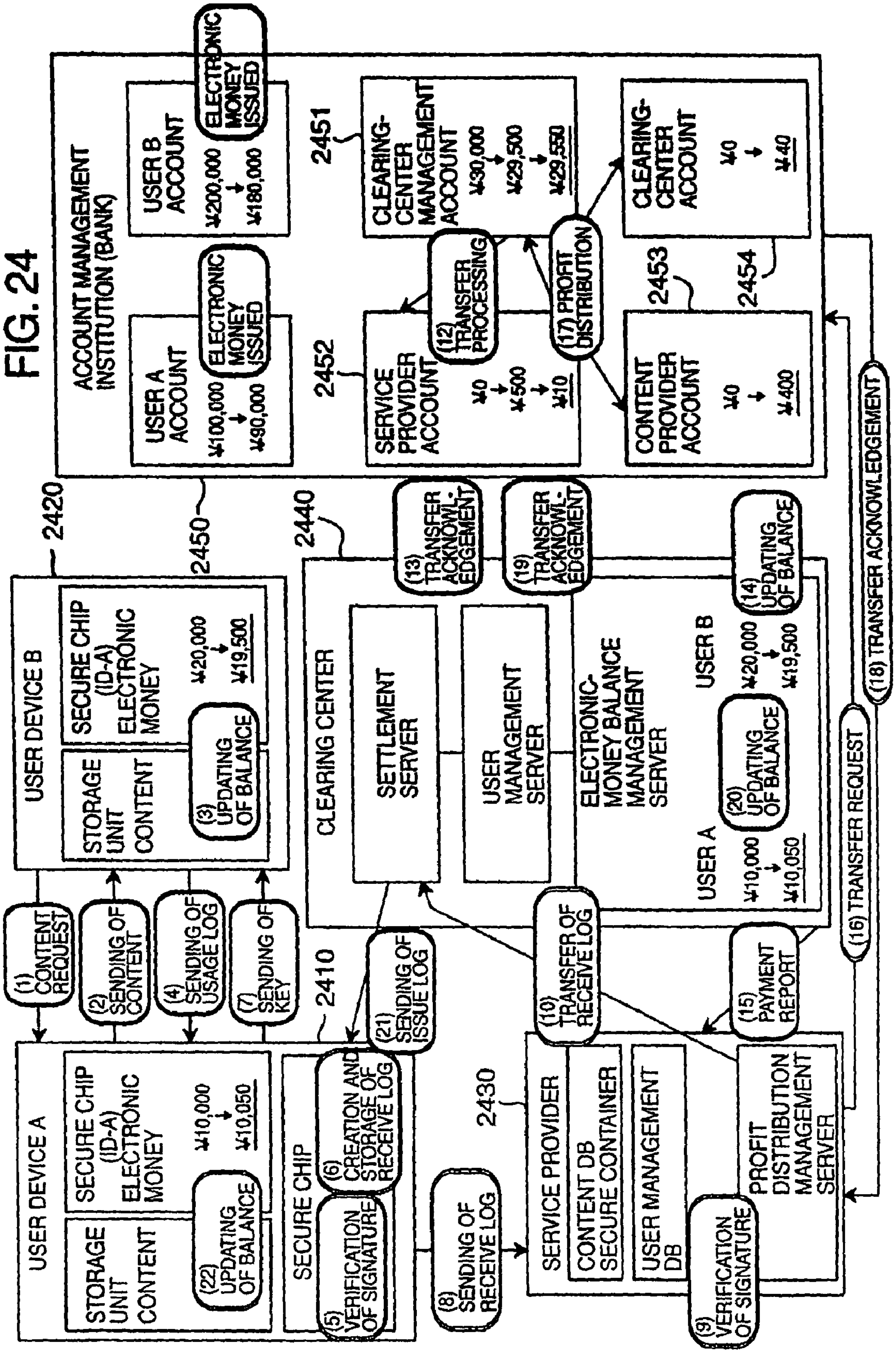
FIG. 24 illustrates another specific example of settlement processing in the distribution of the content between user devices in a content transaction system of the present invention.

In the example shown in FIG. 23, the receive log created by the user device B 2340 which has distributed the content to the user device C 2350 is directly sent to the clearing center 2360. Alternatively, a user device which has sent the content to another user device by secondary distribution (inter-generation delivery or secondary delivery) may send a receive log to a service provider rather than to a clearing center. With this arrangement, the service provider is able to centrally execute processing concerning the content distribution, such as profit distribution and award redemption processing. Accordingly, the processing performed by the clearing center is restricted to the issuing of electronic money (management of an issue log) and the settlement processing based on the receive log. Such an example is shown in FIG. 24. The processing proceeds in the order of (1) through (22) in FIG. 24.

In FIG. 24, the content is sent from a user device A 2410 to a user device B 2420 by secondary distribution (inter-generation delivery or secondary delivery). First, the user device B 2420 requests the user device A 2410 to send the content (indicated by processing (1)). Then, the user device A 2410 sends the content (secure container) to the user device B 2420 (represented by processing (2)). The user device B 2420 then checks the sales conditions and performs purchase processing, that is, it pays the content fee by electronic money. In this case, the electronic money balance is reduced according to the content usage fee (for example, from 20,000 yen to 19,500 yen) (designated by processing (3)). Subsequently, the user device B 2420 creates a usage log indicating that the content fee is paid from the user device B 2420 to the user device A 2410, and sends the usage log to the user device A 2410 (indicated by processing (4)). In the usage log, profit distribution information indicated in the secure container is recorded.

The user device A 2410 verifies the signature of the usage log (indicated by processing (5)), and also creates a receive log based on the usage log and stores it (represented by processing (6)). Then, the user device A 2410 sends the content key to the user device B 2420 (designated by processing (7)). The receive log includes the data recorded in the usage log, and more specifically, the receive log includes the information about the content usage payment made from the user device B 2420 to the user device A 2410 and profit distribution information. The user device A 2410 sends the receive log to a service provider 2430 (indicated by processing (8)).

Upon receiving the receive log, the service provider 2430 verifies the integrity of the signature of the receive log, and performs processing according to the profit distribution information or the award redemption information. The processed data is then stored in a user management database or a profit-distribution management server. Upon completion of the aforementioned series of processing, the service provider 2430 sends the receive log to a clearing center 2440 (indicated by processing (10)).

The clearing center 2440 then checks the receive log against the user data in the user management server, and confirms that the transfer request has been sent from a user managed by the clearing center 2440. Subsequently, the clearing center 2440 updates the content-fee settlement data in the settlement server, and sends a transfer request to an account management institution 2450, namely, the clearing center 2440 requests the account management institution 2450 to transfer money from a clearing-center management account 2451 to a service provider account 2452 (represented by processing (11)).

In response to the transfer request from the clearing center 2440, the account management institution 2450 transfers money from the clearing-center management account 2451 to the service provider account 2452 (designated by processing (12)). In this example, the profit distribution processing according to the profit distribution information is executed by the service provider 2430. Accordingly, in response to the transfer request from the clearing center 2440, only money transfer is performed from the clearing-center management account 2451 to the service provider account 2452. More specifically, as shown in FIG. 24, the clearing-center management account 2451 is reduced from 30,000 yen to 29,500 yen, and the service provider account 2452 is increased from 0 to 500 yen. Upon completion of the transfer operation by the account management institution 2450, the account management institution 2450 sends a transfer acknowledgement to the clearing center 2440 (indicated by processing (13)). Then, the clearing center 2440 updates the balance data of the user B of the user device B 2420 in the electronic-money balance management server based on the transfer acknowledgement (represented by processing (14)). More specifically, the balance of the user B is reduced from 20,000 yen to 19,500 yen. As a result, the electronic money balance of the user device B 2420, i.e., 19,500 yen, coincides with the balance data of the user B in the electronic-money balance management server of the clearing center 2440.

Then, the clearing center 2440 reports to the service provider 2430 that the payment processing of the content fee from the user device B 2420 has been completed (indicated by processing (15)). In response to the report from the clearing center 2440, the service provider 2430 sends a transfer request to the account management institution 2450 to transfer money based on the profit distribution information determined by the receive log (designated by processing (16)). The account management institution 2450 performs transfer processing for the individual accounts according to the profit distribution information sent from the service provider 2430 (indicated by processing (17)). In the example shown in FIG. 24, certain amounts of money, i.e., 400 yen and 40 yen, are transferred to a content provider account 2453 and a clearing center account 2454, respectively, according to the profit distribution information. As a result, the clearing-center management account 2451 is increased from 29,500 yen to 29,550 yen, the service provider account 2452 is reduced from 500 yen to 10 yen, the content provider account 2453 is increased from 0 to 400 yen, and the clearing center account 2454 is increased from 0 to 40 yen.

Upon completion of the transfer processing, the account management institution 2450 sends a transfer acknowledgement indicating the completion of the profit distribution processing to the clearing center 2440 (represented by processing (19)). Upon receiving the transfer acknowledgement, the clearing center 2440 updates the electronic money balance of the user device A managed by the clearing center 2440 from 10,000 yen to 10,050 yen (designated by processing (20)). According to this processing, the profit distribution (50 yen in FIG. 24) is sent to the user A of the user device A 2410 based on the receive log sent from the service provider 2430 to the clearing center 2440. Upon completion of the updating of the electronic money balance of the user device A 2410, the clearing center 2440 sends an additional issue log representing the profit distribution (50 yen) to the user device A 2410 (represented by processing (21)). The user device A 2410 updates the electronic money balance from 10,000 yen to 10,050 yen based on the additional issue log (indicated by processing (22)).

Instead of issuing the additional issue log sent in processing (21), the following alternative may be offered as described above. The clearing center 2440 may request the user device A 2410 to send back the "old issue log", which has previously issued to the user A 2410, and the electronic money balance data to the clearing center 2440. Then, the clearing center 2440 may issue a "new issue log" by adding the electronic money balance indicated in the "old issue log" and the profit distribution to the user A, and may send it to the user device A 2410. In this case, the "old issue log" is nullified in the clearing center 2440.

Figure 25:
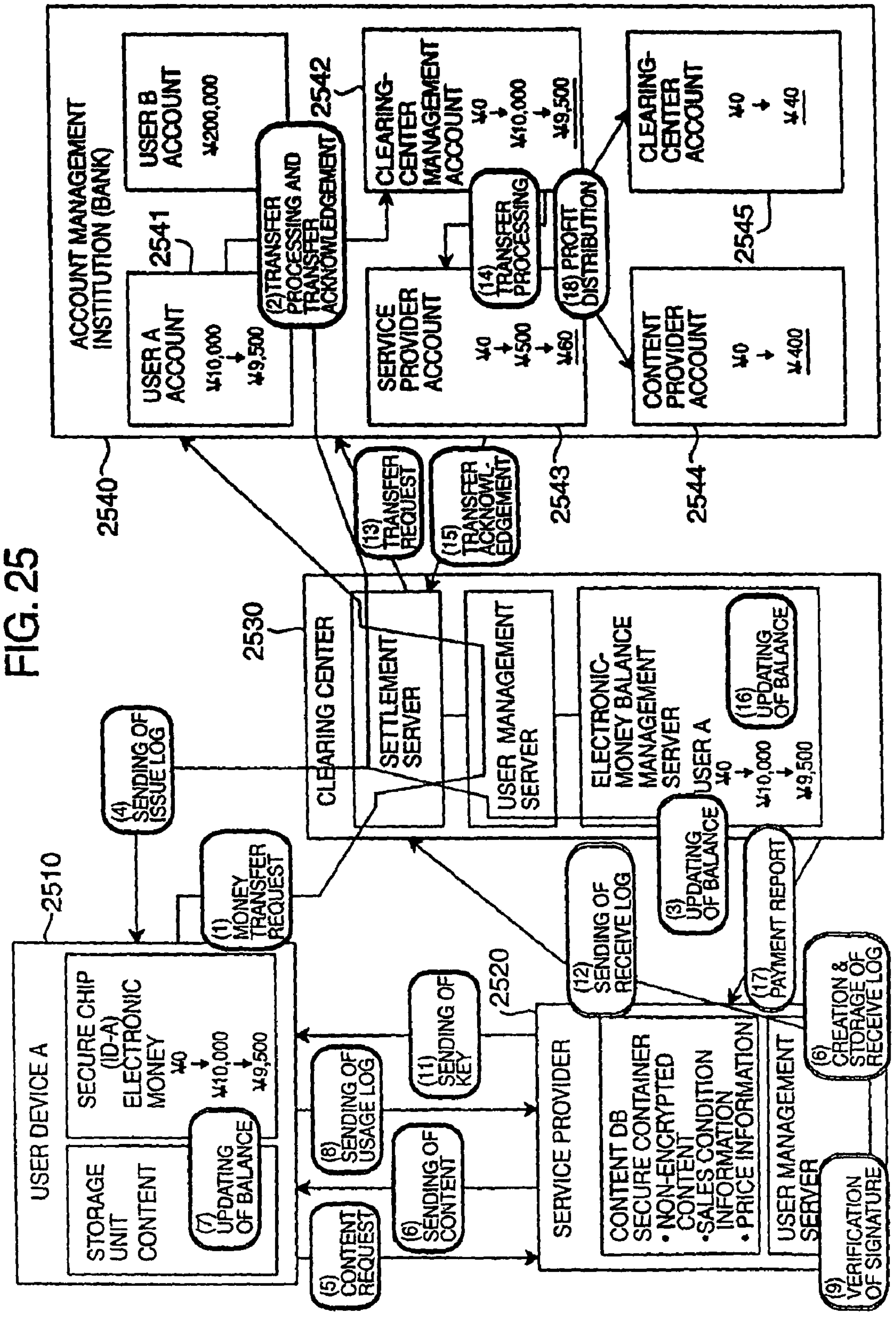
FIG. 25 illustrates a specific example of settlement processing (local management system) in the distribution of the content in a content transaction system of the present invention.

An example of settlement processing performed by using various logs in content distribution is discussed below with reference to FIG. 25. FIG. 25 illustrates a local management system in which a service provider serves as a manager for performing settlement processing in content distribution. The processing proceeds in the order of (1) through (18).

In the example shown in FIG. 25, a user device A 2510 purchases the content from a service provider 2520.

To enable payment processing using electronic money, the user device A 2510 first requests a clearing center 2530 to register the user device A 2510 in a user management server and to set the balance in an electronic-money balance management server (indicated by processing (1)). That is, the user device A 2510 makes a transfer request to the clearing center 2530. In response to the request from the user device A 2510, the clearing center 2530 requests an account management institution 2540 to transfer 10,000 yen from a user A account 2541 to a clearing-center management account 2542, and the account management institution 2540 performs transfer processing accordingly (represented by processing (2)). As a result, the balance of the user A account 2541 is reduced from 100,000 yen to 90,000 yen, and the balance of the clearing-center management account 2542 is increased from 0 to 10,000 yen. Upon completion of transfer processing, a confirmation request is sent to the clearing center 2530. In response to the request, the clearing center 2530 updates the balance of the user A in the electronic-money balance management server from 0 to 10,000 yen (designated by processing (3)), and then sends an issue log to indicate to the user device A 2510 that the 10,000 yen is set (indicated by processing (4)).

Subsequently, the user device A 2510 requests the service provider 2520 to send the content (represented by processing (5)). Then, the service provider 2520 sends the content (secure container) to the user device A 2510 (indicated by processing (6)). The user device A 2510 checks the sales conditions and performs purchase processing, i.e., it pays the content fee by updating the electronic money balance from 10,000 yen to 9,500 yen (represented by processing (7)). The user device A 2510 also creates a usage log indicating that the content usage fee is to be paid, and sends the usage log to the service provider 2520 (designated by processing (8)). In this usage log, profit distribution information recorded in the secure container is included.

After verifying the integrity of the signature of the usage log (indicated by processing (9)), the service provider 2520 obtains the profit distribution information from the usage log. Then, the service provider 2520 creates and stores a receive log (represented by processing (10)), and then sends the content key to the user device A 2510 (indicated by processing (11)). When settlement processing is performed, the service provider 2520 sends the receive log to the clearing center 2530 (indicated by processing (12)).

The clearing center 2530 checks the storage data of the receive log against the user data in the user management server, and confirms that the settlement request is from a user managed by the clearing center 2530. Thereafter, the clearing center 2530 requests the account management institution 2540 to transfer money from the clearing-center management account 2542 to a service provider account 2543 (indicated by processing (13)).

In response to the transfer request from the clearing center 2530, the account management institution 2540 transfers money from the clearing-center management account 2542 to the service provider account 2543 (designated by processing (14)). As a result, the balance of the service provider account 2543 is increased from 0 to 500 yen. In this example, the profit distribution processing based on the profit distribution information is managed by the service provider 2520. Accordingly, in response to the transfer request from the clearing center 2530, only transfer processing is performed from the clearing-center management account 2542 to the service provider account 2543. Upon completion of the transfer operation by the account management institution 2540, the account management institution 2540 sends a transfer acknowledgement to the clearing center 2530 (indicated by processing (15)). The clearing center 2530 then updates the balance data of the user A in the electronic-money balance management server from 10,000 yen to 9,500 yen based on the transfer acknowledgement (represented by processing (16)).

Thereafter, the clearing center 2530 reports to the service provider 2520 as a transfer acknowledgement that the content-fee payment processing from the user device A 2510 has been completed (designated by processing (17)). In response to the report from the clearing center 2530, the service provider 2520 sends a transfer request based on the profit distribution information determined by the usage log to the account management institution 2540. The account management institution 2540 performs transfer processing for the individual accounts according to the profit distribution information received from the service provider 2520 (indicated by processing (18)). In the example shown in FIG. 25, certain amounts of money, i.e., 400 yen and 40 yen, according to the profit distribution information are transferred to a content provider account 2544 and a clearing center account 2545, respectively. As a result, the balance of the service provider account 2543 is reduced from 500 yen to 60 yen.

As discussed above, in the example shown in FIG. 25, the service provider 2520 performs processing concerning content distribution, such as profit distribution and point management for an award redemption program, and the clearing center 2530 mainly manages the balances of electronic money.

Figure 26:
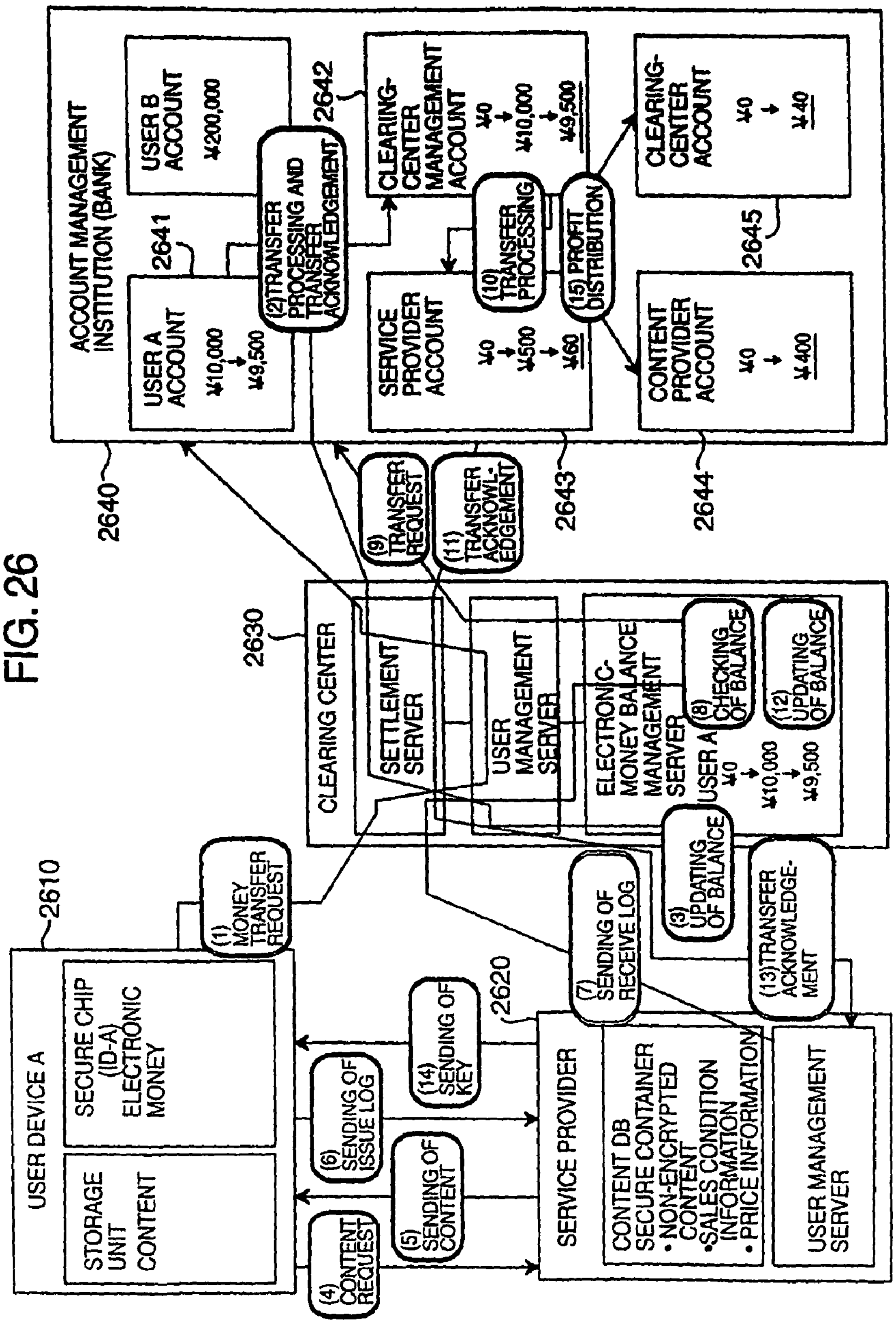
FIG. 26 illustrates a specific example of settlement processing (clearing-center management system) in the distribution of the content in a content transaction system of the present invention.

A description is now given, with reference to FIG. 26, of processing of a clearing-center management system in which a clearing center manages the user balance of electronic money so as to eliminate the need for a user device to do so. The processing proceeds in the order of (1) through (15). In this example, a user device A 2610 purchases the content from a service provider 2620.

First, in order to enable payment processing by electronic money, the user device A 2610 requests a clearing center 2630 to register the user device A 2610 in a user management server of the clearing center 2630 and to set the balance in an electronic-money management server (indicated by processing (1)). That is, the user device A 2610 performs transfer request to the clearing center 2630. In response to the request, the clearing center 2630 requests an account management institution 2640 to transfer 10,000 yen from a user A account 2641 to a clearing-center management account 2642, and the account management institution 2640 performs transfer processing accordingly (represented by processing (2)). As a result, the balance of the user A account 2641 is reduced from 100,000 yen to 90,000 yen, and the balance of the clearing-center management account 2642 is increased from 0 to 10,000 yen. Upon completion of the transfer processing, a confirmation request is sent to the clearing center 2630. Then, the clearing center 2630 updates the balance of the user A in the electronic-money management server from 0 to 10,000 yen (designated by processing (3)).

According to this clearing-center management system, the user device A 2610 is able to request the service provider 2620 to send the content (indicated by processing (4)) simultaneously with sending a transfer request to the clearing center 2630 performed in (1). In the example shown in FIG. 25, before performing purchase processing, the user device A 2510 is required to check the balance of electronic money. In the example shown in FIG. 26, however, the clearing center 2630 updates the balance of the electronic money and makes a corresponding report to the service provider 2620. The service provider 2620 then sends the content key to the user device A 2610.

In response to a content request from the user device A 2610, the service provider 2620 sends the content (secure container) to the user device A 2610 (indicated by processing (5)). The user device A 2610 checks the sales conditions and performs purchase processing. The user device A 2610 then creates a usage log indicating that the content usage fee is to be paid, and sends the usage log to the service provider 2620 (represented by processing (6)). In the usage log, profit distribution information recorded in the secure container is included.

The service provider 2620 verifies the integrity of the signature of the usage log, and obtains the profit distribution information based on the usage log. Then, the service provider 2620 creates a receive log and sends it to the clearing center 2630 (indicated by processing (7)).

The clearing center 2630 checks the receive log against the user data in the user management server, and confirms that the settlement request is from a user managed by the clearing center 2630. Then, the clearing center 2630 updates the content-fee settlement data in the settlement server, and checks the balance in the electronic-money balance management server (indicated by processing (8)). Thereafter, the clearing center 2630 requests the account management institution 2640 to transfer the content fee from the clearing-center management account 2642 to a service provider account 2643 (designated by processing (9)).

In response to the transfer request from the clearing center 2630, the account management institution 2640 transfers the usage fee from the clearing-center management account 2642 to the service provider account 2643 (represented by processing (10)). As a result, the balance of the clearing-center management account 2642 is reduced from 10,000 yen to 9,500 yen, and the balance of the service provider account 2643 is increased from 0 to 500 yen. As in the previous example, profit distribution processing is managed by the service provider 2620. Accordingly, in response to the transfer request from the clearing center 2630, only transfer processing from the clearing-center management account 2642 to the service provider account 2643 is performed. Upon completion of the transfer processing, the account management institution 2640 sends a transfer acknowledgement to the clearing center 2630 (indicated by processing (11)). The clearing center 2630 then updates the balance data of the user A in the electronic-money management server from 10,000 yen to 9,500 yen based on the transfer acknowledgement (represented by processing (12)).

Subsequently, the clearing center 2630 sends a transfer acknowledgement to the service provider 2620 indicating that the payment processing of the content fee by the user device A 2610 has been completed (designated by processing (13)). Upon receiving the transfer acknowledgement from the clearing center 2630, the service provider 2620 sends the content key to the user device A 2610 (represented by processing (14)). The service provider 2620 further sends a transfer request based on the profit distribution information determined by the usage log to the account management institution 2640. The account management institution 2640 executes the transfer processing for the individual accounts according to the profit distribution sent from the service provider 2620 (indicated by processing (15)). In the example shown in FIG. 26, 400 yen and 40 yen are transferred to a content provider account 2644 and a clearing center account 2645, respectively, according to the profit distribution information. As a result, the balance of the service provider account 2643 is reduced from 500 yen to 60 yen.

In this example, it is not necessary that the user device A 2610 check the balance of the electronic money. Instead, the clearing center 2630 checks the user balance in the electronic-money balance management server, and the account management institution 2640 performs transfer processing for the usage fee. Then, the balance of the electronic money is updated in the clearing center 2630. The information indicating that the transfer processing has been completed is reported to the service provider 2620. Then, the service provider 2620 sends the content key to the user device A 2610. According to the above-described clearing-center management system, it is possible to prevent a content fee from remaining unsettled in the clearing center 2630. In order to reduce a handling charge, actual transfer processing may be performed at one time after data in the clearing center 2630 is temporarily updated.

7. Log-Based User Management

As previously discussed, in the content transaction system and the content transaction method of the present invention, an issue log, a usage log, and a receive log are distributed among a plurality of devices and institutions. Various types of information are stored in each log, as shown in FIG. 6. A description is now given of a user management system using such information recorded in the logs.

7-1 Usage-Fee-Based Management

As is seen from the configuration of each log shown in FIG. 6, information concerning the usage fee is stored in a usage log created by a content purchaser (user) and sent to a service provider. A checking operation for a large usage fee by using the usage fee information recorded in the usage log is discussed below.

Figure 27:
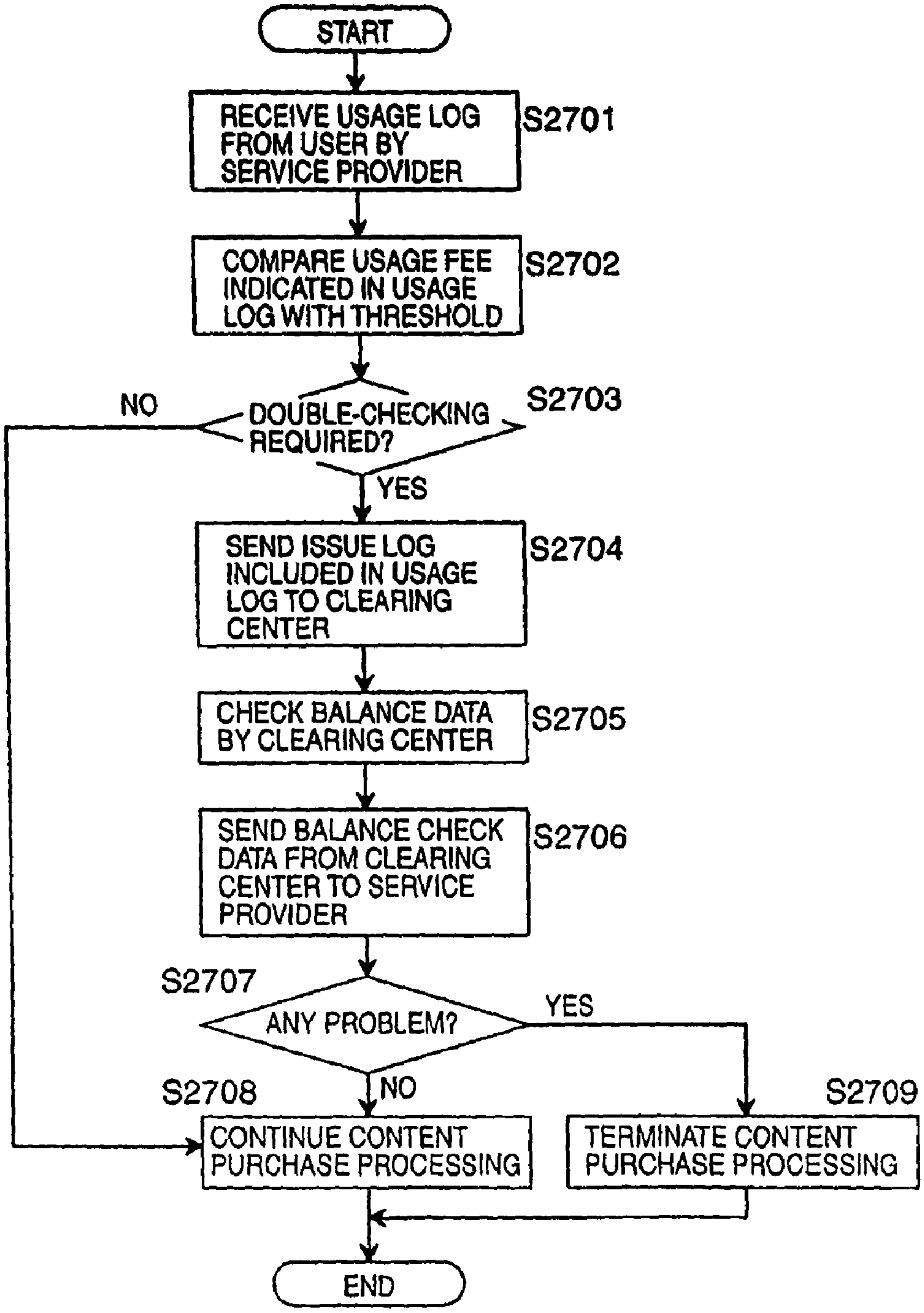
FIG. 27 is a flow chart illustrating settlement management processing based on the usage fee contained in a usage log in a content transaction system of the present invention.

FIG. 27 is a flow chart illustrating the usage-fee checking processing. In step S2701, a usage log created by the user is sent to a service provider. In step S2702, the service provider compares the usage fee contained in the usage log with a predetermined threshold. In this case, the same threshold may be set for all the users or different thresholds may be set according to the user's age or usage conditions provided by the service provider. The service provider possesses user management data including these thresholds.

It is then determined in step S2703 whether it is necessary to double-check the usage fee. If the outcome of step S2703 is yes, the process proceeds to step S2704 in which the service provider extracts the issue log from the usage log and sends it to a clearing center. Then, in step S2705, the clearing center checks the user balance in an electronic-money balance management server of the clearing center based on the issue log received from the service provider. In step S2706, the clearing center sends the balance check data to the service provider. It is then determined by the service provider in step S2707 whether there is any problem in the balance check data. If the result of step S2707 is no, it is concluded that the content was legally purchased, and process proceeds to step S2708. In step S2708, subsequent content purchase processing, such as the sending of a content key to the user device, continues. In contrast, if the outcome of step S2707 is yes, that is, if it is concluded that it seems difficult to collect the content usage fee, the process proceeds to step S2709. In step S2709, it is reported to the user device that the purchase of the content has been rejected, and the processing is terminated without sending the content key.

According to this usage-fee checking processing, illegal transactions of the content or transactions of expensive goods by juveniles can be prevented. The checking of the usage fee may be performed by the clearing center, and only when it is determined that there is a problem, the clearing center may request the service provider to take certain action, such as making a user inquiry.

Additionally, a threshold of an upper amount of the usage fee, unique to the user device, may be set and stored in the user device. Then, when creating a usage log, the user device may check by referring to the threshold data whether the usage fee exceeds the threshold. If the amount of usage fee exceeds the threshold, identification data (ID bit) indicating that the usage fee exceeds the threshold or that it is necessary to check the operation by the clearing center may be added to the usage log. Upon receiving a usage log with ID data, the service provider may request the clearing center to check the user balance based on the ID data. According to this modification, it is not necessary that the service provider possess threshold data, and certain thresholds can be set for the individual users.

7-2 Usage-Period-Based Management

As is seen from the foregoing description, the user receives an issue log from the clearing center when purchasing the content. As shown in FIG. 6, the effective period is included in the issue log. A description is now given of management processing based on the usage period.

The clearing center possesses data in the user management server in which user devices to which issue logs are sent and the information of the issue logs are associated with each other. The issue log includes an issued amount of money and an effective period. Upon receiving an issue log, a user device is able to make payment by electronic money up to the amount of money and within the effective period set in the issue log.

The clearing center is able to set the amount of money to be issued to the user based on the user's credibility. For example, the clearing center may set a small amount of money for juveniles or may set a large amount of money for users according to their number of transactions. The clearing center is also able to set the effective period according to the type of issue log. For example, the clearing center may set the effective period of an issue log with a large amount of money to be long, and sets the effective period of an issue log with a small amount of money to be short.

The clearing center manages information of all the issue logs in the user management server and also manages the electronic money balances of all the users in the electronic-money balance management server. It is thus possible for the clearing center to regularly perform auditing based on the above data. For example, the clearing center may send a message to suggest to a user that an issue log which will expire soon should be renewed.

Figure 28:
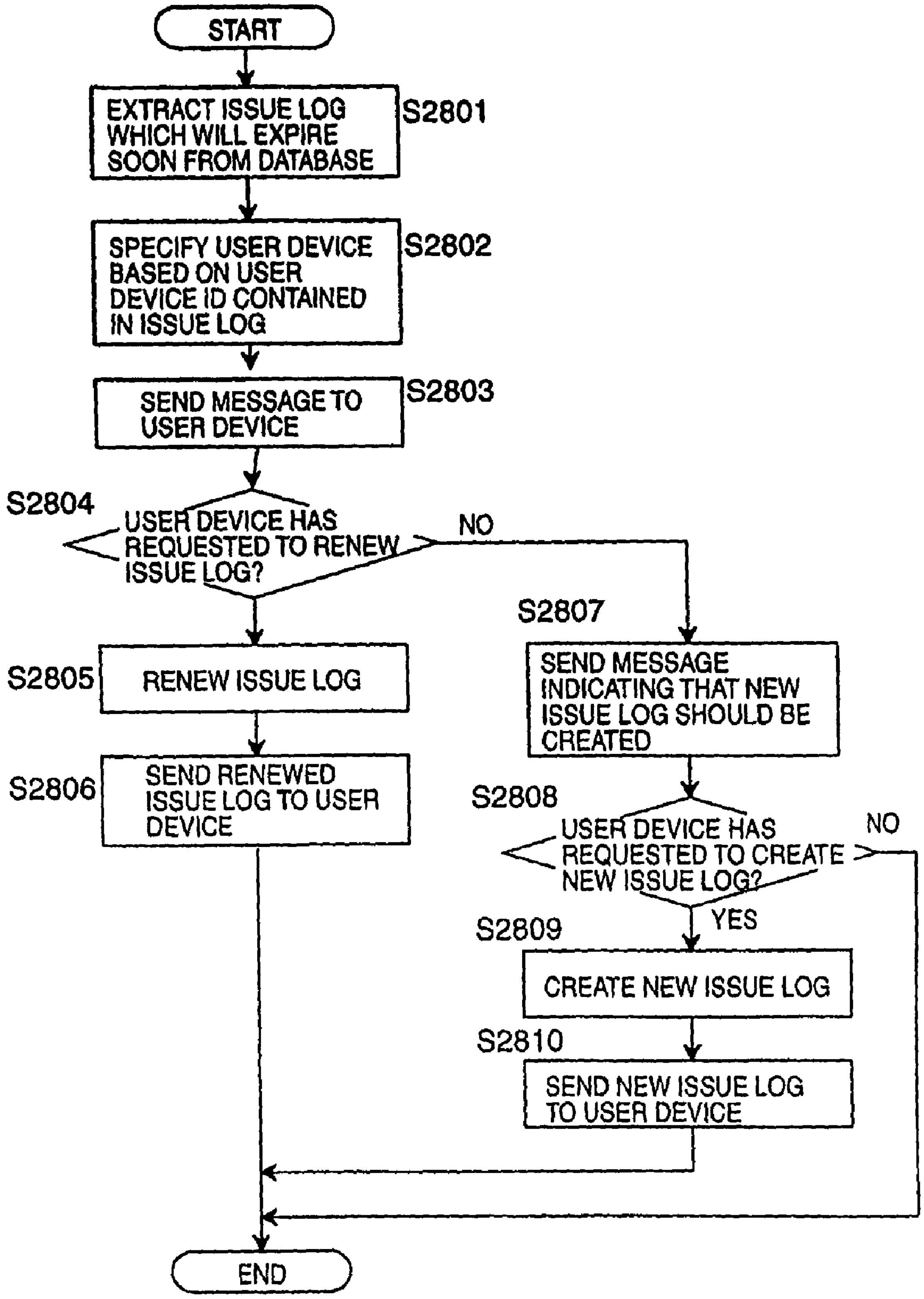
FIG. 28 is a flow chart illustrating management processing based on the effective period contained in an issue log in a content transaction system of the present invention.

FIG. 28 is a flow chart illustrating the management processing for the effective period of an issue log by the clearing center.

In step S2801, the clearing center checks the data in the user management server and the data in the electronic-money balance management server so as to extract issue logs which will expire soon based on the storage data of the user management server. This checking operation is performed regularly, for example, every month, so as to extract issue logs which will expire within two months.

In step S2802, the clearing center specifies the user device based on the user device ID recorded in the extracted issue log. Then, in step S2803, the clearing center sends a message to the user device indicating that there is an issue log which will expire soon. The user device receives the message, and it is then determined in step S2804 whether the user device has requested the clearing center to renew an issue log. If the outcome of step S2804 is yes, the flow proceeds to step S2805 in which the clearing center renews the issue log having a new effective period based on the request from the user. In step S2806, the clearing center sends the renewed issue log to the user device. If it is found in step S2804 that the user device has not requested the clearing center to renew the issue log within the effective period, the flow proceeds to step S2807. In step S2807, the clearing center sends a message to the user device indicating that the effective period of the issue log has elapsed, and that it is necessary to create a new issue log. It is then determined in step S2808 whether the user device has requested the clearing center to create a new issue log. If the result of step S2808 is yes, the process proceeds to step S2809 in which the clearing center creates a new issue log. Then, in step S2810, the clearing center sends the new issue log to the user device. If it is found in step S2808 that the user device has not requested the clearing center to create a new issue log, the processing is terminated.

According to this management processing of issue logs by the clearing center, distribution and use of illegal issue logs can be prevented. Additionally, when checking the effective periods of the issue logs, the balances in the electronic-money balance management server of the clearing center may also be checked. In this case, the total of the collected electronic money amount and the total of the uncollected electronic money amount can be calculated.

The clearing center may also conduct a regular check on the electronic-money balance management server, and may give a warning to a user device whose electronic money balance is small, or may send the data of the remaining electronic money balance.

Alternatively, the user device may check the effective period of an issue log when using the electronic money. If the issue log has expired, the user device may request the clearing center to renew the issue log or create a new issue log before creating a usage log. Upon receiving the renewed or new issue log from the clearing center, the user device may create a usage log based on the issue log having a new effective period.

In performing the above-described series of processing, the user device, the clearing center, and the service provider perform mutual authentication, attach a signature to data to be sent, and verify the signature of the received data, thereby preventing the distribution of illegal data.

As is seen from the foregoing description, the present invention offers the following advantages.

Upon receiving the usage log from the user device, the service provider compares the content usage fee recorded in the usage log with a predetermined threshold value. If the content usage fee is found to exceed the threshold value, the service provider requests the clearing center to inquire about the electronic money balance of the user device. Thus, the possibility of collecting the usage fee from the user device can be checked. Different threshold values according to the user's age or credibility based on the number of transactions can be stored in the user management database. Thus, illegal transactions and uncollectible transactions of the content or transactions of expensive goods by juveniles can be prevented.

The allowable amount of money spent by the user device and the effective period are set in the issue log, and settlement processing is performed only when the payment of the content fee is made within the effective period. It is thus possible to prevent the payment made by illegal issue logs.

Additionally, the clearing center contains user management data in which the user device identifiers and the effective periods of the issue logs are associated with each other. By searching the user management data, the clearing center extracts issue logs which will expire soon or which have expired, and sends a warning message to instruct the corresponding user devices to renew the issue log or to create a new issue log. Thus, the presence of issue logs which have expired can be eliminated, and the distribution of illegal issue logs and transactions made by illegal issue logs can be prevented.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A content usage management system for performing transaction processing of a content which is usable by a user device, said content usage management system comprising:

a user device which comprise an information processing apparatus;

a clearing center information processing apparatus that manages payment of a content usage fee using electronic credits, said clearing center comprising at least one information processing apparatus;

an issue log sent from the clearing center information processing apparatus to the user device;

a usage log containing information about the issue log sent from the user device to a service provider, said service provider comprising at least one information processing apparatus; and a receive log created by the service provider information processing apparatus after receipt of the usage log from the user device, wherein, the issue log contains an effective payment period for the content usage fee, the clearing center information processing apparatus allows said user device to pay the content usage fee within the effective payment period by way of the user device sending the usage log to the service provider which in turn sends the receive log to the clearing center information processing apparatus to initiate an electronic money transfer between a user account and a service provider account, said issue log expires after the effective payment period elapses, said clearing center information processing apparatus comprises user management data in which at least one user device identifier is associated with information relating to the effective payment period, said clearing center information processing apparatus searches said user management data for user devices having issue logs that expire within a predetermined time period, and said clearing center information processing apparatus sends a warning message to user devices with issue logs expiring within the predetermined time period.

2. The content usage management system according to claim 1, wherein said warning message instructs the user devices to renew the issue log.

3. The content usage management system according to claim 1, wherein said warning message instructs the user device to create a new issue log.

4. The content usage management system according to claim 1, wherein said issue log defines an amount of electronic credit the user is authorized to use for payment of the content usage fee, and said user device pays the content usage fee within the effective payment period and in an amount up to the amount of electronic credit authorized in said issue log.

5. The content usage management system according to claim 4, wherein the effective payment period defined in said issue log varies according to the authorized amount of electronic credits.

6. The content usage management system according to claim 1, wherein the effective payment period defined in said issue log varies according to a credibility rating of a management user of said user device.

7. The content usage management system according to claim 1, wherein:

said user device checks the effective payment period defined in said issue log when paying the content usage fee using electronic credits, and when said issue log has expired, said user device requests that said clearing center information processing apparatus create a new issue log before creating a new usage log, and said user device creates said usage log based on the new issue log.

8. The content usage management system according to claim 1, wherein each of said user devices and said clearing center information processing apparatus comprises an encryption processing unit, and said issue log is sent from said clearing center information processing apparatus to said user device, said user device and said clearing center information processing apparatus mutually authenticate communications between one another, said clearing center information processing apparatus attaches a digital signature to said issue log, and said user device receives said issue log and verifies the integrity of the digital signature.

9. A content usage management method for performing transaction processing of content which is usable by a user device, said content usage management method comprising the steps of:

sending an issue log, containing an effective payment period for the payment of a content usage fee using electronic credits, from an issue center to the user device, each of said issue center and said user device comprising an information processing;

creating a user management data by associating at least one user device identifier with information relating to the effective payment period;

sending a usage log containing information on the issue log from the user device to a service provider, said service provider comprising at least one information processing apparatus;

creating a receive log with said service provider information processing device after receipt of the usage log from the user device;

paying the content usage fee within the effective payment period defined in said issue log by sending the receive log to the issue center which in turn initiates an electronic money transfer between a user account and a service provider account;

expiring said issue log at the end the effective payment period;

searching the user management data for expired issue logs; and sending a warning message to the user device with a issue log expiring within the predetermined time period.

10. The content usage management method according to claim 9, wherein said warning message instructs the user devices with issue logs expiring within the predetermined time period to renew the issue log.

11. The content usage management method according to claim 9, wherein, and said warning message instructs the user devices with issue logs expiring within the predetermined time period to create a new issue log.

12. The content usage management method according to claim 9, further comprising the steps of:

defining an authorized amount of credit in the issue log, and paying the content usage fee within the effective payment period using electronic credits in an amount not exceeding the authorized amount of electronic credits defined in the issue log.

13. The content usage management method according to claim 12, further comprising the step of:

varying the effective payment period according to the authorized amount of electronic credits defined in the issue log.

14. The content usage management method according to claim 9, further comprising the step of:

varying the effective payment period according to a credibility rating of a management user of said user device.

15. The content usage management method according to claim 9, further comprising the step of:

checking the effective payment period when paying the content usage fee;

requesting the clearing center create a new issue log before creating a new usage log for paying the usage fee; and creating the new usage log based on the new issue log.

16. The content usage management method according to claim 9, further comprising the steps of:

mutually authenticating communications between the user device and the clearing center when the issue log is sent from the clearing center to the user device using encryption processing units located at the user device and the clearing center;

attaching a digital signature to the issue log before sending it to the user device; and receiving the issue log at the user device and verifying the integrity of the digital signature.

17. A tangible storage medium on which is stored a computer program that configures an information processing system for content usage management processing for use in transaction processing of content usable by a user device to run on a computer system, said computer program comprising the steps of:

sending an issue log containing an effective payment period to said user device which comprises an information processing apparatus;

creating a user management data by associating at least one user device identifier with information relating to the effective payment period;

creating a receive log with said service provider information processing device after receipt of the usage log from the user device;

paying the content usage fee within the effective payment period defined in said issue log by sending the receive log to the issue center which in turn initiates an electronic money transfer between a user account and a service provider account;

searching the user management data for user devices having issue logs which expire in a predetermined time period; and sending a warning message to the user device before the expiration of the predetermined time period to renew the issue log or create a new issue log.

* * * * *